US010206000B2

(12) United States Patent
Kitazato et al.

(10) Patent No.: US 10,206,000 B2
(45) Date of Patent: *Feb. 12, 2019

(54) RECEIVING APPARATUS, RECEIVING METHOD, AND PROGRAM

(71) Applicant: SATURN LICENSING LLC, New York, NY (US)

(72) Inventors: Naohisa Kitazato, Tokyo (JP); Yoshiharu Dewa, Tokyo (JP); Yasuaki Yamagishi, Kanagawa (JP); Jun Kitahara, Saitama (JP); Mark Eyer, Woodinville, WA (US)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,445

(22) Filed: Jun. 21, 2016

(65) Prior Publication Data

US 2016/0301977 A1    Oct. 13, 2016

Related U.S. Application Data

(63) Continuation of application No. 13/753,591, filed on Jan. 30, 2013, now Pat. No. 9,414,002.
(Continued)

(51) Int. Cl.
*H04N 21/462* (2011.01)
*H04N 21/434* (2011.01)
(Continued)

(52) U.S. Cl.
CPC ........... *H04N 21/4622* (2013.01); *H04N 5/44* (2013.01); *H04N 5/4401* (2013.01);
(Continued)

(58) Field of Classification Search
CPC ............ H04N 21/4622; H04N 21/435; H04N 21/858; H04N 21/8586; H04N 21/23617;
(Continued)

(56) References Cited

U.S. PATENT DOCUMENTS 5,483,658 A    1/1996 Grube
5,978,855 A    11/1999 Metz et al.
(Continued)

FOREIGN PATENT DOCUMENTS

CN    101720034 A    6/2010
CN    101939988 A    1/2011
(Continued)

OTHER PUBLICATIONS

International Search Report dated Mar. 5, 2013, in PCT/JP2013/051976 (with English language translation).
(Continued)

*Primary Examiner* — Benjamin R Bruckart
*Assistant Examiner* — Tien M Nguyen
(74) *Attorney, Agent, or Firm* — Oblon, McClelland, Maier & Neustadt, L.L.P.

(57) ABSTRACT

Disclosed herein is a receiving apparatus, a receiving method, and a program which are configured to provide application programs to be executed in response to AV content. The receiving apparatus includes: a receiving block; a trigger acquisition block; an application acquisition block; and a control block. The control block acquires trigger information and, on the basis of a command obtained from the acquired trigger information, acquires a data broadcast application from an application server on the Internet or a data broadcast application transmitted as NRT content of an NRT service using a FLUTE session by referencing an FDT identified by an SMT and an NRT-IT. In accordance with a command obtained from the acquired trigger information,
(Continued)

the control block controls an operation of the acquired application program. The present technology is applicable to television receivers configured to receive digital television broadcast signals.

22 Claims, 38 Drawing Sheets

Related U.S. Application Data

(60) Provisional application No. 61/596,013, filed on Feb. 7, 2012.

(51) Int. Cl.
*H04N 21/858* (2011.01)
*H04N 21/81* (2011.01)
*H04N 21/61* (2011.01)
*H04N 5/44* (2011.01)
*H04N 7/025* (2006.01)

(52) U.S. Cl.
CPC ..... *H04N 21/4345* (2013.01); *H04N 21/4348* (2013.01); *H04N 21/6175* (2013.01); *H04N 21/8173* (2013.01); *H04N 21/8586* (2013.01); *H04N 7/025* (2013.01)

(58) Field of Classification Search
CPC ......... H04N 21/2362; H04N 21/26283; H04N 21/4307; H04N 21/835; H04N 21/462; H04N 21/4345; H04N 21/8173; H04N 21/6175; H04N 21/4348; H04N 5/4401; H04N 5/44; H04N 7/025
USPC ................. 725/50, 110, 132, 136, 140, 135; 348/553
See application file for complete search history.

(56) References Cited

U.S. PATENT DOCUMENTS

| | | | |
|---|---|---|---|
| 7,930,755 B1 | 4/2011 | Miller | |
| 9,414,002 B2* | 8/2016 | Kitazato | ................. H04N 5/44 |
| 2005/0015802 A1 | 1/2005 | Masson | |
| 2007/0220564 A1 | 9/2007 | Yano | |
| 2008/0145026 A1 | 6/2008 | Shimada | |
| 2008/0222674 A1 | 9/2008 | Wang | |
| 2009/0217316 A1 | 8/2009 | Gupta | |
| 2009/0268806 A1 | 10/2009 | Kim et al. | |
| 2010/0134701 A1* | 6/2010 | Eyer | .................... H04N 21/235 |
| | | | 348/731 |
| 2010/0186059 A1 | 7/2010 | Suh et al. | |
| 2010/0289894 A1 | 11/2010 | Kondo | |
| 2011/0177775 A1* | 7/2011 | Gupta | .................... H04H 20/93 |
| | | | 455/3.06 |
| 2011/0292284 A1 | 12/2011 | Lee et al. | |
| 2011/0302611 A1 | 12/2011 | Eyer | |
| 2011/0307920 A1 | 12/2011 | Blanchard et al. | |
| 2012/0050620 A1* | 3/2012 | Kitazato | .............. H04N 21/236 |
| | | | 348/723 |
| 2013/0132999 A1 | 5/2013 | Pandey | |
| 2013/0191860 A1 | 7/2013 | Kitazato et al. | |
| 2013/0268631 A1 | 10/2013 | Suh et al. | |
| 2013/0291050 A1* | 10/2013 | Kim | ................... H04N 21/2362 |
| | | | 725/118 |
| 2015/0229988 A1* | 8/2015 | Kim | ..................... H04N 21/235 |
| | | | 725/41 |
| 2016/0301977 A1* | 10/2016 | Kitazato | .................. H04N 5/44 |

FOREIGN PATENT DOCUMENTS

| | | |
|---|---|---|
| CN | 102301734 A | 12/2011 |
| CN | 102308574 A | 1/2012 |
| JP | 2005-510145 | 4/2005 |
| JP | 2011-41242 | 2/2011 |
| JP | 2011-066556 | 3/2011 |
| JP | 2012-23477 | 2/2012 |

OTHER PUBLICATIONS

Combined Chinese Office Action and Search Report dated Dec. 27, 2016 in Patent Application No. 201380007399.X (with English Translation).
Japanese Office Action dated Feb. 28, 2017 in Patent Application No. 2013-557473 (with English Translation).
Japanese Office Action dated Jun. 27, 2017 in Patent Application No. 2013-557473 (with English Translation).
Mexican Office Action dated May 14, 2015 in Patent Application No. MX/a/2014/009267 (without English Translation).
Mexican Office Action dated Oct. 6, 2015 in Patent Application No. MX/a/2014/009267 (without English Translation).

* cited by examiner

FIG. 7

```
<xs:schema xmlns:xs="http://www.w3.org/2001/XMLSchema" xmlns:fl="http://www.example.com/flute" targetNamespace="http://www.example.com/flute" elen
 <xs:element name="FDT-Instance">
  <xs:complexType>
   <xs:sequence>
    <xs:element name="File" maxOccurs="unbounded">
     <xs:complexType>
      <xs:attribute name="Content-Location" type="xs:anyURI" use="required"/>
      <xs:attribute name="TOI" type="xs:positiveInteger" use="required"/>
      <xs:attribute name="Content-Length" type="xs:unsignedLong" use="optional"/>
      <xs:attribute name="Transfer-Length" type="xs:unsignedLong" use="optional"/>
      <xs:attribute name="Content-Type" type="xs:string" use="optional"/>
      <xs:attribute name="Content-Encoding" type="xs:string" use="optional"/>
      <xs:attribute name="Content-MD5" type="xs:base64Binary" use="optional"/>
      <xs:attribute name="FEC-OTI-FEC-Encoding-ID" type="xs:unsignedLong" use="optional"/>
      <xs:attribute name="FEC-OTI-FEC-Instance-ID" type="xs:unsignedLong" use="optional"/>
      <xs:attribute name="FEC-OTI-Maximum-Source-Block-Length" type="xs:unsignedLong" use="optional"/>
      <xs:attribute name="FEC-OTI-Encoding-Symbol-Length" type="xs:unsignedLong" use="optional"/>
      <xs:attribute name="FEC-OTI-Max-Number-of-Encoding-Symbols" type="xs:unsignedLong" use="optional"/>
      <xs:anyAttribute processContents="skip"/>
     </xs:complexType>
    </xs:element>
    <xs:attribute name="Expires" type="xs:string" use="required"/>
    <xs:attribute name="Complete" type="xs:boolean" use="optional"/>
    <xs:attribute name="Content-type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:anyAttribute processContents="skip"/>
   </xs:sequence>
  </xs:complexType>
 </xs:element>
</xs:schema>
```

FIG. 9

```
<?xml version="1.0" encoding="UTF-8"?>
<FDT-Instance xmlns:xsi="http://www.w3.org/2001/XMLSchema-instance"
 xmlns:fl="http://www.example.com/flute"
 xsi:schemaLocation="http://www.example.com/flute-fdt.xsd" Expires="2890842807">
<File
Content-Location="http://www.example.com/menu/tracklist.html"
Content-Linkage="id1"
TOI="1"
Content-Type="text/html"/>
<File
Content-Location="http://www.example.com/tracks/track1.mp3"
Content-Linkage="id2"
TOI="2"
Content-Length="6100"
Content-Type="audio/mp3"
Content-Encoding="gzip"
Content-MD5="+VP5IrWploFkZWc11iLDdA=="
Some-Private-Extension-Tag="abc123"/>
</FDT-Instance>
```

FIG.12

| item | description |
|---|---|
| program_id(Ch-ID) | The unique ID for the target program. Provider can define it freely. |
| media_time (MT) | The time stamp of the target time position of the program. |
| domain_name (URL) | The domain name of the provider's server (which TPT files are located) |

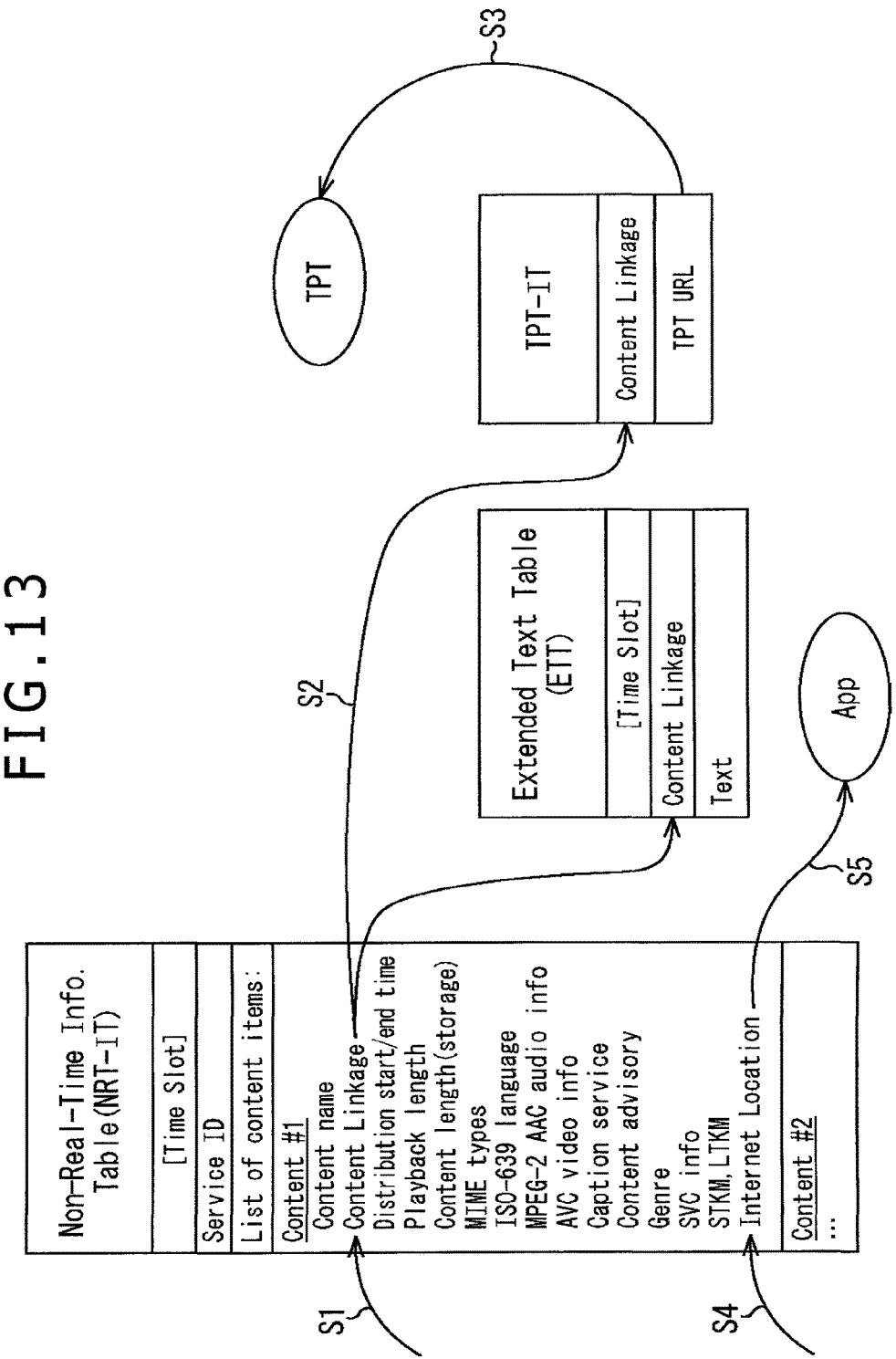

FIG.14

| Element/Attribute(with@) | | | | | Number to be permitted | Description & Value |
|---|---|---|---|---|---|---|
| tpt | | | | | | |
| | @id | | | | 1 | domain_name/Program_id |
| | @type | | | | 1 | "static", "dynamic" |
| | @version | | | | 0..1 | TPT version number |
| | @updating_time | | | | 0..1 | Supposed TPT updating duration(only for type="dynamic") |
| | @present_following | | | | 0..1 | "present" "following" |
| | @end_mt | | | | 0..1 | The end time for TPT time scope |
| | @expire_date | | | | 0..1 | Expire date for caching TPT document. (only for type="static") |
| | command | | | | 1..N | |
| | | @id | | | 1 | Equal to Trigger_id |
| | | @start_time | | | 0..1 | The start time of the command valid period |
| | | @end_time | | | 0..1 | The end time of the command valid period |
| | | @destination | | | 0..1 | Device type<br>"receiver":receiver itself<br>"external_1"external device type1<br>"external_2" external device type2 |
| | | @action | | | 1 | Action<br>"execute" "register" "suspend" "terminate" "event" |
| | | event | | | 0..1 | Description for event |
| | | | @id | | 1 | Event ID |
| | | | data | | 0..1 | Embedded data |
| | | diffusion | | | 0..1 | Randomized diffusion of command execution timing |
| | | | @rate | | 1 | Timing number of diffusion |
| | | | @range | | 1 | Diffusion time range |
| | | | @period | | 1 | Period for applying command diffusion(from start_time) |

FIG. 22

| Item | explanation |
|---|---|
| Trigger_id | IDENTIFICATION OF TRIGGER INFORMATION HAVING THE SAME CONTENTS |
| Protocol_version | FIXED TO 0 (SCHEME VERSION NUMBER) |
| Command_code | VALUE INDICATIVE OF ANY ONE OF COMMAND; Register, Execute, Inject, Event, Suspend, AND Terminate |
| Trigger_validity | PROBABILITY IN WHICH TRIGGER INFORMATION BECOMES VALID |
| App_id | APPLICATION ID |
| App_type | SCHEME TYPE OF APPLICATION |
| Trigger_target | WRITE SERVICE ID AND CONTENT LINKAGE |
| App_life_scop | APPLICATION OPERATION SCOPE |
| Presistent_priority | PRIORITY OF ACQUIRING AND HOLDING APPLICATION |
| Expire_date | EXPIRATION DATE OF HOLDING |
| Event_id | ID OF EVENT WRITTEN TO TARGET APPLICATION |
| Event_Embedded_data | DATA TO BE TRANSFERRED TO APPLICATION AT EVENT FIRING |

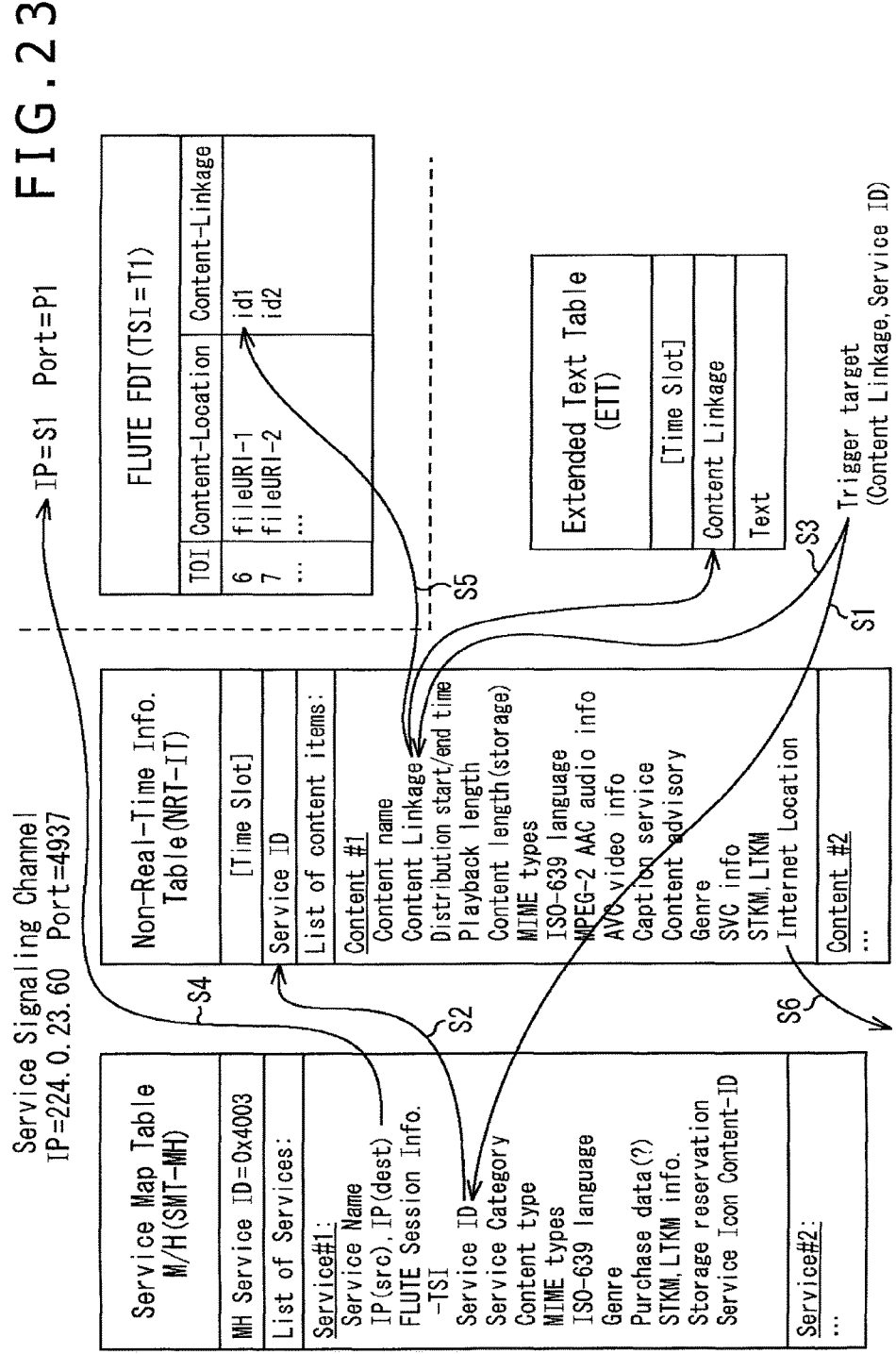

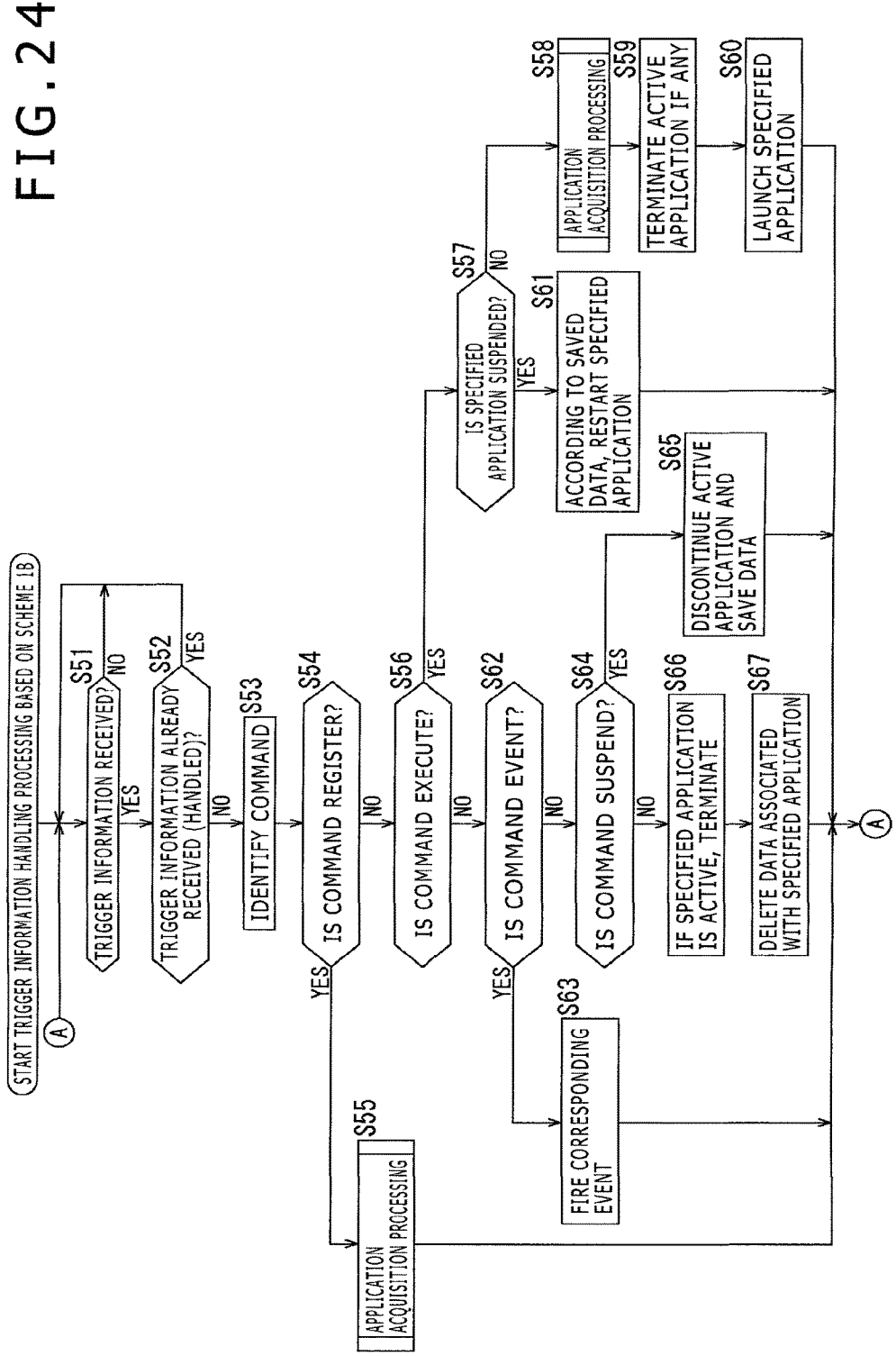

FIG. 27

| Element/Attribute (with@) | | Number to be permitted | Description & Value |
|---|---|---|---|
| tpt | | | |
| | @id | 1 | domain_name/Program_id |
| | @type | 1 | "static", "dynamic" |
| | @version | 0..1 | TPT version number |
| | @updating_time | 0..1 | Supposed TPT updating duration(only for type="dynamic") |
| | @present_following | 0..1 | "present" "following" |
| | @end_mt | 0..1 | The end time for TPT time scope |
| | @expire_date | 0..1 | Expire date for caching TPT document. (only for type="static") |
| command | | 1..N | |
| | @id | 1 | Equal to Trigger_id |
| | @start_time | 0..1 | The start time of the command valid period |
| | @end_time | 0..1 | The end time of the command valid period |
| | @destination | 0..1 | Device type "receiver":receiver itself "external_1" external device type1 "external_2" external device type2 |
| | @action | 1 | Action "execute" "register" "suspend" "terminate" "event" |
| application | | 1 | Description for target App |
| | @id | 1 | App ID (including Content linkage, Service ID) |
| event | | 0..1 | Description for event |
| | @id | 1 | Event ID |
| | data | 0..1 | Embedded data |
| diffusion | | 0..1 | Randomized diffusion of command execution timing |
| | @rate | 1 | Timing number of diffusion |
| | @range | 1 | Diffusion time range |
| | @period | 1 | Period for applying command diffusion(from start_time) |

FIG. 34

| Element/Attribute(with@) | | | Number to be permitted | Description & Value |
|---|---|---|---|---|
| tpt | | | | |
| | @id | | 1 | domain_name/Program_id |
| | @type | | 1 | "static", "dynamic" |
| | @version | | 0..1 | TPT version number |
| | @updating_time | | 0..1 | Supposed TPT updating duration (only for type="dynamic") |
| | @present_following | | 0..1 | "present" "following" |
| | @end_mt | | 0..1 | The end time for TPT time scope |
| | @expire_date | | 0..1 | Expire date for caching TPT document. (only for type="static") |
| | capability | | 0..N | Receiver required capability |
| | | @essential | 0..1 | no:not essential yes:essential |
| | command | | 1..N | |
| | | @id | 1 | Equal to Trigger_id |
| | | @start_time | 0..1 | The start time of the command valid period |
| | | @end_time | 0..1 | The end time of the command valid period |
| | | @destination | 0..1 | Device type<br>"receiver":receiver itself<br>"external_1" external device type1<br>"external_2" external device type2 |
| | | @action | 1 | Action "execute" "register" "suspend" "terminate" "event" |
| | application | | 1 | Description for target App |
| | | @id | 1 | App ID (including Content linkage, Service ID) |
| | event | | 1 | Description for event |
| | | @id | 1 | Event ID |
| | | data | 0..1 | Embedded data |
| | diffusion | | 0..1 | Randomized diffusion of command execution timing |
| | | @rate | 1 | Timing number of diffusion |

FIG. 35

```
<tpt id=xbc.com/1 type="static" expire_date="2011-01-21">
  <capability essential="no">flute</capability>
  <capability essential="yes">avc_40</capability>
  <command id=1 start_time=0, end_time=600, destination="receiver" action="register">
    <application id="1" type="html" url="xxx.com/yyy1" expire_date="2011-01-21"/>
  </command>
  <command id=2 start_time=600, end_time=3500, destination="receiver" action="execute">
    <application id="1" type="html" url="xxx.com/yyy1" expire_date="2011-01-21"/>
  </command>
  <diffusion rate=10 range=60 period=600/>
  <command id=3 start_time=1800, end_time=2000, destination="receiver" action="event">
    <application id="1"/>
    <event id="event1">
      <data>zzzzzz·····z</data>
    </event>
  </command>
  <command id=4 start_time=2400, end_time=2520, destination="receiver" action="suspend">
    <application id="1"/>
  </command>
  <command id=5 start_time=3500, end_time=3600, destination="receiver" action="terminate">
    <application id="1"/>
  </command>
  <command id=12 start_time=2400, end_time=2520, destination="receiver" action="execute">
    <application id="2" type="html" url="xxx.com/yyy2" expire_date="2011-01-22"/>
  </command>
  <command id=15 start_time=2520, end_time=3600, destination="receiver" action="terminate">
    <application id="2"/>
  </command>
</tpt>
```

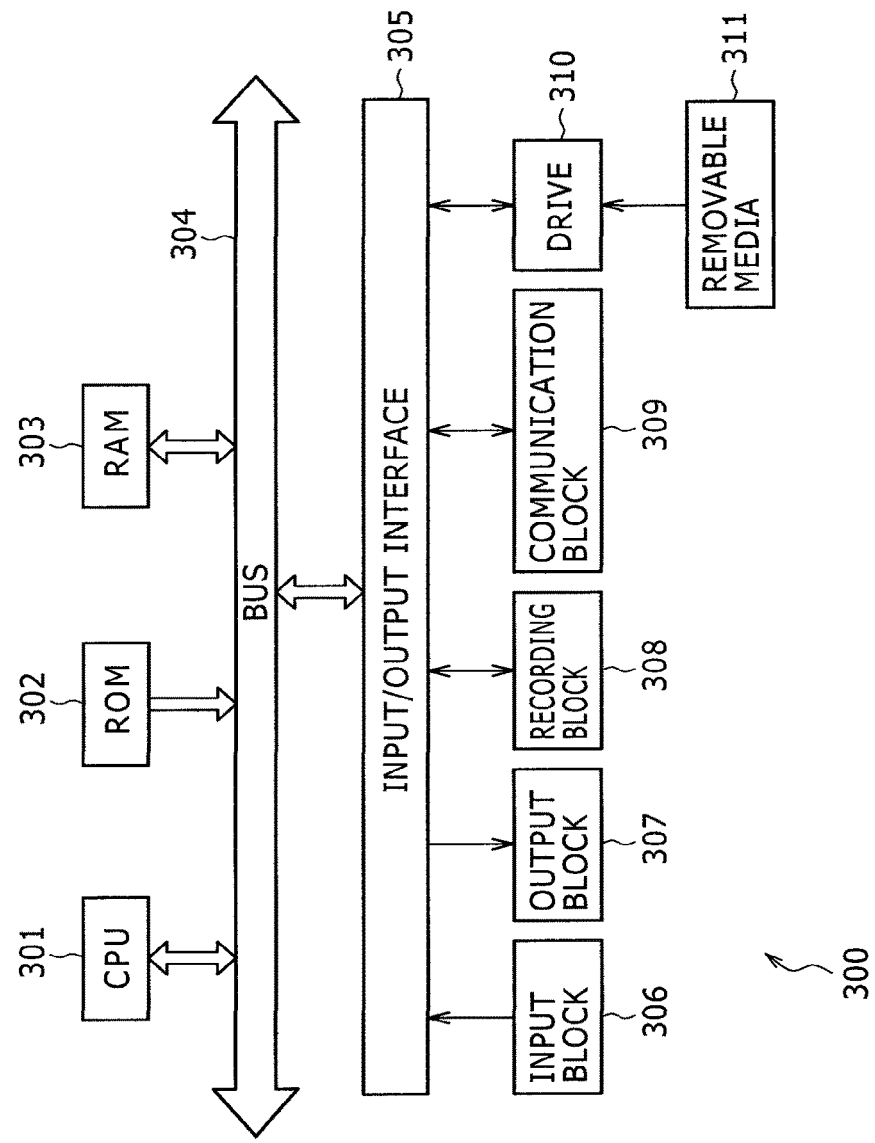

RECEIVING APPARATUS, RECEIVING METHOD, AND PROGRAM

CROSS-REFERENCE TO RELATED APPLICATION

This application is a continuation of U.S. patent application Ser. No. 13/753,591 filed Jan. 30, 2013, which claims the benefit of priority of Provisional Application Ser. No. 61/596,013, filed on Feb. 7, 2012, the entire contents of which is incorporated herein by reference.

BACKGROUND

The present technology relates to a receiving apparatus, a receiving method, and a program and, more particularly, to a receiving apparatus, a receiving method, and a program which are configured to provide application programs to be executed in response to AV (audio/video) content.

With receiving apparatuses configured to receive digital television broadcast signals, the popularization of services is expected that provide application programs to be executed in response to television programs distributed by the broadcast wave or a server connected to the Internet. Therefore, technologies for realizing these services have been examined (for example, refer to Japanese Patent Laid-open No. 2011-66556).

SUMMARY

Currently, however, technological schemes configured to provide application programs distributed on the basis of the broadcast wave or via the Internet have not been established.

Therefore, the present technology addresses the above-identified and other problems and solves the addressed problems by providing an application programs which is to be executed in response to AV content.

According to one mode of the present technology, there is provided a receiving apparatus. The receiving apparatus has a receiving block configured to receive AV content transmitted by a broadcast wave; a trigger acquisition block configured to acquire trigger information for operating an application program to be executed in response to the received AV content; an application acquisition block configured, if a command obtained from the acquired trigger information is indicative of acquisition of the application program, to acquire any one of the application program transmitted by the broadcast wave and the application program distributed via the Internet; and a control block configured to control an operation of the acquired application program in accordance with a command obtained from the acquired trigger information.

The receiving apparatus further has a feature quantity extraction block configured to extract a feature quantity from data of the received AV content. The trigger acquisition block acquires the trigger information corresponding to an identification result of the AV content identified by use of the extracted feature quantity.

The receiving apparatus further has a table acquisition block configured to acquire a relation table in which a command for controlling an operation of the application program is related with a valid time of the command. The control block controls an operation of the application program on the basis of the acquired relation table, if a time indicative of a progression of the AV content obtained from the trigger information satisfies a predetermined valid condition relative to the valid time of the command, in accordance with the valid command.

The receiving apparatus further has an acquisition-destination information acquisition block configured to acquire first acquisition-destination information indicative of an acquisition destination of the relation table and second acquisition-destination information indicative of an acquisition destination of the application program on the basis of the trigger information. The table acquisition block acquires the relation table on the basis of the first acquisition-destination information and the application acquisition block acquiring the application program on the basis of the second acquisition-destination information.

In the receiving apparatus, the second acquisition-destination information has any one of a same configuration as that of an NRT-IT (Non-Real Time-Information Table) for use in transmitting NRT content of an NRT service by the broadcast wave and a configuration corresponding thereto, the second acquisition-destination information being provided from an information processing apparatus connected to the Internet.

In the receiving apparatus, the trigger information is transmitted by the broadcast wave and the trigger acquisition block acquires the trigger information transmitted by the broadcast wave.

In the receiving apparatus, the control block controls an operation of the application program acquired in accordance with a command included in the trigger information acquired from the broadcast wave.

In the receiving apparatus, the application program is transmitted as NRT content of an NRT service by use of a FLUTE (File Delivery over Unidirectional Transport) session and the application acquisition block references an FDT (File Delivery Table) identified by an SMT (Service Map Table) and an NRT-IT on the basis of identification information of the NRT service included in the trigger information and the NRT content, thereby acquiring the application program transmitted by a FLUTE session.

In the receiving apparatus, if the application program transmitted by a FLUTE session cannot be acquired, the application acquisition block acquires the application program on the basis of third acquisition-destination information indicative of an acquisition destination of the application program distributed by the Internet written to the NRT-IT.

The receiving apparatus further has an acquisition-destination information acquisition block configured to acquire second acquisition-destination information indicative of an acquisition destination of the application program on the basis of the relation table. The table acquisition block acquires the relation table on the basis of first acquisition-destination information indicative of an acquisition destination of the relation table obtained from the trigger information. The application acquisition block acquires the application program on the basis of the second acquisition-destination information.

In the receiving apparatus, the control block checks if the receiving apparatus has a performance necessary for operating the application program acquired on the basis of the acquired relation table and, if the receiving apparatus is found to have no performance for operating the application program, the table acquisition block acquires a relation table different from the acquired relation table.

In the above-mentioned receiving apparatus, the table acquisition block acquires the relation table in according with a preset acquisition priority of the relation table.

The receiving apparatus further has a table acquisition block configured to acquire the relation table on the basis of first acquisition-destination information indicative of an acquisition destination of a relation table in which a command for controlling an operation of the application program acquired from the trigger information is related with a valid time of the command. The control block controls an operation of the application program, if a time indicative of a progression of the AV content acquired from the trigger information satisfies a predetermined valid condition relative to a valid time of the command on the basis of the acquired relation table, in accordance with the valid command.

In the receiving apparatus, the application program is transmitted as NRT content of an NRT service using a FLUTE session and, on the basis of identification information of the NRT service written to the relation table and the NRT content, the application acquisition block references an FDT identified by an SMT and an NRT-IT to acquire the application program transmitted by a FLUTE session.

In the receiving apparatus, if the application program transmitted by a FLUTE session cannot be acquired, the application acquisition block acquires the application program on the basis of third acquisition-destination information indicative of an acquisition destination of the application program distributed via the Internet written to the NRT-IT.

In the receiving apparatus, the control block checks if the receiving apparatus has a performance necessary for operating the application program acquired on the basis of the acquired relation table and, if the receiving apparatus is found to have no performance for operating the application program, the table acquisition block acquires a relation table different from the acquired relation table.

In the receiving apparatus, the table acquisition block acquires the relation table in according with a preset acquisition priority of the relation table.

In the receiving apparatus, the command is indicative of any one of processing operations of acquisition/registration, acquisition/launch, event-fire, suspension, and termination of the application program and the control block controls any one of processing operations of acquisition/registration and acquisition/launch of the application program and any one of processing operations of event-fire, suspension, and termination of the application program that is active.

A receiving method or a program in one mode of the present technology correspond to the receiving apparatus of one mode of the present technology described above.

In the receiving apparatus, the receiving method, and the program of one mode of the present technology, AV content transmitted by a broadcast wave is received, trigger information for operating an application program to be executed in response to the received AV content is acquired, and, if a command obtained from the acquired trigger information is indicative of the acquisition of the application program, the application program transmitted by the broadcast wave or the application program distributed via the Internet is acquired, and an operation of the acquired application program is controlled in accordance with the command obtained from the acquired trigger information.

According to one mode of the present technology, application programs to be executed in response to AV content can be provided.

BRIEF DESCRIPTION OF THE DRAWINGS

FIG. 7 is a diagram illustrating one example of a schema of FDT;

FIG. 9 is a diagram illustrating one example of writing of an FDT Instance;

FIG. 12 is a diagram illustrating one example of items of information included in trigger information;

FIG. 13 is a diagram illustrating one example of a table that is obtained via the Internet;

FIG. 14 is a diagram illustrating one example of a format of TPT of scheme 1;

FIG. 20 is a diagram illustrating a concept of transmitting trigger information as included in a PCR packet of a TS;

FIG. 22 is a diagram illustrating items included in trigger information;

FIG. 23 is a diagram illustrating one example of tables that are transmitted by broadcast wave;

FIG. 24 is a flowchart indicative of trigger information handling processing of scheme 1B;

FIG. 27 is a diagram illustrating one example of a table that is obtained via the Internet;

FIG. 34 is a diagram illustrating one example of a format of TPT;

FIG. 35 is a diagram illustrating one example of description of TPT;

FIG. 38 is a block diagram illustrating one example of a configuration of a computer.

DETAILED DESCRIPTION OF THE PREFERRED EMBODIMENTS

Embodiments of the present technology will be described with reference to the accompanying drawings.

The First Embodiment

[Basic Concept]

Figure 1:
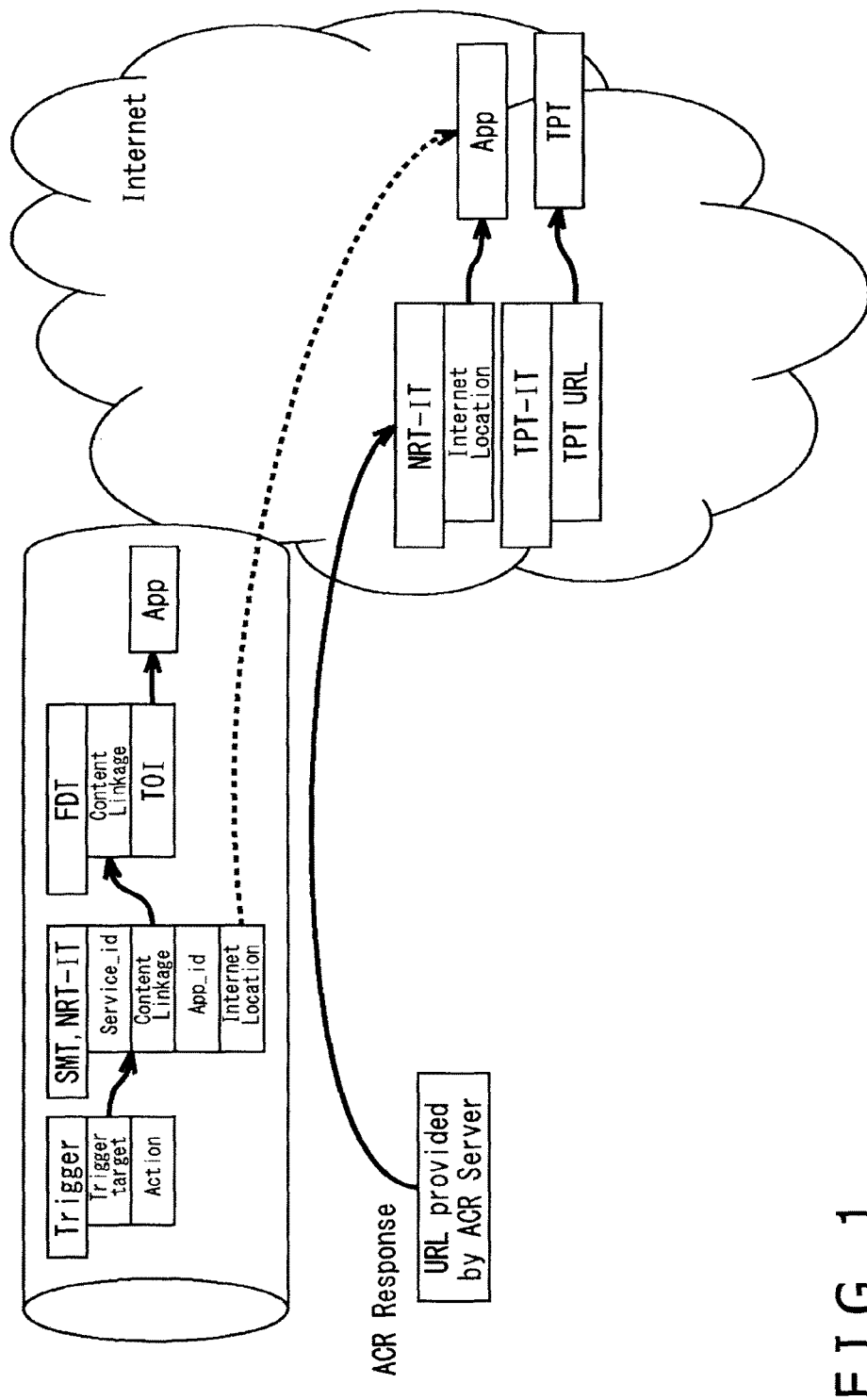
FIG. 1 is a schematic diagram illustrating a basic concept of present technology and practiced as first embodiment.

FIG. 1 shows a basic concept of the present technology practiced as a first embodiment.

The present technology provides a data broadcast application that is distributed by broadcast wave or from a server connected to the Internet to a receiver. The data broadcast application (App) herein denotes an application program that is executed in response to AV content, such as a television program or CM.

In the first embodiment, an operation of a data broadcast application is controlled in accordance with a command identified on the basis of trigger information (ACR Response) and TPT (Trigger Parameter Table) in accordance with identification results of ACR identification processing and is controlled on the basis of a command obtained from trigger information (Trigger) transmitted as included in a broadcast wave. Trigger information is information for operating a data broadcast application.

The following describes a method of getting a data broadcast application from an application server on the Internet if the operation of the data broadcast application is controlled in accordance with a command identified by the trigger information and TPT in accordance with the identification results of ACR identification processing.

ACR (Automatic Content Recognition) denotes a technology for identifying AV content by use of feature quantities obtained from the AV content. ACR identification processing is executed by an ACR server on the Internet. TPT is a correlation table in which the commands for controlling a data broadcast application are related with the valid periods of these commands. Each command valid period is determined in accordance with the progression of AV content. TPT is provided by a TPT server on the Internet.

On the Internet, a file server is also arranged for providing an NRT-IT (NRT Information Table) and a TPT-IT (TPT Information Table). The NRT-IT has a configuration similar to or corresponding to an NRT-IT that is transmitted by broadcast wave to be described later. For an Internet location, the URL (Uniform Resource Locator) of the application server is specified. In addition, the URL of the TPT server is specified in the TPT-IT.

On the basis of trigger information (ACR response) from the ACR server, the receiver accesses the file server to acquire the NRT-IT and the TPT-IT. In addition, on the basis of the TPT-IT, the receiver accesses the TPT server to acquire a TPT. On the basis of the obtained TPT, the receiver identifies a command corresponding to the trigger information. Next, in accordance with the identified command, the receiver accesses the application server to acquire a data broadcast application on the basis of the NRT-IT.

Figure 2:
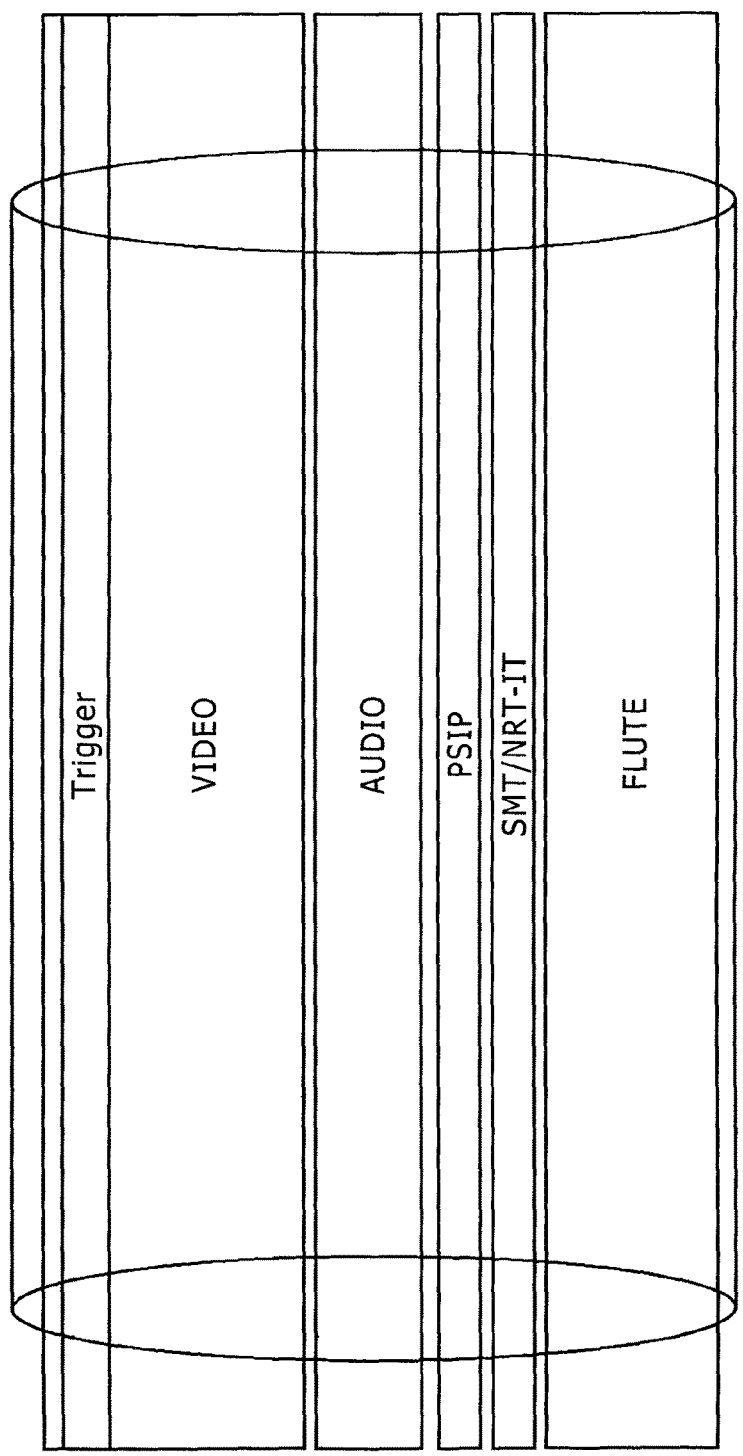
FIG. 2 is a schematic diagram illustrating a configuration of a broadcast stream.

The following describes a method of obtaining a data broadcast application that is transmitted by broadcast wave if the operation of the data broadcast application is controlled on the basis of the trigger information transmitted as included in broadcast wave. In accordance with a command obtained from the trigger information, the receiver tries to acquire the data broadcast application transmitted by broadcast wave. FIG. 2 shows a configuration of a broadcast stream.

The broadcast stream is made up of PSIP, SMT, NRT-IT, and FLUTE in addition to a video stream and an audio stream. Trigger information is inserted in a video stream and an audio stream.

PSIP (Program and System Information Protocol) is used to transmit information, such as control information and program information necessary for selecting and receiving a particular channel. On the basis of information obtained from PSIP, the receiver generates a list of NRT content provided by an NRT service, for example. The NRT (Non-RealTime) service herein denotes a service that once stores NRT content transmitted by NRT broadcast into a storage of the receiver and then reproduces the stored NRT content.

SMT (Service Map Table) is indicative of attribute information of a service level of the NRT service included in a transport stream. NRT-IT (NRT Information Table is indicative of attribute information of a content level included in one NRT service. SMT and NRT-IT are included in SSC (Service Signaling Channel) transmitted by a fixed IP address and UDP port in a transport stream. Here, 224.0.23.60 is used for the IP address and 4937 is used for the port number.

By referencing SMT and NRT-IT, the receiver can identify an acquisition location (a time location for example) in a broadcast stream of desired NRT content.

Figure 3:
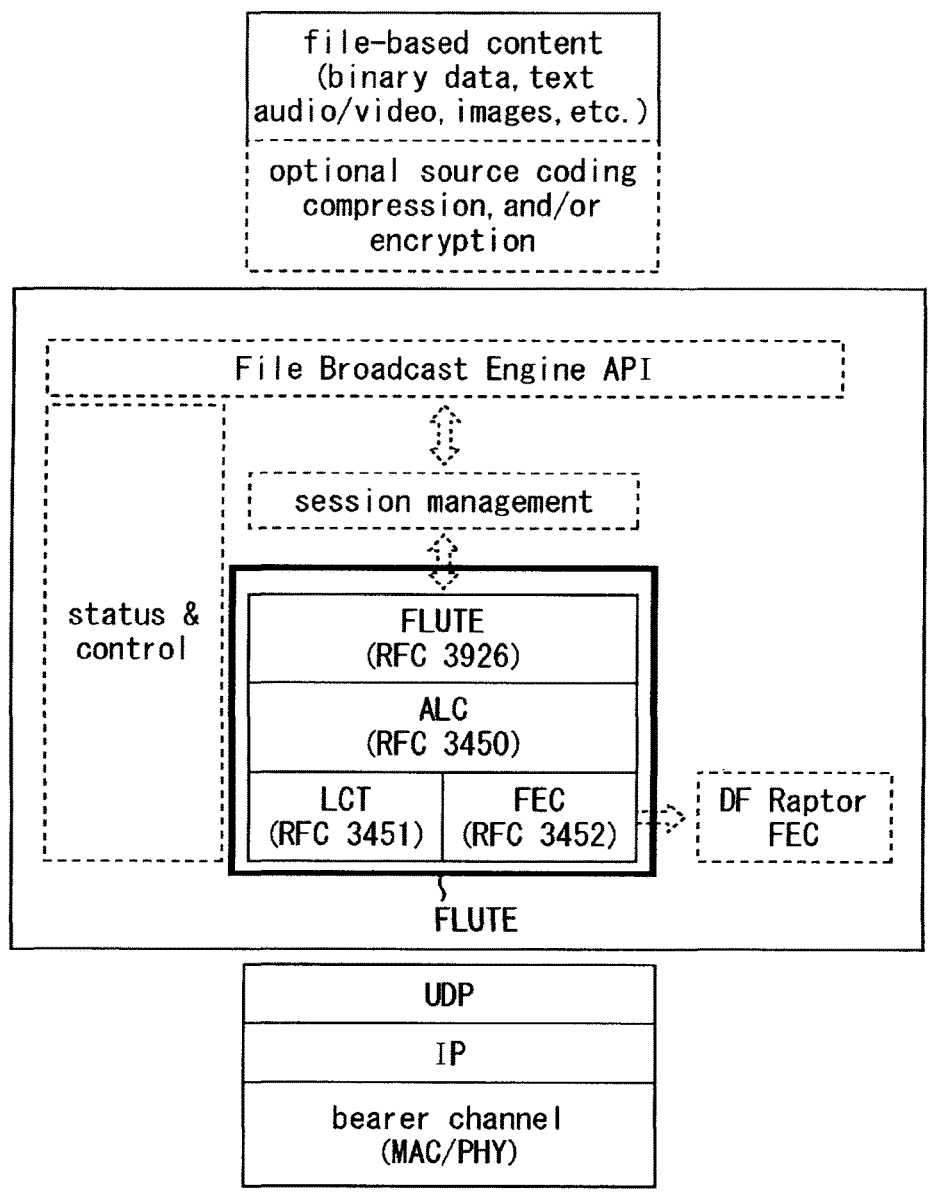
FIG. 3 is a schematic diagram illustrating a protocol stack of FLUTE.

FLUTE (File Delivery over Unidirectional Transport) is a protocol for executing session management of a file transmitted by broadcast wave. As shown in FIG. 3, FLUTE is located at the upper layer of each of the physical layer that is the bottom layer and the TS (Transport), IP (Internet Protocol), and UDP (User Datagram Protocol) layers over the physical layer. Over FLUTE, various files, such as NRT content, are located. To be more specific, in NRT broadcast, an IP packet with a UDP port in IP communication specified is transmitted to establish a session by FLUTE. By this session by FLUTE, files making up NRT content for example are identified.

Further, as shown in FIG. 3, FLUTE is a generic name of such FLUTE protocol stacks as FEC (Forward Error Correction), LCT (Layered Coding Transport), ALC and (Asynchronous Layered Coding). It should be noted that the details of FLUTE are specified as RFC3926. The details of FEC, LCT, and ALC are also specified as RFC3452, RFC3451, and RFC3450, respectively. It should be noted, however, that FEC is applied to enhance data loss resistance at the time of mobile reception for example with a mobile terminal, so that FEC need not always be applied at the time of reception with a fixed terminal. For an FEC algorithm, any scheme may be applied.

It should be noted that FLUTE manages a file to be transmitted as one object by TOI (Transport Object Identifier). In addition, FLUTE manages a set of objects as one session by TSI (Transport Session Identifier).

Figure 4:
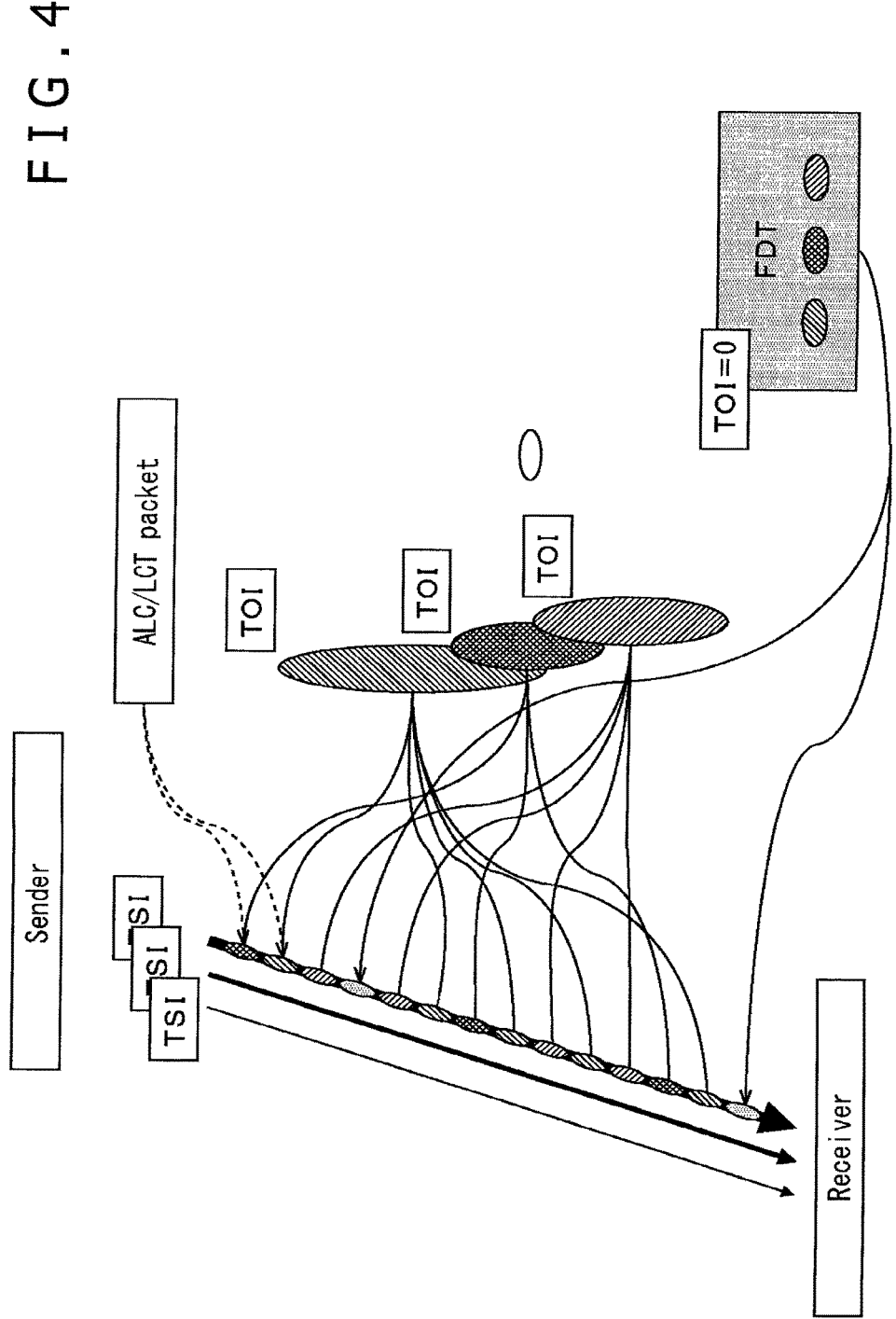
FIG. 4 is a schematic diagram illustrating session management by FLUTE.

FIG. 4 shows the session management to be executed by FLUTE.

Figure 5:
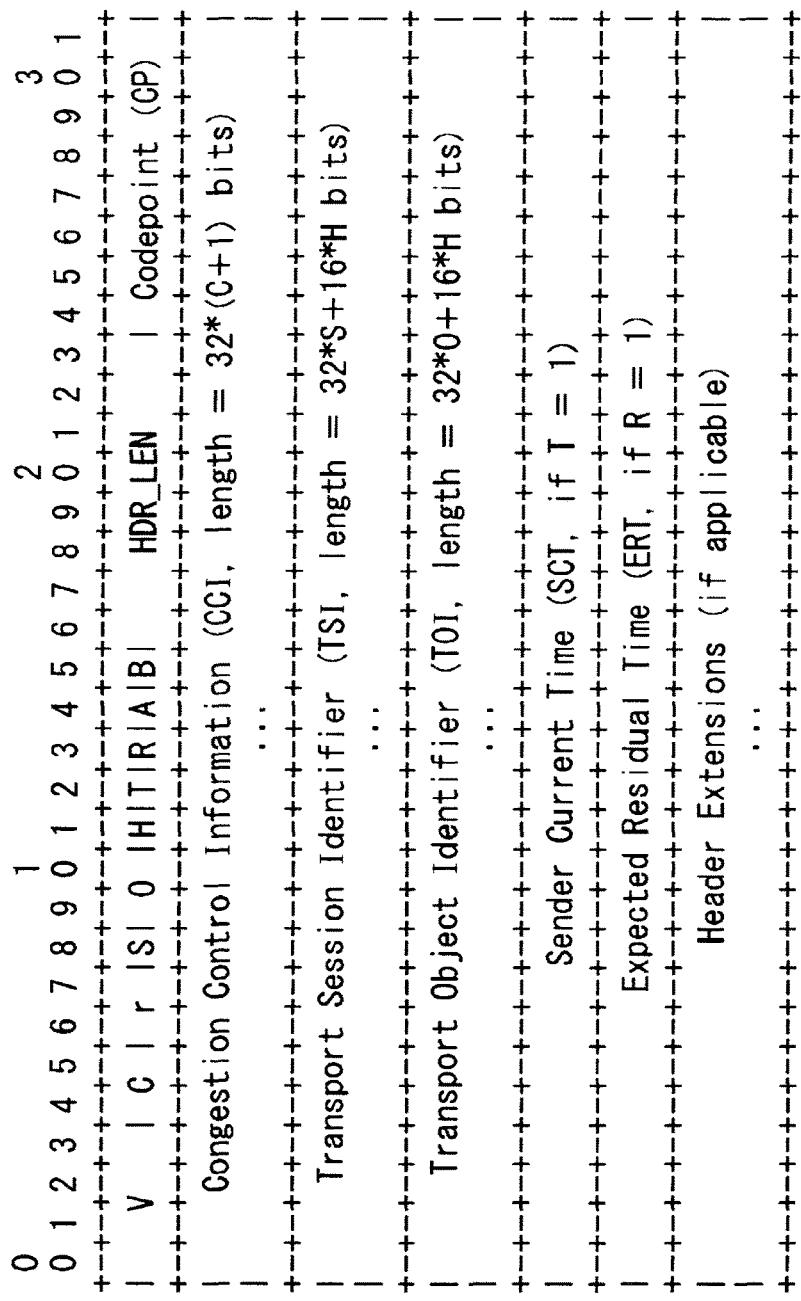
FIG. 5 is a diagram illustrating one example of a header format.

As shown in FIG. 4, each of the objects to be transmitted from a transmitter to a receiver is transmitted as stored in an IP packet attached with an ALC/LCT header for example. To this header, identification information of each session is written as Transport Session Identifier (TSI) as shown in FIG. 5. In addition, to this header, identification information of two or more objects to be transmitted for each session is written as Transport Object Identifier (TOI). Namely, with a session based on FLUTE, a particular file can be identified by two items of identification information, TSI and TOI.

Figure 6:
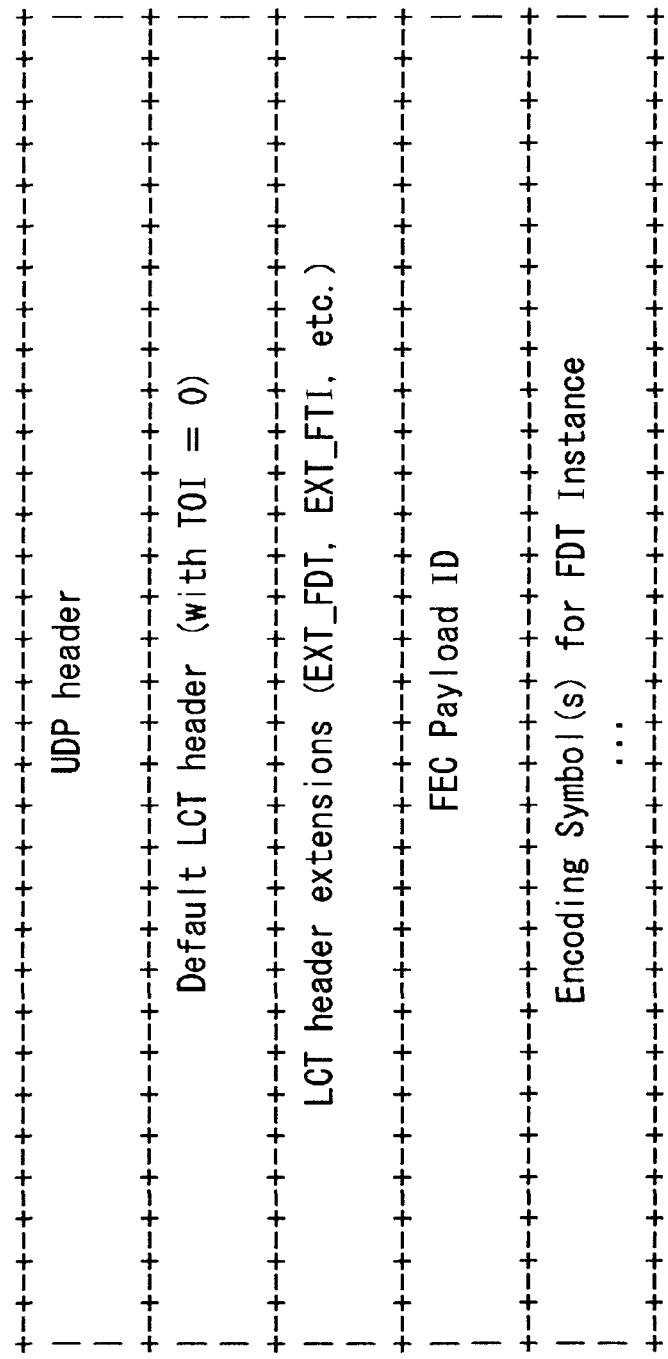
FIG. 6 is a diagram illustrating one example of a format of an FDT packet.
Figure 8:
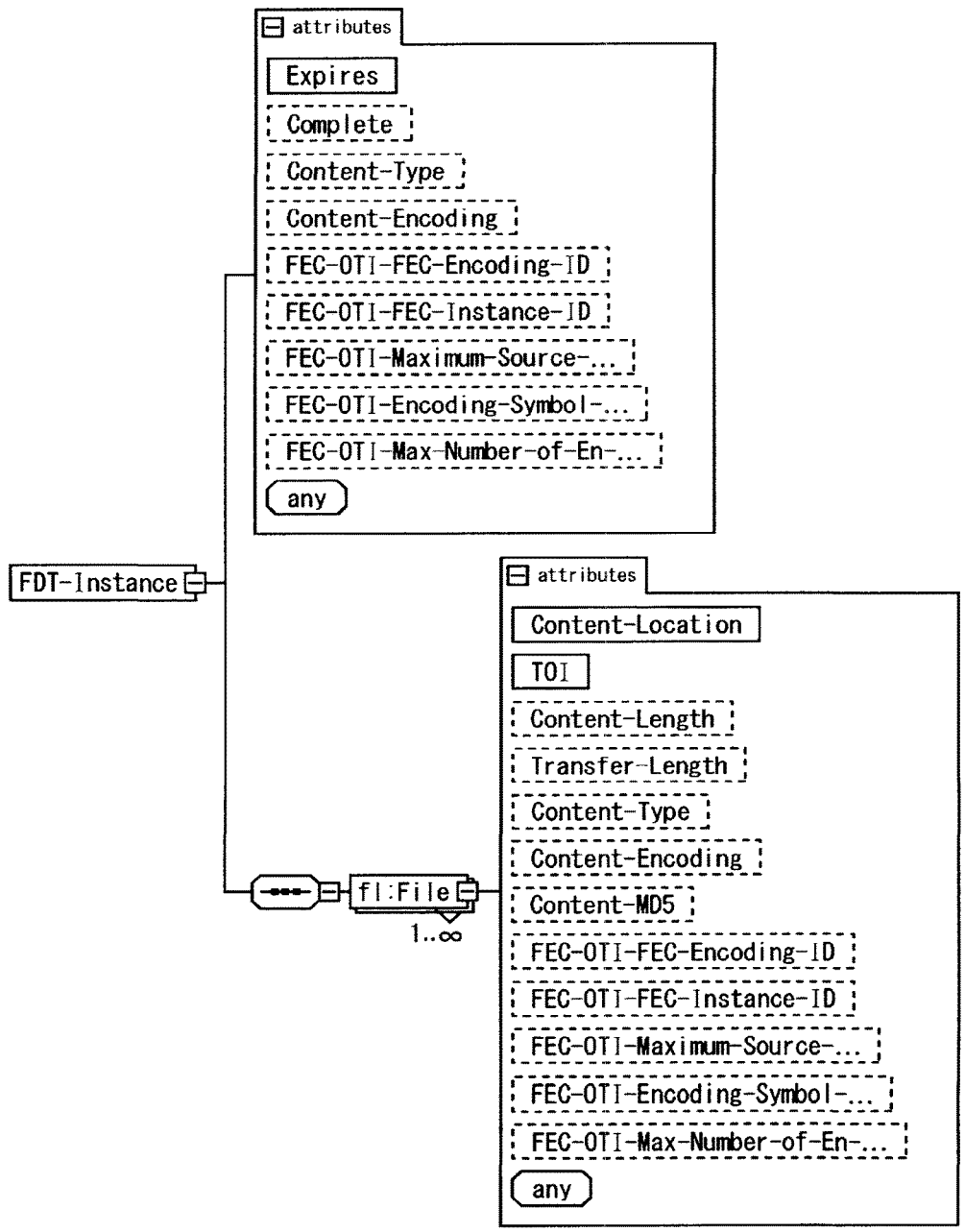
FIG. 8 is a diagram illustrating one example of a schema of FDT.

With a session based on FLUTE, FDT (File Delivery Table) for transmitting various kinds of attribute information of a file of NRT service is transmitted periodically. AS shown in FIG. 6, FDT is transmitted for each TSI as a file of TOI=0, index information for each TSI written to this FDT. In addition, FDT is transmitted by an FDT Instance that is an object for transmission FDT. Therefore, as shown in FIG. 6, an FDT Instance is stored in an FDT packet. It should be noted that for FDT schema, the information as shown in FIG. 7 and FIG. 8 is defined, for example.

Referring to FIG. 9, there is shown an description example of an FDT Instance. It should be noted that a method of description of an FDT Instance is not limited to the description example shown in FIG. 9.

As described above, NRT content is made up by two or more files in many cases, so that the receiver restores NRT content from two or more files by use of the index information written to FDT. Namely, the receiver can download NRT content by an IP packet included in a broadcast stream by use of a FLUTE session. With the present technology, each data broadcast application is transmitted by use of a FLUTE session as with a method in which NRT content is transmitted.

To be more specific, the receiver acquires each data broadcast application transmitted by broadcast wave by use of a FLUTE session. It should be noted, however, that a data broadcast application is basically transmitted by broadcast wave, but may not be obtained at the receiver side for some reasons. If this happens, the receiver accesses the application server via the Internet to acquire a data broadcast application provided by this application server.

Thus, the basic concept of the first embodiment of the present technology has been described.

[Exemplary Configuration of Broadcasting System]

Figure 10:
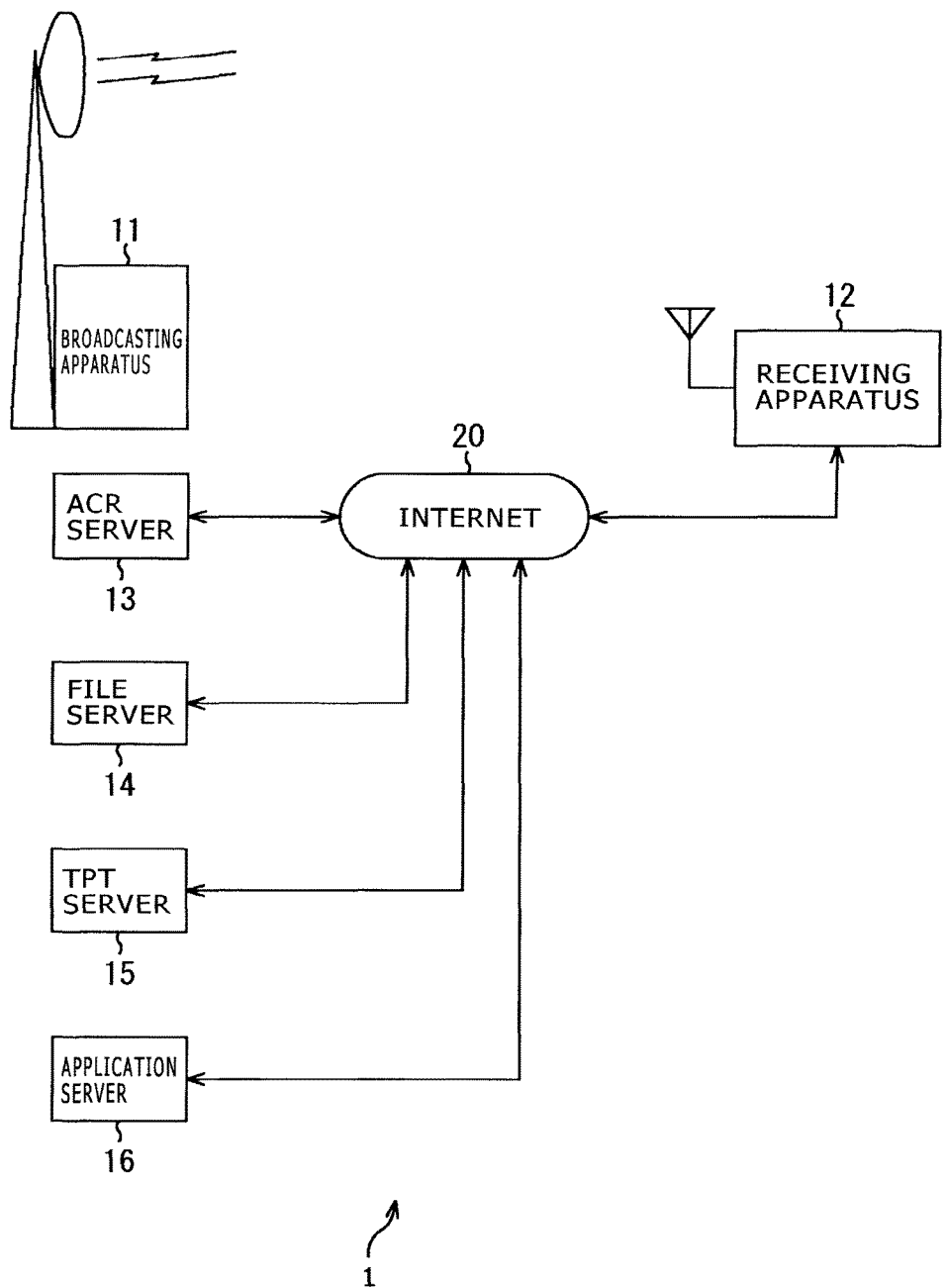
FIG. 10 is a schematic diagram illustrating an configuration of a broadcasting system applied with the disclosed technology practiced as one embodiment.

FIG. 10 shows a broadcasting system 1 practiced as the first embodiment. This broadcasting system 1 is made up of a broadcasting apparatus 11, a receiving apparatus 12, an ACR server 13, a file server 14, a TPT server 15, and an application server 16. The receiving apparatus 12, the ACR server 13, the file server 14, the TPT server 15, and the application server 16 are interconnected via the Internet 20.

The broadcasting apparatus 11 is configured to transmit a digital television broadcast signal (hereafter simply referred to as a broadcast signal) carrying AV content, such as a television program and a television CM.

The receiving apparatus 12 receives a broadcast signal transmitted from the broadcasting apparatus 11 to acquire the video and audio of AV content. The receiving apparatus 12 outputs the obtained video to a display and the obtained audio to a loudspeaker. It should be noted that the receiving apparatus 12 may be a standalone unit or incorporated in a television receiver or a video recorder, for example.

The receiving apparatus 12 receives periodically accesses the ACR server 13 via the Internet 20 for the inquiry of trigger information. At this time, a feature quantity (hereafter referred to also as finger print information) extracted from one or both of the video signal and the audio signal of AV content is transmitted to the ACR server 13.

The ACR server 13 is provided by a broadcast organization or other organizations that carry out television program broadcast by the broadcasting apparatus 11, for example. The ACR server 13 has a database in which feature quantities extracted from the video signal and the audio signal of given AV content are stored and executes AV content identification processing by use of the ACR technology in response to an inquiry from any receiving apparatus 12 connected to the Internet 20.

To be more specific, the ACR server 13 matches the finger print information received from the receiving apparatus 12 with this database to identify AV content. Then the ACR server 13 generates trigger information (ACR response) corresponding to the results of the identification. The ACR server 13 transmits the generated trigger information to the receiving apparatus 12 via the Internet 20.

In response to the trigger information received from the ACR server 13, the receiving apparatus 12 accesses the file server 14 via the Internet 20 to acquire NRT-IT and TPT-IT.

The file server 14 is provided by a broadcast organization or the like that carries out television program broadcast by the broadcasting apparatus 11 for example to manage files such as NRT-IT and TPT-IT. In response to an inquiry from the receiving apparatus 12, the file server 14 provides the NRT-IT and TPT-IT managed by the file server 14 to the receiving apparatus 12 via the Internet 20.

In response to the TPT-IT received from the file server 14, the receiving apparatus 12 accesses the TPT server TPT server 15 via the Internet 20 to acquire the TPT.

The TPT server 15 is provided by a broadcast organization or the like that carries out television program broadcast by the broadcasting apparatus 11 to manage the TPT. In response to an inquiry from the receiving apparatus 12, the TPT server 15 provides the TPT managed by the TPT server 15 to the receiving apparatus 12 via the Internet 20.

On the basis of the TPT obtained from the TPT server 15, the receiving apparatus 12 identifies a valid command if the time indicative of the progression of the AV content obtained from the trigger information is within a valid period or has passed a validity start time. Then, in response to the identified command and on the basis of the NRT-IT, the receiving apparatus 12 accesses the application server 16 via the Internet 20 to acquire a data broadcast application to control the operation thereof.

The application server 16 is provided by a broadcast organization or the like that carries out television program broadcast by the broadcasting apparatus 11 for example to manage the data broadcast application. In response to an inquiry from the receiving apparatus 12, the application server 16 provides the data broadcast application managed by the application server 16 to the receiving apparatus 12 via the Internet 20.

In addition, the broadcasting apparatus 11 transmits the trigger information for operating a data broadcast application to be executed in response to AV content by including the trigger signal in a broadcast signal. The trigger information is transmitted as inserted in the video signal or the audio signal of AV content or arranged in a broadcast signal transport stream.

The receiving apparatus 12 extracts the trigger information transmitted as included in a broadcast wave. In response to a command obtained from this trigger information, the receiving apparatus 12 acquires a data broadcast application transmitted by broadcast wave and controls the operation of the obtained data broadcast application. It should be noted, however, that, if a data broadcast application could not be obtained from the broadcast wave, then the receiving apparatus 12 accesses the application server 16 via the Internet 20 to acquire a data broadcast application.

The broadcasting system 1 is configured as described above.

[Exemplary Configuration of the Receiving Apparatus]

Figure 11:
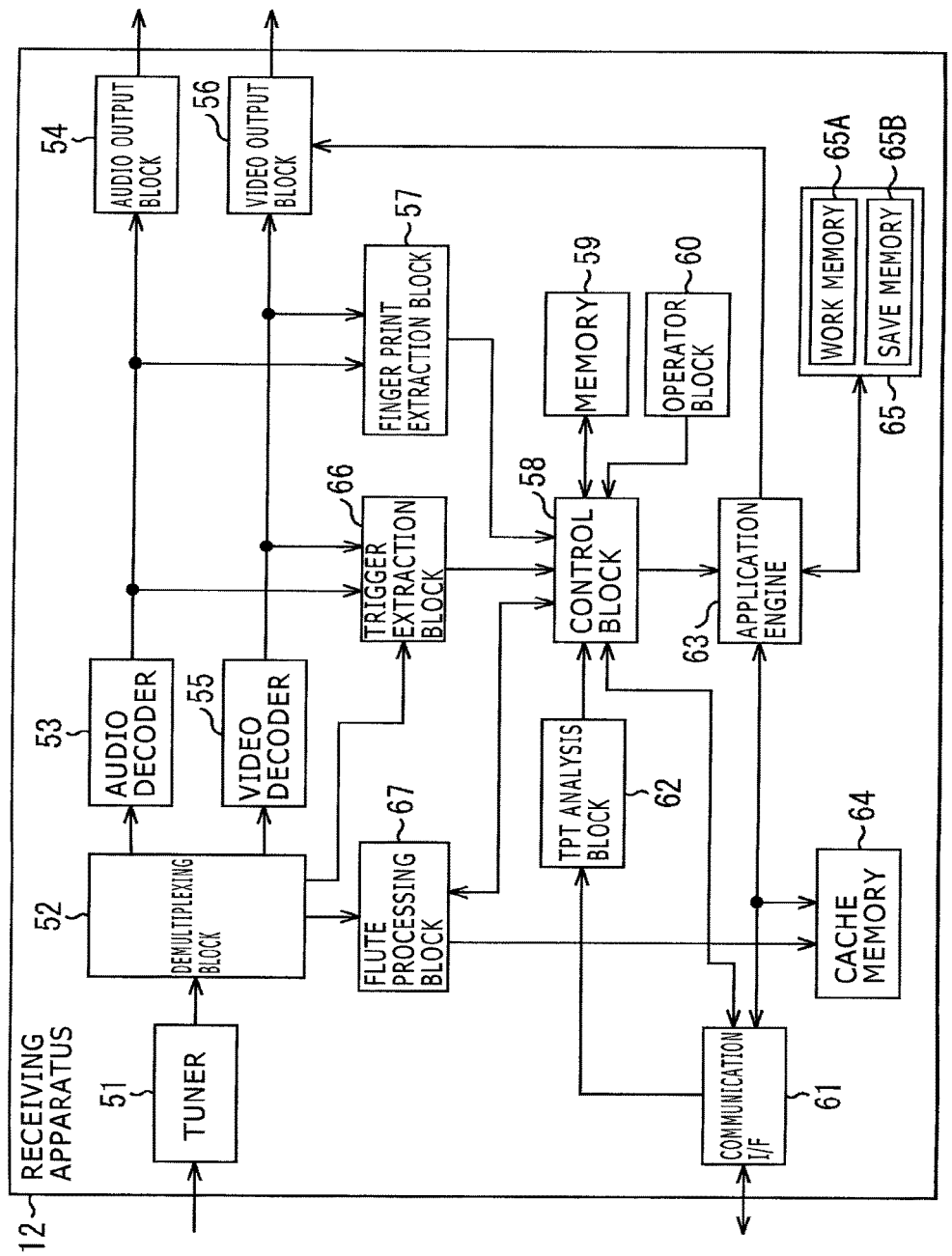
FIG. 11 is a block diagram illustrating a configuration of a receiving apparatus applied with the disclosed technology practiced as one embodiment.

FIG. 11 shows an exemplary configuration of the receiving apparatus 12 shown in FIG. 10.

The receiving apparatus 12 is made up of a tuner 51, a demultiplexer 52, an audio decoder 53, an audio output block 54, a video decoder 55, a video output block 56, a finger print extraction block 57, a control block 58, a memory 59, an operator block 60, a communication I/F 61, a TPT analysis block 62, an application engine 63, a cache memory 64, an application memory 65, a trigger extraction block 66, and a FLUTE processing block 67.

The tuner 51 receives a broadcast signal corresponding to a channel selected by the user and demodulates the received broadcast signal, supplying a resultant broadcast stream to the demultiplexer 52.

The demultiplexer 52 separates an audio stream and a video stream which have been multiplexed in the broadcast stream from the broadcast stream supplied from the tuner 51 and supplies the audio stream and the video stream to the audio decoder 53 and the video decoder 55, respectively. In addition, the demultiplexer 52 separates a PSIP, an SMT, an NRT-IT, and a FLUTE from the broadcast stream.

The audio decoder 53 decodes the audio stream supplied from the demultiplexer 52 and supplies a resultant audio signal to the audio output block 54, the finger print extraction block 57, and the trigger extraction block 66. The audio output block 54 outputs the audio signal supplied from the audio decoder 53 to a loudspeaker, not shown, of a subsequent stage.

The video decoder 55 decodes the video stream supplied from the demultiplexer 52 and supplies a resultant video signal to the video output block 56, the finger print extraction block 57, and the trigger extraction block 66. The video output block 56 outputs the video signal supplied from the video decoder 55 to a display, not shown, of a subsequent stage.

To the finger print extraction block 57, the audio signal from the audio decoder 53 and the video signal from the video decoder 55 are supplied. The finger print extraction block 57 extracts feature quantities from one or both of the audio signal and the video signal and supplies the extracted feature quantities to the control block 58 as finger print information.

The control block 58 controls the operation of each of the components of the receiving apparatus 12 by executing a control program stored in the memory 59 in advance. The operator block 60 receives various operations done by the user and supplies the operation signals corresponding to these operations to the control block 58.

The control block 58 transmits the finger print information supplied from the finger print extraction block 57 to the ACR server 13 via the Internet 20 by controlling the communication I/F 61. The communication I/F 61 receives the trigger information transmitted from the ACR server 13 and supplies the received trigger information to the control block 58.

In response to the obtained trigger signal, the control block 58 accesses the TPT server 15 via the Internet 20 by controlling the communication I/F 61 to request for the NRT-IT and the TPT-IT. The communication I/F 61 receives the NRT-IT and the TPT-IT transmitted from the file server 14 and supplies the received NRT-IT and TPT-IT to the control block 58.

In accordance with the obtained TPT-IT, the control block 58 accesses TPT server 15 via the Internet 20 by controlling communication I/F 61 to request for the TPT. The communication I/F 61 receives the TPT transmitted from the TPT server 15 and supplies the received TPT to the TPT analysis block 62. Consequently, the TPT analysis block 62 holds the TPT in a memory, not shown, incorporated therein and supplies the TPT from the memory on demand from the control block 58.

Further, on the basis of the TPT supplied from the TPT analysis block 62, when a time indicative of the progression of the AV content obtained from the time information (media_time) included in the trigger information from the communication I/F 61 is in a command valid period or has passed the valid start time, the control block 58 identifies this valid command. In accordance with the identified command, the control block 58 controls the acquisition or registration, acquisition or launch, event fire, suspend, or terminate of the data broadcast application.

Under the control of the control block 58, the application engine 63 accesses the application server 16 via the Internet 20 by controlling the communication I/F 61 to request for a data broadcast application. It should be noted that the URL for accessing the application server 16 is obtained from the NRT-IT. The communication I/F 61 receives the data broadcast application transmitted from the application server 16 and holds the received data broadcast application in the cache memory 64.

Under the control of the control block 58, the application engine 63 reads the data broadcast application stored in the cache memory 64 and executes the data broadcast application. A video signal of the active data broadcast application is supplied to the video output block 56.

The video output block 56 synthesizes the video signal supplied from the application engine 63 and the video signal supplied from the video decoder 55 and outputs a resultant signal to the display in the subsequent stage.

The application memory 65 is made up of a work memory 65A and a save memory 65B. The application engine 63 records the data (includes the layer of information in display for example, to be specific) associated with the active data broadcast application to the work memory 65A. If the active data broadcast application is suspended, the application engine 63 moves the data stored in the work memory 65A of the application memory 65 to the save memory 65B. Then, if the suspended data broadcast application is restarted, the data stored in the save memory 65B is moved to the work memory 65A to restore the status as it was before the suspension.

The trigger extraction block 66 always monitors the video signal supplied from the video decoder 55 and extracts trigger information embedded in the received video signal and supplies the extracted trigger signal to the control block 58.

It should be noted that, here, one example in which trigger information is embedded in a video signal is used for the description; however, if trigger information is embedded in an audio signal, the trigger extraction block 66 always monitors an audio signal supplied from the audio decoder 53 to extract the trigger information from the audio signal. If trigger information is arranged in a transport stream, then the trigger extraction block 66 extracts the trigger information from a PCR packet including the trigger information supplied from the demultiplexer 52.

In response to a command obtained from the trigger signal supplied from the trigger extraction block 66, the control block 58 controls the acquisition or registration, acquisition or launch, event fire, suspend, or terminate of the data broadcast application.

The FLUTE processing block 67 always monitors a broadcast stream separated by the demultiplexer 52 to acquire an SMT and an NRT-IT. Under the control of the control block 58, the FLUTE processing block 67 references the obtained SMT and NRT-IT to acquire an FDT. The FLUTE processing block 67 references the obtained FDT to acquire a data broadcast application transmitted by a FLUTE session to store the obtained data broadcast application into the cache memory 64.

If the FLUTE processing block 67 failed to acquire a data broadcast application transmitted by broadcast wave, then the control block 58 controls the application engine 63 in response to a notification thereof to make the application engine 63 acquire a data broadcast application from the application server 16.

Although not shown in FIG. 11, if NRT content is transmitted by a FLUTE session, the FLUTE processing block 67 gets NRT content from a broadcast stream separated by the demultiplexer 52 on the basis of the SMT and the NRT-IT and stores the obtained NRT content in a storage, not shown. Next, the NRT content is arbitrarily read from the storage to be reproduced.

The receiving apparatus 12 is configured as described above.

It should be noted that the first embodiment provides two methods of obtaining trigger information that is the premise for operating a data broadcast application; in one method, trigger information (ACR response) is obtained in accordance with the identification results of ACR identification processing and, in the other method, trigger information (trigger) transmitted as included in the broadcast wave is obtained, as described before. So, in what follows, the former is referred to as scheme 1A and the later is referred to as scheme 1B, which will be described in detail below in this order.

[Scheme 1A]

The following describes scheme 1A with reference to FIG. 12 through FIG. 18.

[Details of Trigger Information]

First, trigger information (ACR Response) in scheme 1A will be detailed. FIG. 12 shows one example of items of information included in trigger information.

The program_id is AV content identification information. It should be noted that program_id may be referred to also as the channel_id (or Ch_ID).

The media_time is information indicative of a particular time location on the progression time axis of AV content. For example, relative to a start time on the progression time axis of a television program or a particular time such as a.m. 12:00 (0:00), a time from this reference time is specified in media_time. The time specified in media_time is in units of seconds or milliseconds.

The domain_name is information for specifying the file server 14. For example, the information indicative of the domain name of the file server 14 is specified in the domain_name. Namely, the domain_name differs between organizations providing the file servers 14.

For example, trigger information is made up of values for specifying domain_name, program_id, and media_time and a character string linked with predetermined characters such as "/" and "?mt=." For example, if domain_name is "xbc-.com," program_id is "1," and media_time is "1000," the character string indicative of trigger information is "xbc-.com/1?mt=1000," so that, if "http://" is attached to the beginning of this character string, a character string indicative of the URL (Uniform Resource Locator) for accessing the file server 14 can be obtained. It should be noted that, instead of a domain name, a URL may be directly specified in domain_name.

It should be noted that the items of information included in trigger information are not limited to those shown in FIG. 12.

Trigger information is configured as described above.

[A Method of Obtaining a TPT and a Data Broadcast Application]

The following describes a method of obtaining a TPT and a data broadcast application with reference to FIG. 13. In accordance with the URL obtained from the trigger information supplied from the ACR server 13, the receiving apparatus 12 accesses the file server 14 to acquire an NRT-IT and a TPT-IT.

FIG. 13 shows the NRT-IT, TPT-IT, and ETT tables obtained from the file server 14. It should be noted that the ETT (Extended Text Table) is a table for writing text information and is obtained as occasion demands.

The NRT-IT (NRT Information Table) has the same configuration as or a configuration corresponding to that of the NRT-IT transmitted by broadcast wave or a configuration corresponding thereto. To the NRT-IT, attribute information of a content level included in one NRT-IT service is written. For example, attribute information on an NRT content basis such as content#1, #2, . . . is written to the NRT-IT.

To the NRT-IT, a service ID for identifying the NRT service concerned is written. This service ID is related with the service ID of each NRT service written to the SMT.

To Content name, the name of the NRT content concerned is written. To Content Linkage, identification information of the NRT content concerned is written. However, Content Linkage may be written as Content ID. To Distribution start/end time, information indicative of start and end times of the NRT content concerned is written. To Playback length, a playback time of the NRT content concerned is written. To Content length, a data quantity of NRT content to be stored in the storage is written.

To MIME types, a MIME type such as HTML is written. To ISO-639 language, a language such as Japanese or English is written. MPEG-2 AAC audio info and AVC video info, the information associated with the data compression of video and audio is written. To Caption service, the information associated with caption is written.

To Internet Location, the URL of the application server 16 for example is written as the information for acquiring a data broadcast application that is distributed via the Internet 20. Namely, if no data broadcast application transmitted by broadcast wave can be obtained for some reason, the receiving apparatus 12 can reference Internet Location to acquire a data broadcast application from the application server 16 via the Internet 20. It should be noted that Internet Location may be written as Content URL.

It should be noted that, although details are skipped, information associated with NRT content such as Content advisory, Genre, SVC info, STMK, LTKM info and so on can be written to the NRT-IT.

Because each NRT-IT file has the same configuration as or a configuration corresponding to that of the NRT-IT transmitted by broadcast wave, the attribute information of the NRT-IT is listed here; however, in the case of the NRT-IT file provided by the file server 14, at least Content Linkage and Internet Location may be included among the above-mentioned items of attribute information.

Content linkage and TPT URL are related with the TPT-IT (TPT Information Table). To the TPT URL, the URL of the TPT server 15 is written. Content Linkage of the TPT-IT is related with Content Linkage written to the NRT-IT.

It should be noted that Content Linkage and TPT URL is one example of the information to be written to the TPT-IT, so that other information may be written thereto.

Incidentally, the receiving apparatus 12 acquires a TPT and a data broadcast application by referencing the NRT-IT and TPT-IT obtained from the file server 14; to be more specific, this processing is executed as follows.

To be more specific, when getting a TPT, the receiving apparatus 12 references the NRT-IT to identify Content Linkage (S1). In addition, the receiving apparatus 12 references the TPT-IT related with the identified Content Linkage to acquire the TPT URL (S2). Next, on the basis of the obtained TPT URL, the receiving apparatus 12 accesses the TPT server 15 via the Internet 20 to acquire the TPT (S3).

On the other hand, in getting a data broadcast application, the receiving apparatus 12 references the NRT-IT to acquire Internet Location (S4). Next, on the basis of the obtained Internet Location, the receiving apparatus 12 accesses the application server 16 via the Internet 20 to acquire a data broadcast application (App) (S5).

As described above, the NRT-IT is originally transmitted by broadcast wave, but, by providing a file of the same format to the file server 14 along with a TPT-IT file, a TPT and a data broadcast application can be provided to the receiving apparatus 12 via the Internet 20.

It should be noted that, in the example shown in FIG. 13, the NRT-IT and the TPT-IT are described as different files; however, these files may be integrated in one file by writing the TPT URL to the descriptor of the NRT-IT.

Thus, the method of getting a TPT and a data broadcast application that are provided via the Internet 20 has been described.

[Details of TPT]

The following describes details of a TPT. FIG. 14 shows one example of a format of a TPT.

As shown in FIG. 14, a TPT is made up of a tpt element, a command element, an event element, and a diffusion element.

Information associated with a TPT is written to a tpt element. A tpt element includes id attribute, type attribute, version attribute, updating_time attribute, present_following attribute, end_mt attribute, and expire_date attribute.

Information for identifying a TPT is specified in the id attribute. For example, a character string with domain_name and program_id linked with "/" is specified in the id attribute.

Item "static" or "dynamic" is specified in type attribute as an attribute value thereof. Item "static" is specified when updating the TPT only if program_id included in the trigger information has been changed. Item "dynamic" is specified when updating the TPT even if program_id included in the trigger information is the same.

Information indicative of the version of the TPT concerned is specified in version attribute.

Information indicative of update period of the TPT is specified in updating_time attribute. The updating_time attribute is specified only if type attribute is item "dynamic."

Item "present" or "following" is specified in present_following attribute as an attribute value thereof. Item "present" is indicative that the TPT concerned is the TPT for a current television program, for example. Item "following" is indicative that the TPT concerned is the TPT for a next television program, for example.

Information indicative of a time at which media_time of the AV content corresponding to the TPT concerned is specified in end_mt attribute.

Information indicative of a valid period of the TPT concerned is specified in expire_date. The expire_date attribute is specified only if type attribute is item "static."

Information associated with a command is written to command element. The command element includes id attribute, start_time attribute, end_time attribute, destination attribute, and action attribute.

Information for identifying a command is specified in the id attribute.

Information indicative of the start time of the valid period of a command identified by the id attribute is specified in the start_time attribute. Information indicative of the end time of the valid period of a command identified by the id attribute is specified in the end_time attribute.

To be more specific, the valid period of a command is indicated by the start_time and the end_time indicative the two points on the progression time axis of the corresponding AV content. When the AV content progression timing is within the valid period, the valid command is made valid and, when the AV content progression timing has not reached the valid period or passes the valid period, the valid command is made invalid. In addition, the end_time attribute is not essential; if the start_time attribute alone is specified, the valid command is made valid when the AV content progression timing has passed the valid start_time indicated by the start_time attribute.

A device that is a target of data broadcast application control by the command concerned is specified in the destination attribute. Here, if an external device (not shown) is connected to the receiving apparatus 12 in addition to the receiving apparatus main (the receiving apparatus 12), this external device is specified as a device that is the target of the command. For example, if the command target device is the receiving apparatus 12, "receiver" is specified in the destination attribute; if the command target device is an external device, "external_1" or "external_2" is specified in the destination attribute. However, if the destination attribute is not specified, it is assumed that "receiver" be specified.

An action attribute is indicative that the command concerned is "execute," "register," "suspend," "terminate," or "event."

An execute command (execute) is a command to instruct the receiving apparatus 12 to acquire or launch a data broadcast application.

A register command (register) is a command to instruct the receiving apparatus 12 to acquire or register a data broadcast application.

A suspend command (suspend) is a command to instruct the receiving apparatus 12 to discontinue an active data broadcast application to suspend the active data broadcast application.

A terminate command (terminate) is a command to instruct the receiving apparatus 12 to terminate an active data broadcast application.

An event command (event) is a command to instruct the receiving apparatus 12 to fire an event in an active data broadcast application.

Information associated with an event command is written to the event element. The event element includes an id attribute and a data attribute.

An event ID for identifying an event to be fired in a data broadcast application is specified in the id attribute if the command is an event command. Event additional data to be referenced in firing an event is written to the data element if the command is an event command.

It should be noted that the event element is essential when the action attribute is "event."

Information for probabilistically diffusing the timing of command application in the receiving apparatus 12 is specified in the diffusion element. Setting this value allows the prevention of the temporary concentration of the access by two or more receiving apparatuses 12 to the application server 16 in acquiring a data broadcast application. The diffusion element includes a rate attribute, a range attribute, and a period attribute, in which distribution count, maximum delay time, and command application diffusion period are specified, respectively.

The TPT is configured as described above.

[Correlation Between Trigger Information and Commands]

Figure 15:
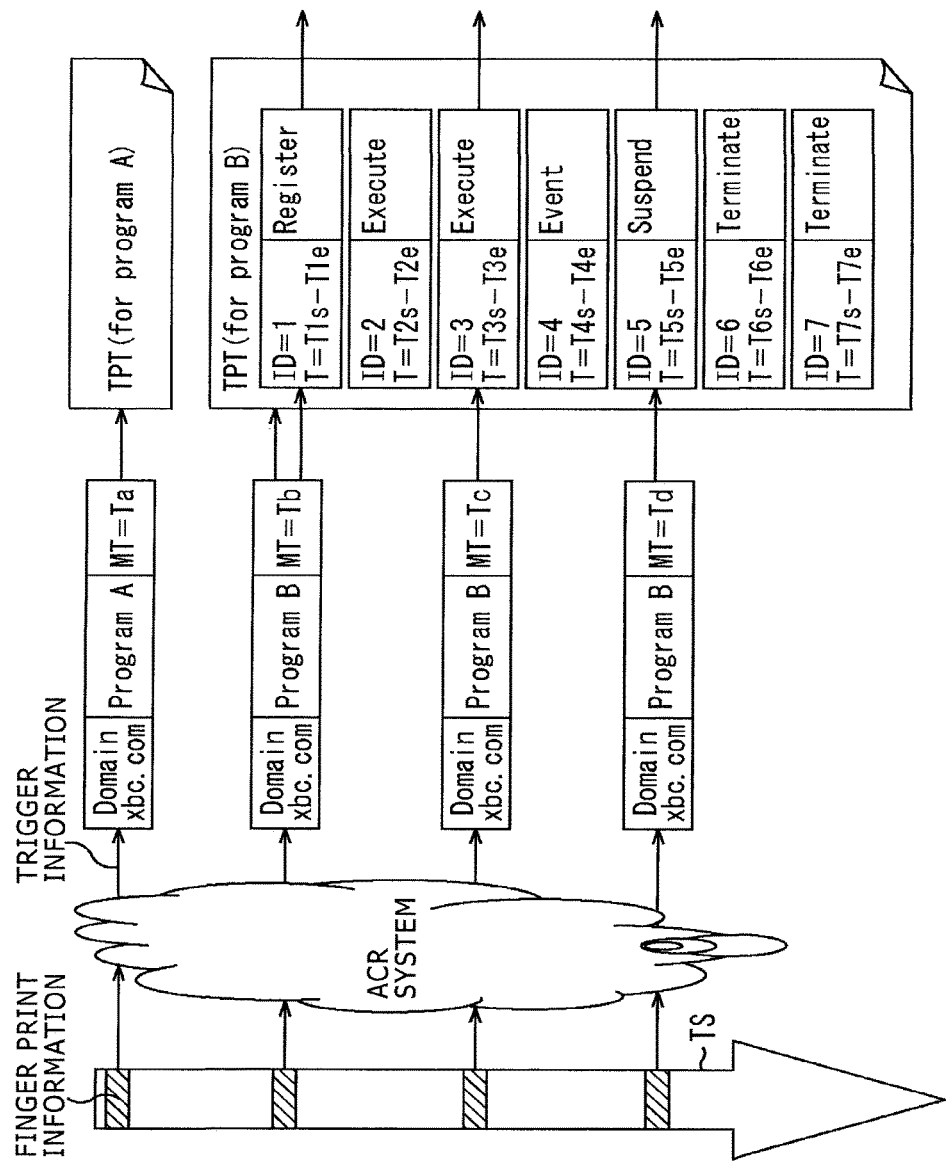
FIG. 15 is a diagram illustrating one example of correlation between trigger information and commands.

The following describes one example of processing for identifying, by the TPT, commands related with trigger information. FIG. 15 shows one example of the correlation between trigger information and commands.

As shown in FIG. 15, when the receiving apparatus 12 has extracted trigger information from a video signal, the receiving apparatus 12 determines whether to acquire a TPT from the TPT server 15 on the basis of domain_name and program_id included in the extracted trigger information. It should be noted that, in the example shown in FIG. 15, program_id of program A and program_id of program B that are television programs or television CMs are assumed to be "10" and "20," respectively.

For example, if the TPT (for program A) for program A (program_id="10") broadcast from an xbc broadcast station (domain_name="xbc.com") is held in the receiving apparatus 12, then the receiving apparatus 12 determines to acquire the TPT because the value of program_id has changed upon extraction of the trigger information that is "xbc.com/20?mt=Tb" from a video signal. Next, the receiving apparatus 12 accesses the file server 14 identified by the URL ("http://xbc.com/20?mt=Tb" obtained from the trigger information to acquire an NRT-IT and a TPT-IT. The receiving apparatus 12 references the obtained NRT-IT and TPT-IT to acquire the URL of the TPT server 15 and acquires the TPT.

Consequently, the TPT (for program B) shown in the figure is held in the receiving apparatus 12. It should be noted that the TPT shown in FIG. 15 corresponds to the TPT shown in FIG. 14; however, for the brevity of description, only id attribute, start_time attribute, end_time attribute, and action attribute of the command element are shown.

Then, if media_time included in the first trigger information ("xbc.com/20?mt=Tb") is "Tb" for example, Tb is within the valid period of T1$s$ to T1$e$ in the receiving apparatus 12, so that a register command corresponding to the id attribute that is "1" is identified by the TPT. Then, on the basis of the URL written to Internet Location of the NRT-IT, the receiving apparatus 12 accesses the application server 16 in accordance with the register command to acquire and register a data broadcast application.

Next, if the second trigger information ("xbc.com/20?mt=Tc") has been extracted, media_time that is Tc gets in the valid period of T3$s$ to T3$e$ in the receiving apparatus 12, so that an execute command corresponding to the id attribute that is "3" is identified by the TPT. Then, the receiving apparatus 12 launches the already obtained data broadcast application in accordance with the execute command.

If the third trigger information ("xbc.com/20?mt=Tc") has been extracted in the receiving apparatus 12, then media_time that is "Td" gets within the valid period of T5$s$ to T5$e$, so that a suspend command corresponding to the id attribute that is "5" is identified by the TPT. Then, the receiving apparatus 12 suspends the active data broadcast application in accordance with the suspend command.

Then, although not shown in FIG. 15, if media_time included in the extracted trigger information gets in the valid period, an operation of the data broadcast application is controlled in accordance with the valid command.

As described above, in the receiving apparatus 12, if the trigger information from the broadcasting apparatus 11 has been extracted, a command corresponding to media_time included in the extracted trigger information is identified on the basis of the TPT held in the receiving apparatus 12 and an operation of the data broadcast application is controlled in accordance with the identified command.

[Status Transition of a Data Broadcast Application]

Figure 16:
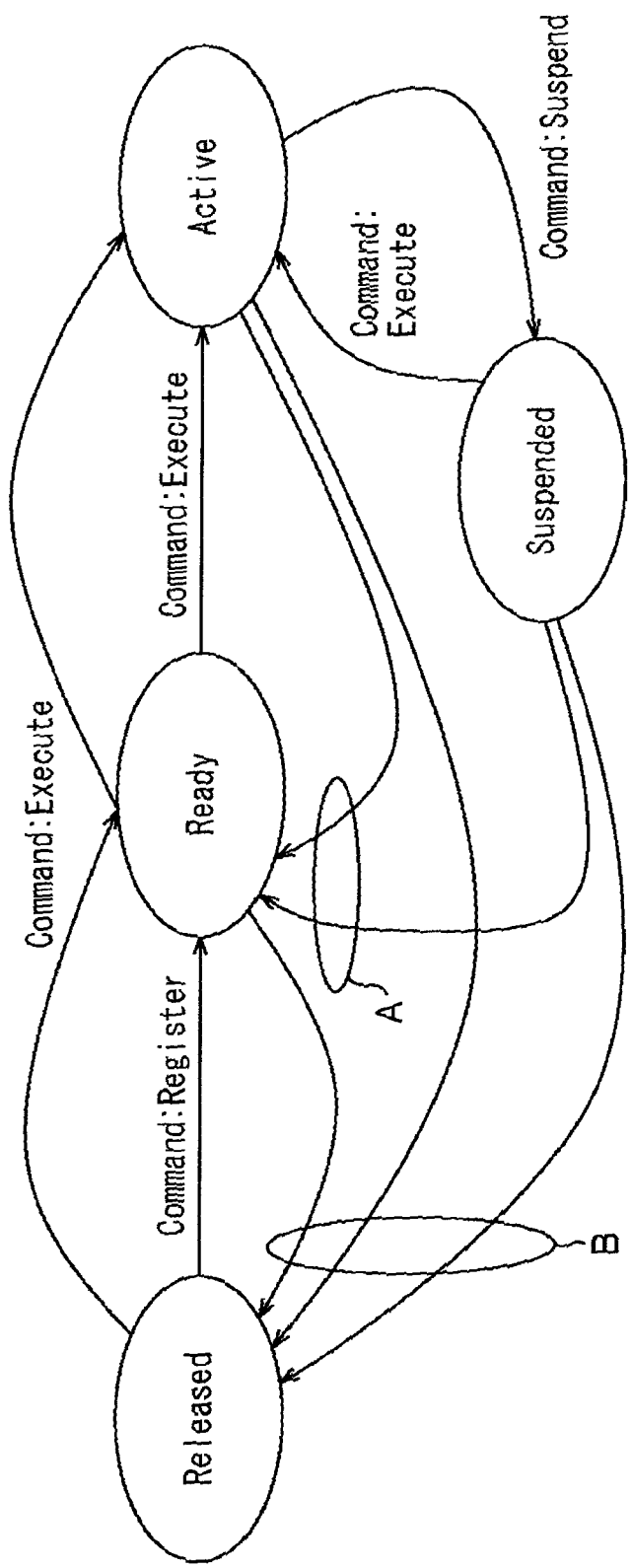
FIG. 16 is a diagram illustrating a status transition of a data broadcast application.

FIG. 16 shows a status transition diagram of a data broadcast application that operates in the receiving apparatus 12 in accordance with the commands that are register, execute, event, suspend, and terminate. As shown in FIG. 16, it is defined that the state of a data broadcast application has been transitioned to any one of a released state, a ready state, an active state, and a suspended state.

In the released state, a data broadcast application has not yet been obtained by the receiving apparatus 12. The ready state indicates that the data broadcast application has been registered in the receiving apparatus 12 but not yet launched. In the active state, the data broadcast application has been launched and is in execution. In the suspended state, the execution of the data broadcast application has been discontinued and the information indicative of a state of the discontinuation is held in the save memory 65B.

If a register command is identified and a data broadcast application is obtained (or registered) when the data broadcast application has transitioned to the released state (or has not yet been obtained by the receiving apparatus 12), then the data broadcast application transitions to the ready state.

If an execute command is identified when a data broadcast application is in the ready state and this data broadcast application is launched in accordance with the identified execute command, the data broadcast application transitions to the active state.

If an execute command is identified when a data broadcast application has transitioned to the released state (or not yet obtained by the receiving apparatus 12) and the data broadcast application is obtained and launched in accordance with the execute command, the data broadcast application transitions to the active state.

If a suspend command is identified and the active data broadcast application is suspended in accordance with the identified suspend command when the data broadcast application has been transitioned to the active state, the data broadcast application transitions to the suspended state.

If an execute command is identified and the suspended data broadcast application is restarted in accordance with the identified execute command when the data broadcast application has been transitioned to the suspended state, the data broadcast application transitions to the active state.

If a terminate command is identified and the active data broadcast application is terminated in accordance with the identified terminate command when the data broadcast application has been transitioned to the active state or the suspended state, the data broadcast application transitions to the ready state ("A" in the figure). It should be noted that the transition to the ready state occurs when another data broadcast application has been executed, in addition to the transition done on the basis a terminate command.

A data broadcast application transitions to the released state ("B" in the figure) when the application valid period of the command has passed when in the data broadcast application is in the ready state, the active state, or the suspended state.

[Trigger Information Handling Processing]

Figure 17:
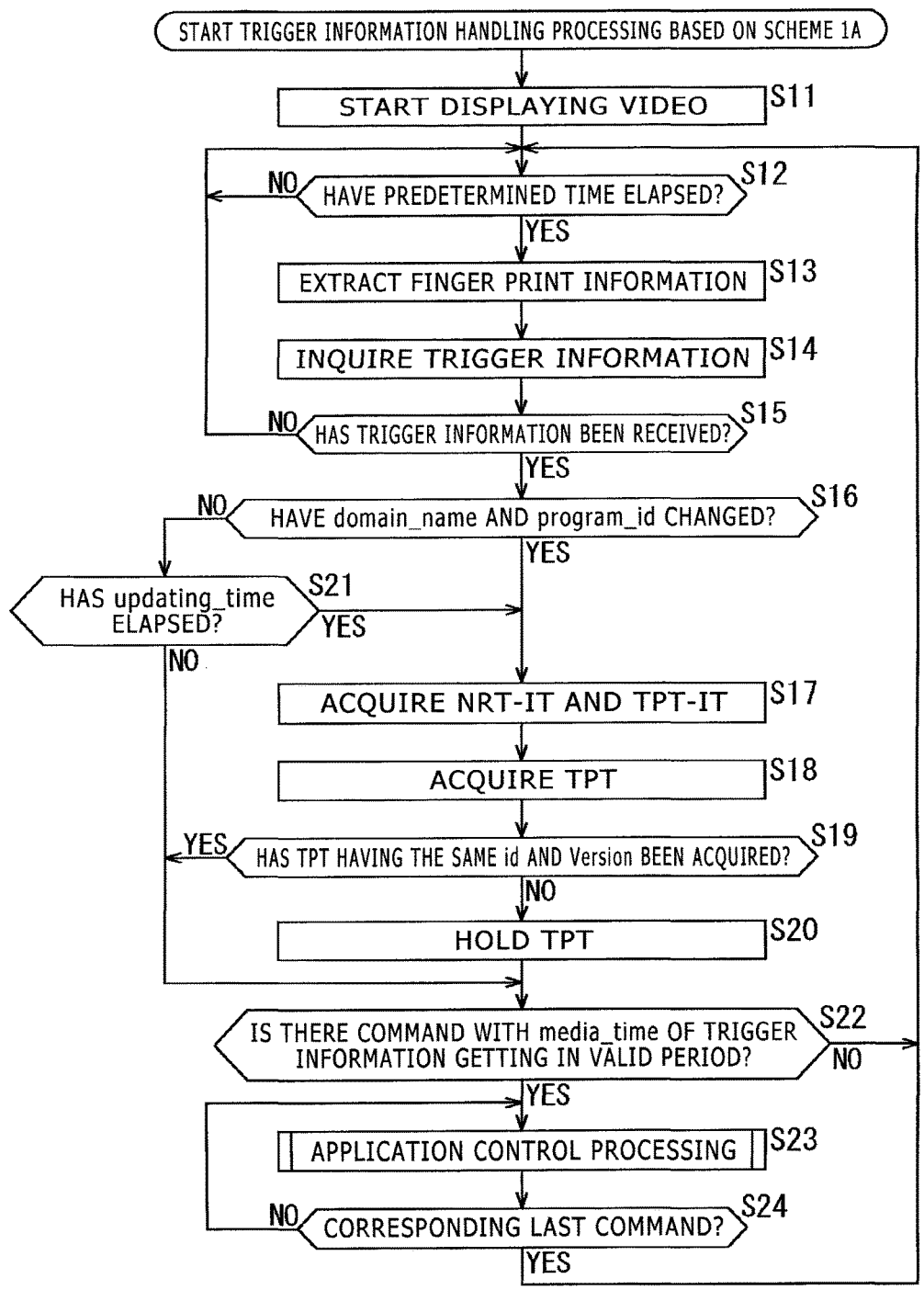
FIG. 17 is a flowchart indicative of trigger information handling processing of scheme 1A.
Figure 18:
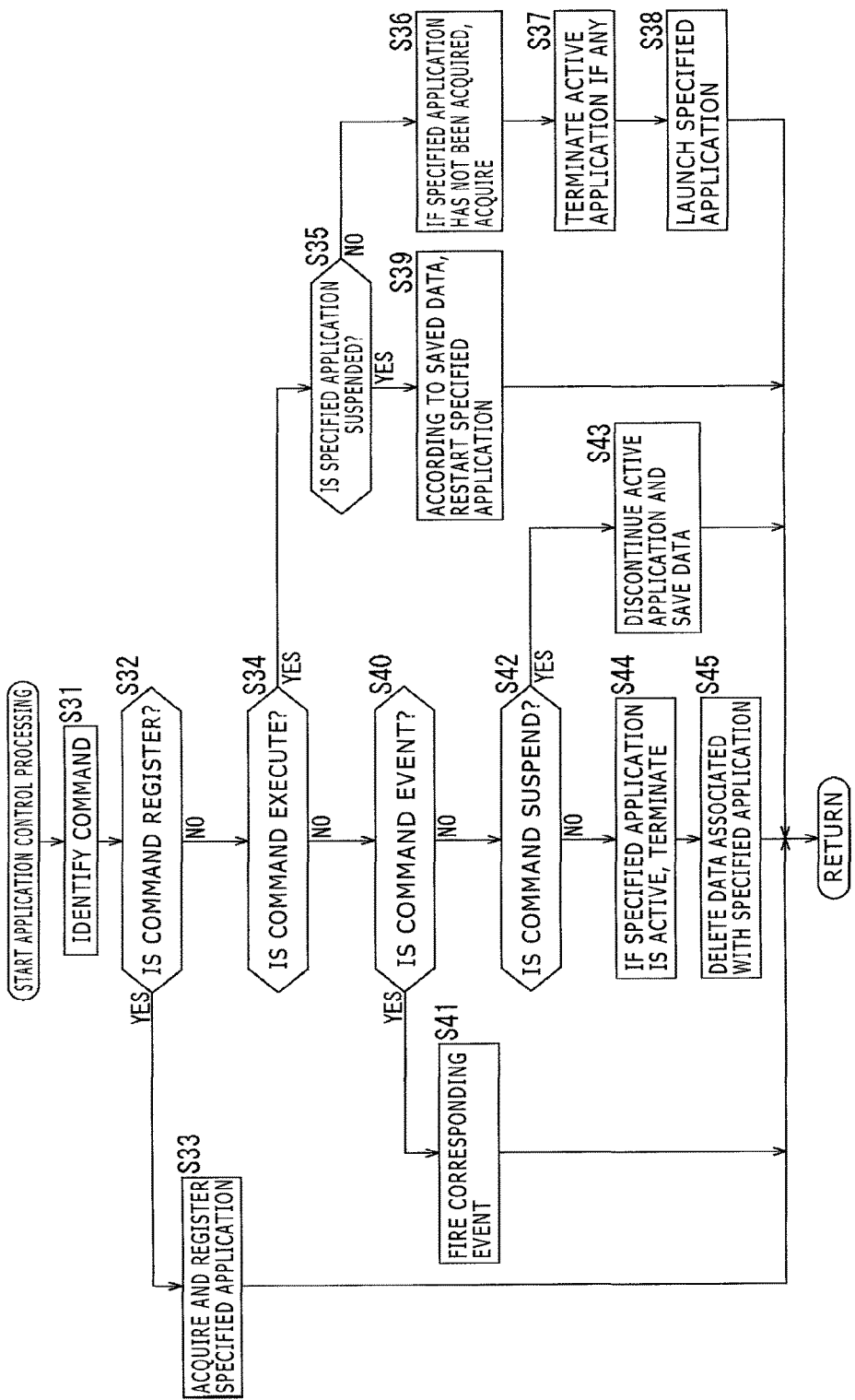
FIG. 18 is a flowchart indicative of application control processing.

The following describes trigger information handling processing to be executed when the receiving apparatus 12 receives trigger information with reference to the flowcharts shown in FIG. 17 and FIG. 18.

(Trigger Information Handling Processing Based on Scheme 1A)

First, the trigger information handling processing based on scheme 1A is described with reference to the flowchart shown in FIG. 17. It should be noted that this trigger information handling processing is repetitively executed while the user is viewing a television program, namely, the receiving apparatus 12 is receiving a broadcast signal.

When a predetermined channel is selected by the user, the receiving apparatus 12 starts displaying the video of the television program of the selected channel (step S11).

In step S12, the finger print extraction block 57 waits until a predetermined time passes. Then, when a predetermined time has passed, the procedure goes to step S13.

In step S13, the finger print extraction block 57 extracts feature quantities (or finger print information) from one or both of an audio signal and a video signal.

In step S14, the control block 58 controls the communication I/F 61 to transmit the finger print information to the ACR server 13 via the Internet 20, thereby inquiring for trigger information.

The finger print information is the information unique to all or a part of the component elements of AV content, for example. In the ACR server 13, the unique information of many pieces of AV content is registered in advance. In ACR identification processing, the degree of similarity or match between these pieces of unique information is determined. By this ACR identification processing, information (hereafter referred to channel identification information) for identifying the channel number of each television program and information (hereafter referred to a time location information) indicative of a time location with the finger print information at representation of a television program from start to end thereof in the time axis extracted are obtained.

In addition, in the ACR server 13, server identification information for identifying the file server 14 and content identification information for identifying AV content are registered in advance in correspondence with the channel identification information, for example. The ACR server 13 acquires the server identification information and the content identification information corresponding to the channel identification information obtained in the ACR identification processing to generate trigger information (an ACR Response) with the server identification information being domain_name, the content identification information being program_id, and the time location information obtained in the ACR identification processing being media_time. The ACR server 13 transmits the generated trigger information to the receiving apparatus 12 via the Internet 20.

In step S15, the control block 58 controls the communication I/F 61 to determine whether or not the trigger information has been received from the ACR server 13. If the trigger information is found to have not been received in step S15, then the procedure returns to step S12 to repeat the above-mentioned processing operations therefrom. On the other hand, if the trigger information is found to have been received in step S15, then the procedure goes to step S16.

In step S16, the control block 58 analyzes the received trigger information to determine whether or not one or both of domain_name and program_id included in the trigger information concerned have changed. If one or both of domain_name and program_id are found to have changed in step S13, then the procedure goes to step S17.

In step S17, the control block 58 controls the communication I/F 61 to access the file server 14 identified by the URL obtained by attaching "http://" to the beginning of the trigger information, thereby requesting for an NRT-IT and a TPT-IT. Next, the control block 58 controls the communication I/F 61 to acquire the NRT-IT and the TPT-IT from the file server 14.

In step S18, the control block 58 controls the communication I/F 61 to access the TPT server 15 identified by the URL obtained from the NRT-IT and the TPT-IT, thereby requesting for a TPT. Next, the TPT analysis block 62 controls the communication I/F 61 to acquire the TPT from the TPT server 15.

In step S19, the TPT analysis block 62 analyzes the obtained TPT to determine whether or not a TPT having the same id and version has already been obtained. It should be noted that id and version are specified by the id attribute and the version attribute of the tpt element, for example. If the TPT having the same id and version is found to have not yet obtained in step S19, then the procedure goes to step S20.

In step S20, the TPT analysis block 62 holds the obtained TPT, upon which the procedure goes to step S22.

If one or both of domain_name and program_id are found to have not changed in step S16, the procedure goes to step S21.

In step S21, the TPT analysis block 62 determines whether or not the update period indicated by the updating_time written to the TPT held in the TPT analysis block 62 has passed. If the update period is found to have passed in step S21, then the procedure goes to step S17. Next, the TPT analysis block 62 obtains a new TPT from the TPT server 15 and, if a TPT having the same id and version of this new TPT has not been obtained, the new TPT is held in the TPT analysis block 62.

It should be noted that, if the TPT having the same id and version is found to have been obtained in step S19 or the update period is found to have not passed in step S21, then the procedure goes to step S22.

In step S22, the control block 58 determines on the basis of the TPT from the TPT analysis block 62 whether or not there is a command with the media_time included in the received trigger information being within the valid period. In step S22, if a command with the media_time being within the valid period is found, then the procedure goes to step S23.

In step S23, the control block 58 controls the application engine 63 to execute application control processing. In this application control processing, a valid command with the media_time being within the valid period is identified and, in accordance with the identified command, the acquisition or registration, the acquisition or launch, the event fire, the suspend, or the terminate of the data broadcast application are controlled.

It should be noted that the details of the application control processing will be described later with reference to the flowchart shown in FIG. 18.

In step S24, the control block 58 determines whether or not the target valid command is the last command corresponding to a period within the valid period. If the target valid command is found to be not the corresponding last command in step S24, then the procedure returns to step S23 to repeat the above-mentioned processing operations therefrom. Namely, until the execution of the valid command has all been terminated, the processing operations of steps S23 and S24 are repeated.

If the target valid command is found to be the corresponding last command in step S24 or, if no command is found existing with the media_time being within the valid period in step S22, the procedure returns to the step S12 to repeat the above-mentioned processing operations therefrom.

Thus, the description of the trigger information handling processing based on scheme 1A has been completed.

(Application Control Processing)

The following describes the details of application control processing corresponding to step S23 shown in FIG. 17 with reference to the flowchart shown in FIG. 18.

In step S31, the control block 58 identifies on the basis of the TPT from the TPT analysis block 62 whether the valid command with the media_time included in the received trigger information getting in the valid period is register, execute, event, suspend, or terminate. Namely, the TPT is used as a dictionary for identifying a command from the media_time included in the trigger information.

In step S32, the control block 58 determines whether or not the identification result of step S31 is indicative of a register command. If the identification result is found to be indicative of a register command, the procedure goes to step S33.

In step S33, the control block 58 references the Internet Location written to the NRT-IT and, at the same time, controls the communication I/F 61 and the application engine 63 to access the application server 16 via the Internet 20, thereby getting a data broadcast application. The obtained data broadcast application is held in the cache memory 64.

In addition, the control block 58 stores the application valid period and the application holding priority of the obtained data broadcast application into the memory 59 by relating these application valid period and application holding priority with the obtained data broadcast application. Consequently, the data broadcast application held in the cache memory 64 is managed by the control block 58 in accordance with the valid period and the holding priority.

Then, the procedure returns to step S23 shown in FIG. 17 to repeat the above-mentioned processing operations therefrom.

In step S32, if the identification result of step S31 is found to be not indicative of a register command, then the procedure goes to step S34. In step S34, the control block 58 determines whether the identification result of step S31 is indicative of an execute command or not. If the identification result is found to be indicative of an execute command, then the procedure goes to step S35.

In step S35, under the control of the control block 58, the application engine 63 determines whether or not the data broadcast application is suspended (or in the suspended state).

If the data broadcast application is found to be not suspended in step S35, then the procedure goes to step S36. In step S36, if a data broadcast application is found to have not been obtained (or not found to be stored in the cache memory 64), the control block 58 references the Internet Location written to the NRT-IT and, at the same time, controls the communication I/F 61 and the application engine 63 to access the application server 16 via the Internet 20, thereby acquiring a data broadcast application.

In step S37, under the control of the control block 58, the application engine 63 terminates the currently active data broadcast application, if any. Then, in step S38, under the control of the control block 58, the application engine 63 launches the data broadcast application.

If the data broadcast application is found to be suspended (or in the suspended state) in step S35, then the procedure goes to step S39.

In step S39, under the control of the control block 58, the application engine 63 moves the data from the save memory 65B to the work memory 65A to launch the data broadcast application. Consequently, the suspended data broadcast application is restarted from the suspended state. Then, the procedure returns to step S23 to repeat the above-mentioned processing operations therefrom.

If the identification result of step S31 is found not to be indicative of an execute command in step S34, then the procedure goes to step S40. In step S40, the control block 58 determines whether or not the identification result of step S31 is indicative of an event command. If the identification result is fount to be indicative of an event command, then the procedure goes to step S41.

In step S41, the control block 58 controls the application engine 63 to fire (or execute) an event corresponding to the event ID of the command in the active data broadcast application. Then, the procedure returns to step S23 shown in FIG. 17 to repeat the above-mentioned processing operations therefrom.

If the identification result of step S31 is found to be not indicative of an event command in step S40, then the procedure goes to step S42. In step S42, the control block 58 determines whether or not the identification result of step S31 is indicative of a suspend command. If the identification result of step S31 is found to be indicative of a suspend command, then the procedure goes to step S43.

In step S43, under the control of the control block 58, the application engine 63 saves the data indicative of the state of the currently active data broadcast application into the save memory 65B. Then, the procedure returns to step S23 to repeat the above-mentioned processing operations therefrom.

If the identification result of step S31 is found to be not indicative of a suspend command in step S42, then the identification result is indicative of a terminate command, so that the procedure goes to step S44.

In step S44, under the control of the control block 58, the application engine 63 terminates the data broadcast application if it is active. In step S45, under the control of the control block 58, the application engine 63 deletes the data associated with the data broadcast application from the work memory 65A and the save memory 65B and, at the same time, deletes the data broadcast application from the cache memory 64. Then, the procedure returns to step S23 shown in FIG. 17 to repeat the above-mentioned processing operations therefrom.

Thus, the application control processing has been described. According to the application control processing, a data broadcast application can be launched, event-fired, or terminated in response to a television program for example. In addition, a data broadcast application can be suspended with the state of execution of the data broadcast application held, thereby executing and terminating another data broadcast application and then restarting the suspended data broadcast application from the suspended state.

Thus, the scheme 1A has been described.

[Scheme 1B]

The following describes the scheme 1B with reference to FIG. 19A through FIG. 25.

[Details of Trigger Information]

Figure 19A:
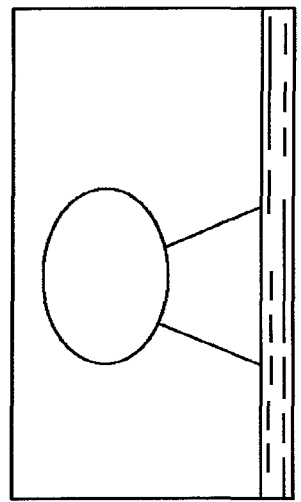
FIGS. 19A and 19B are diagrams illustrating examples of embedding trigger information into video signals.
Figure 19B:
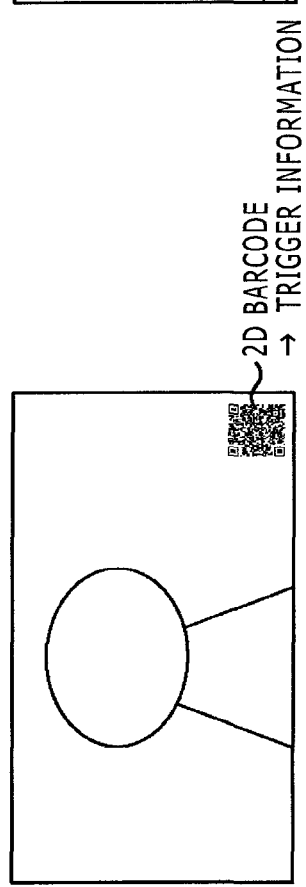

First, the details of the trigger signal (Trigger) in the scheme 1B are described. In the scheme 1B, trigger information is transmitted as included in a broadcast wave. FIGS. 19A and 19B show examples of two types in which trigger information is embedded in the video signal of a television program.

FIG. 19A shows an example in which trigger information is converted into a two-dimensional barcode that is then superimposed on the video of a video signal at a predetermined location (in this case, in the lower right corner). FIG. 19B shows an example in which trigger information is converted into a video code that is synthesized with several lower lines of the video of a video signal. The trigger information in FIG. 19A and FIG. 19B is extracted by the trigger extraction block 66 of the receiving apparatus 12.

In both examples of FIG. 19A and FIG. 19B, the trigger information is arranged on the video of a television program, so that a receiving apparatus (the receiving apparatus 12 shown in FIG. 11 for example) using a CATV network or a satellite communication network, for example, can be notified of trigger information.

Further, in both examples of FIG. 19A and FIG. 19B, the trigger information (or the two-dimensional barcode or the video code) on the video is visually recognized by the user of the receiving apparatus 12; if this is not desirable, the trigger information on the video may be masked by the same pixels as those around the trigger information before displaying.

FIGS. 19A and 19B show an example in which trigger information is embedded in the video signal of a television program; however, as described above, the trigger information storage location and transmission method are not limited thereto. For example, trigger information may be stored in the PCR of a transport stream.

Referring to FIG. 20, there is shown a concept in which trigger information is transmitted as arranged in PCR packets of a transport stream of a broadcast signal.

As shown in FIG. 20, trigger information is not stored in all of PCR packets; instead, trigger information is stored in PCR packets only when it is proper timing to link trigger information with a television program. Normally, PCR packets pass a PID filter of a CATV retransmission apparatus, so that a receiving apparatus (the receiving apparatus 12 shown in FIG. 11 for example) using a CATV network or a satellite communication network can be notified of trigger information. In addition, trigger information may be arranged in a user data area of a video stream or an audio stream.

It should be noted that, in consideration of radio interference or a drop (or a reception error) in the receiving apparatus 12, trigger information is transmitted two or more times consecutively in the same content.

Figure 21:
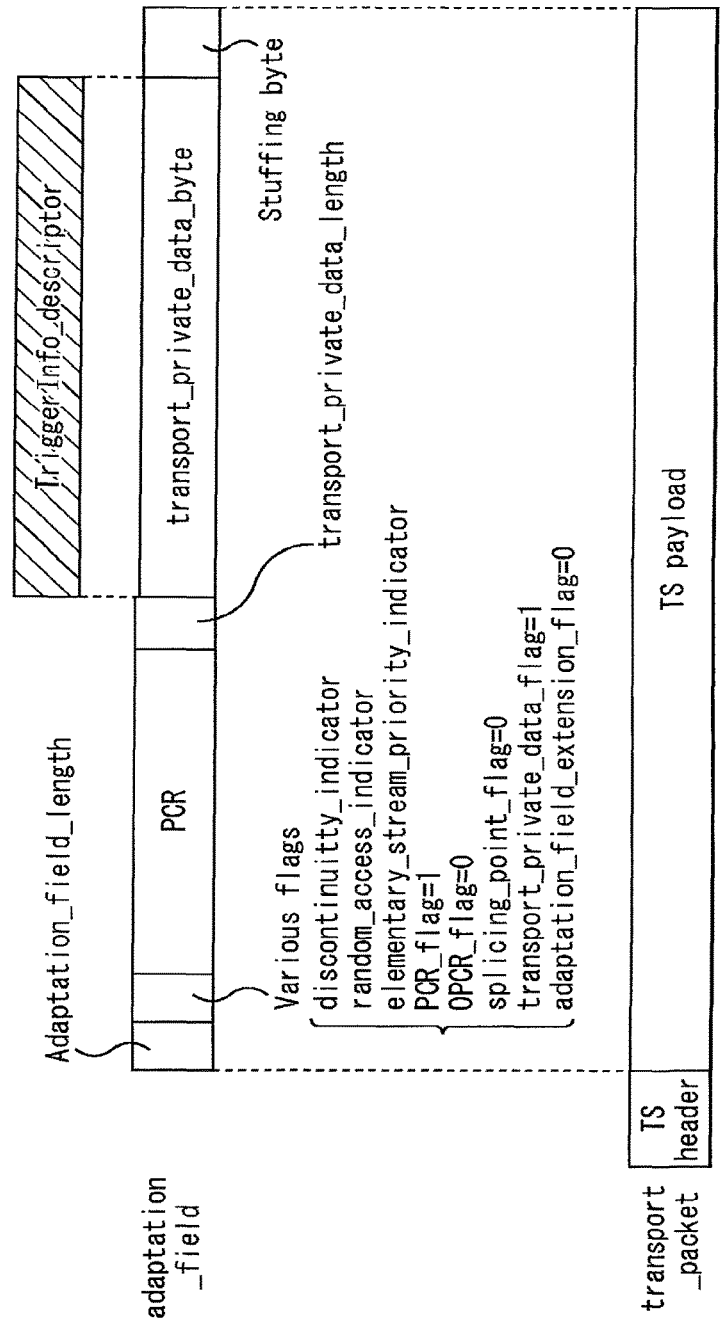
FIG. 21 is a diagram illustrating a specific arrangement of trigger information in a PCR packet.

FIG. 21 shows a location at which trigger information is stored in a PCR packet. A PCR packet is a packet in which a PCR is stored in adaptation_field of a TS packet; trigger information (Trigger Info_descriptor) is stored in transport_private_data_byte following the PCR. It should be noted that, when trigger information is stored, transport_private_data_flag of Various_flags arranged in front of the PCR is set to 1.

The following describes the details of trigger information. FIG. 22 shows one example of information items included in trigger information.

Trigger_id is information for identifying the trigger information concerned. If the trigger information having the same contents is transmitted two or more times, Trigger_id of each trigger information is the same. Protocol_version is indicative of a protocol version of the trigger information concerned.

Command_code is indicative of a type of command of the trigger information concerned. To Command_code, information indicative of any one of register command, execute command, event command, suspend command, and terminate command is written. It should be noted that these commands correspond to the commands specified to the action attribute of the command element of the TPT shown in FIG. 14 and give instructions of data broadcast application acquisition or registration, acquisition or launch, event fire, suspend, or terminate.

Trigger_validity is a server access distribution parameter value indicative of a probability with which each receiving apparatus 12 that has received the trigger information concerned executes processing in accordance with the trigger information concerned.

App_id is identification information of a data broadcast application to be obtained in accordance with the trigger information concerned. App_type is information indicative of a type (HTML5 for example) of a data broadcast application corresponding to the trigger information concerned.

Trigger_target is information for identifying an SMT and an NRT-IT. To Trigger_target, Service ID and Content Linage are written for example.

App_life_scope is indicative of a scope in which an active state is continued without terminating an active data broadcast application when a channel switching for example has taken place. Persistent_priority is indicative of a priority at the time of acquiring and holding a corresponding data broadcast application. Expire_date is indicative of a period within which a data broadcast application is held.

Event_id is identification information of an event to be fired in a data broadcast application specified by App_id. To Event_Embedded_data, the data to be referenced at the time of firing an event is written.

It should be noted that App_type, Trigger_target, App_life_scope, Persistent_priority, and Expire_date are specified only when the information indicative of a register command or an execute command is written to Command_code. Event_id and Event_Embedded_data are specified only when the information indicative of an event command is written to Command_code.

It should be noted that the information items included in trigger information is arbitrary and is not limited to those shown in the example shown in FIG. 22.

[Data Broadcast Application Acquisition Method]

The following describes a method of obtaining a data broadcast application that is broadcast by use of broadcast wave with reference to FIG. 23. When the receiving apparatus 12 receives trigger information transmitted as included in a broadcast wave, the receiving apparatus 12 tries to obtain a data broadcast application if a command obtained from the trigger information concerned is a register command or an execute command. In doing so, the receiving apparatus 12 references tables SMT, NRT-IT, and FDT that are transmitted by broadcast wave.

FIG. 23 shows examples of tables transmitted by broadcast wave. FIG. 23 shows tables SMT, NRT-IT, FDT, and ETT.

To an SMT (Service Map Table), the attribute information of the service level of an NRT service is written. For example, such attribute information on an NRT service basis as Service#1, #2, and so on are written to an SMT.

To Service Name, the name of the NRT service concerned is written.

To IP(src) and IP(dest), the IP addresses of transmission source (src) and transmission destination (dest) are written. To FLUTE Session Info, a port number is written. For this port number, a number different between NRT services is specified. Namely, a FLUTE sessions is executed by the transmission of a sequence of IP packets distinguished from each other by combinations of transmission source IP address, destination IP address, and destination port number of each IP packet for use in the transmission of NRT content. Each NRT service is identified by combinations of these IP addresses and port number.

To Service ID, the identification information of the NRT service concerned is written. To Service Category, a category to which the NRT service concerned belongs is written. To Content type, a type of the content provided by the NRT service concerned is written. To MIME types, a MIME type such as HTML for example is written. To ISO-639 language, a language such as Japanese or English for example is written. To Genre, the information associated with a genre to which the NRT content concerned belongs is written.

Although details are skipped, Purchase data, STKM, LTKM info, Storage reservation, Service Icon Content-ID, and other information associated with NRT services can be written to each SMT.

To an NRT-IT (NRT Information Table), the attribute information of a content level included in one NRT service is written. For example, the attribute information on an NRT content basis such as Content#1, #2, and so on is written to each NRT-IT.

To an NRT-IT, Service ID for identifying the NRT service concerned is written. This Service ID is related with Service ID for each NRT service written to each SMT.

To Content name, the name of the NRT content concerned is written. To Content Linkage, identification information of NRT content concerned is written. It should be noted that Content Linkage may be written as Content ID. To Distribution start/end time, information indicative of the start time and end time of the NRT content concerned is written. To Playback length, a playback time of the NRT content concerned is written. To Content length, a data quantity of NRT content to be stored in the storage is written.

To MIME types, a MIME type such as HTML for example is written. To ISO-639 language, a language such as Japanese or English for example is written. To MPEG-2 AAC audio info and AVC video info, information associated with the data compression of video or audio is written. To Caption service, information about caption is written.

To Internet Location, the URL of the application server 16 for example is written as information for obtaining a data broadcast application to be distributed via the Internet 20. Namely, if the receiving apparatus 12 cannot acquire a data broadcast application transmitted by broadcast wave for some reason, the receiving apparatus 12 references Internet Location to acquire a data broadcast application from the application server 16 via the Internet 20. It should be noted that Internet Location may be written as Content URL.

Although details are skipped, Content advisory, Genre, SVC info, STMK, LTKM info, and other information associated with NRT content can be written to each NRT-IT.

To an FDT (File Delivery Table), attribute information associated with a file to be distributed by use of a FLUTE session is written. For example, to an FDT, TOI, Content Location, and Content Linkage are written as related with each other.

To a TOI (Transport Object Identifier), identification information of a file object to be transmitted is written. To the TOI of FDT Instance, 0 is written. To the TOI of a file object to be transmitted, identification information to be stored in a download header for example is written.

To Content Location, file identification information is written in URI (Uniform Resource Identifier). To Content Linkage, identification information of NRT content is written. This Content Linkage is related with Content Linkage for each piece of NRT content written to a NRT-IT.

It should be noted that TOI, Content Location, and Content Linkage are one example of the attribute information to be written to an FDI; therefore, other attribute information can be written to an FDI.

To an ETT (Extended Text Table), Content Linkage and Text are written as related with each other. To Content Linkage, identification information of content is written. This Content Linkage is related with Content Linkage for each piece of NRT content written to an NRT-IT. To Text, text information is written.

Tables SMT, NRT-IT, FDT, and ETT are configured as above.

Meanwhile, the receiving apparatus 12 references an SMT, an NRT-IT, and an FDT to acquire a data broadcast application transmitted by broadcast wave; to be more specific, this processing is executed in a processing flow shown below. Here, it is assumed that a data broadcast application be transmitted as the above-described NRT content (instead of an NRT content).

To be more specific, when the receiving apparatus 12 receives trigger information transmitted as included in a broadcast wave and, if a command obtained from this trigger information is a register command or an execute command, then, because Trigger_target is written to the command, the receiving apparatus 12 acquires Service ID and Content Linkage written to Trigger_target. Next, the receiving apparatus 12 references the SMT to search the Service IDs of the NRT services written to the SMT for the Service ID matching the obtained Service ID, thereby identifying a NRT service that matching the condition concerned (S1).

Next, the receiving apparatus 12 identifies an NRT-IT having the same Service ID as the Service ID of the identified NRT service (S2). Then, the receiving apparatus 12 references the identified NRT-IT to search the Content Linkages of the NRT content written to the NRT-IT for the Content Linkage matching the obtained Content Linkage, thereby identifying the NRT content that matches the condition concerned (S3).

Also, the receiving apparatus 12 references the SMT to acquire IP (src), IP (dest), and FLUTE Session Info related with the Service ID identified in S1. Then, the receiving apparatus 12 acquires an FDT with TOI=0 from the FLUTE session (TSI=T1) identified by combinations of the obtained IP address (S1) and port number (P1).

Next, the receiving apparatus 12 references the FDT obtained in S4 to search for the same Content Linkage (FDT) as the identified Content Linkage (NRT-IT), thereby identifying Content Linkage (Content Linkage=id1) that matches the condition concerned (S5). Then, the receiving apparatus 12 identifies the TOI (TOI=6) related with the Content Linkage identified in S5.

Consequently, the receiving apparatus 12 acquires a data broadcast application on the basis of an object identified by the identified TOI (TOI=6) in the FLUTE session (TSI=T1).

As described above, referencing an SMT and an NRT-IT by use of Service ID and Content Linkage written to Trigger_target included in trigger information as a search condition allows the identification of the TOI of an FDT, thereby getting a data broadcast application transmitted in a FLUTE session.

It should be noted that, if a data broadcast application transmitted by broadcast wave cannot be obtained by the method described above, the receiving apparatus 12 references Internet Location of an NRT-IT to acquire a data broadcast application from the application server 16 via the Internet 20 (S6).

Thus, the method of obtaining a data broadcast application transmitted by broadcast wave has been described.

[Trigger Information Handling Processing]

Figure 25:
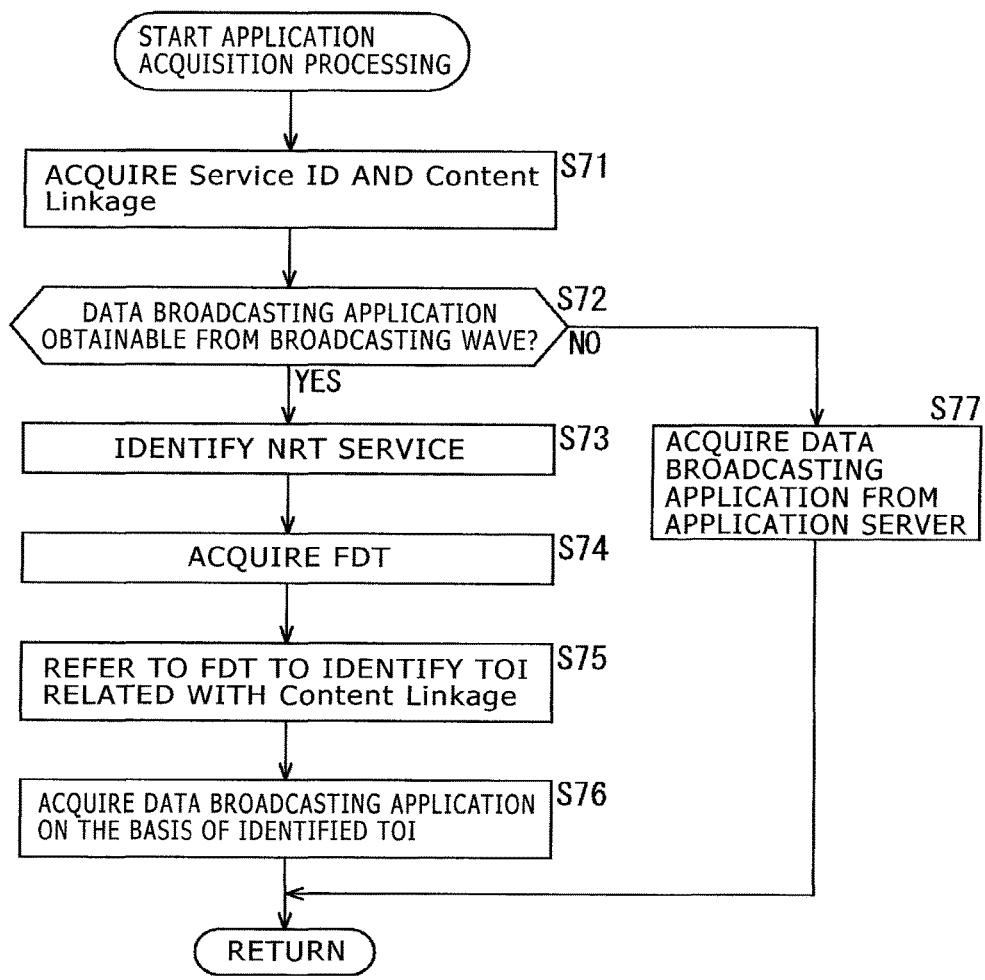
FIG. 25 is a flowchart indicative of application acquisition processing.

The following describes trigger information handling processing to be executed when the receiving apparatus 12 receives trigger information with reference to the flowchart shown in FIG. 24 and FIG. 25.

(Trigger Information Handling Processing of Scheme 1B)

First, referring to the flowchart shown in FIG. 24, the trigger information handling processing based on scheme 1B is described. It should be noted that this trigger information handling processing is repetitively executed while the user is viewing a television program, namely, when the receiving apparatus 12 is receiving broadcast signals.

In step S51, the trigger extraction block 66 monitors whether trigger information transmitted as included in a broadcast wave has been received and waits until trigger signal is received. When trigger signal is found to have been received, the procedure goes to step S52.

In step S52, the control block 58 determines on the basis of Trigger_id included in the trigger information whether or not the processing operations of step S53 and subsequent steps have already executed on the trigger information concerned. If the processing operations of step S53 and subsequent steps are found to have already been executed, then the procedure returns to step S51 to repeat the above-mentioned processing operations therefrom. By contrast, if the processing operations of step S53 and subsequent steps are found to have not yet been executed, then the procedure goes to step S53.

In step S53, the control block 58 determines on the basis of Command_code included in the trigger information whether the command indicated by the trigger information concerned is a register command, an execute command, an event command, a suspend command, or a terminate command. After the determination processing of step S53, the procedure goes to step S54.

Like the steps S32 through S45 shown in FIG. 18, application control is executed in steps S54 through S67 in accordance with a register command, an execute command, an event command, a suspend command, or a terminate command determined by the determination processing of step S53.

It should be noted that the difference between FIG. 24 and FIG. 18 lies in that the FLUTE processing block 67 is controlled by the control block 58 in step S55 or S58 to execute application acquisition processing in FIG. 24. In this application acquisition processing, the SMT and NRT-IT are referenced on the basis of Service ID and Content Linkage written to Trigger_target included in the trigger information to identify the TOI of the FDT, thereby obtaining a data broadcast application transmitted in a FLUTE session. The FLUTE processing block 67 holds the obtained data broadcast application in the cache memory 64.

It should be noted that details of the application acquisition processing will be described later with reference to the flowchart shown in FIG. 25.

Thus, the trigger information handling processing based on scheme 1B has been described.

(Application Acquisition Processing)

The following describes details of the application acquisition processing corresponding to step S55 or step S58 shown in FIG. 24 with reference to the flowchart shown in FIG. 25.

In step S71, the control block 58 acquires Service ID and Control Linkage written to Trigger_target included in the trigger information extracted by the trigger extraction block 66.

In step S72, the control block 58 controls the FLUTE processing block 67 to check whether a data broadcast application has been transmitted by broadcast wave, thereby determining whether or not the data broadcast application can be obtained from the broadcast wave. If the data broadcast application is found that the data broadcast application can be obtained from the broadcast wave in step S72, then the procedure goes to step S73.

In step S73, under the control of the control block 58, the FLUTE processing block 67 references the SMT to search the same Service ID (SMT) as the Service ID written to Trigger_target for an NRT service that matches the condition concerned.

In step S74, under the control of the control block 58, the FLUTE processing block 67 acquires IP(src), IP(dest), and FLUTE Session Info related with the identified Service ID, thereby obtaining an FDT with TOI=0 from a FLUTE session identified by the combinations of these items of the information.

In step S75, under the control of the control block 58, the FLUTE processing block 67 references the FDT to search the same Content Linkage (FDT) as the Content Linkage (NRT-IT) related with the Content Linkage written to Trigger_target for a TOI related with Content Linkage that matches the condition concerned.

In step S76, under the control of the control block 58, the FLUTE processing block 67 acquires a data broadcast application on the basis of an object identified by the identified TOI in a FLUTE session and holds the obtained data broadcast application in the cache memory 64. Consequently, the data broadcast application has been obtained from the broadcast wave.

On the other hand, if a data broadcast application is determined that the data broadcast application cannot be obtained from the broadcast wave, then the procedure goes to step S77. In step S77, the control block 58 references Internet Location of the NRT-IT and, at the same time, controls the communication I/F 61 and the application engine 63 to access the application server 16 via the Internet 20, thereby acquiring the data broadcast application and hold the obtained data broadcast application in the cache memory 64. In this case, the data broadcast application distributed via the Internet 20 has been obtained rather than by broadcast wave.

When the processing of step S76 or S77 has been terminated, the procedure returns to step S55 or S58 to repeat the above-mentioned processing operations therefrom.

Thus, the description of the application acquisition processing has been completed. In the application acquisition processing, a data broadcast application transmitted by broadcast wave is obtained in principle. However, if no NRT service is provided or a data broadcast application to be obtained by the receiving apparatus 12 is not found in the broadcast wave, for example, then a data broadcast application is obtained from the application server 16 via the Internet 20.

Thus, scheme 1B has been described.

As described above, in the first embodiment, trigger information in accordance with an identification result of ACR identification processing or trigger information transmitted as included in a broadcast wave is received by the trigger information handling processing based on scheme 1A or scheme 1B. Then, in accordance with a command obtained from the trigger information concerned, a data broadcast application is obtained via a broadcast wave or the Internet and the operation of the obtained data broadcast application is controlled.

Thus, the description of the first embodiment has been completed.

The Second Embodiment

[The Basic Concept]

Figure 26:
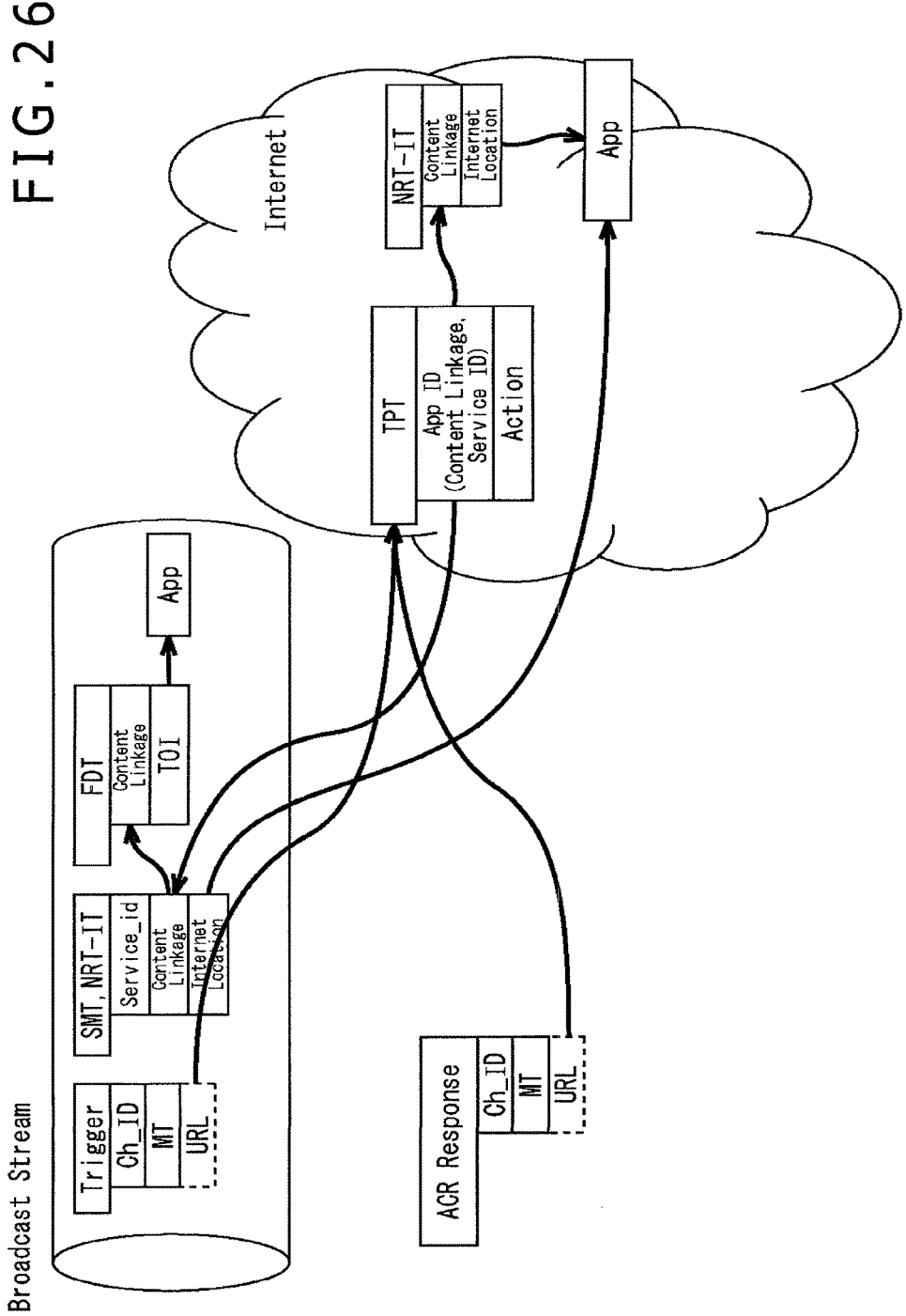
FIG. 26 is a schematic diagram illustrating a basic concept of the present technology and practiced as a second embodiment.

Referring to FIG. 26, there is shown a basic concept of the second embodiment of the present technology.

In the second embodiment, an operation of a data broadcast application is controlled in accordance with a command identified by trigger information (Trigger) and a TPT (Trigger Parameter Table). Trigger information is transmitted as included in a broadcast wave or obtained from an identification result of ACR identification processing.

On the basis of the trigger information (Trigger) transmitted as included in a broadcast wave or the trigger information (ACR Response) from the ACR server, a receiver accesses a TPT server to acquire a TPT. On the basis of the obtained TPT, the receiver identifies a command corresponding to the trigger information to acquire a data broadcast application from an application server or a broadcast wave in accordance with the command concerned.

If a data broadcast application is obtained from the application server, the receiver accesses a file server via the Internet 20 to acquire an NRT-IT (NRT Information Table). The NRT-IT concerned has the same configuration as or a configuration corresponding to that of the NRT-IT transmitted by broadcast wave, in which the URL of the application server is specified as Internet Location. In accordance with the command identified by the TPT, the receiver accesses the application server on the basis of the NRT-IT to acquire a data broadcast application.

On the other hand, in acquiring a data broadcast application transmitted by broadcast wave, the receiver references the SMT and the NRT-IT by use of Service ID and Content Linkage obtained from the application ID written to the TPT as a search condition to identify the TOI of an FDT, thereby acquiring a data broadcast application transmitted in a FLUTE session.

It should be noted that, for the method of transmitting a data broadcast application in a FLUTE session, the method described before with reference to FIG. 2 through FIG. 9B can be used. However, if a data broadcast application transmitted by broadcast wave could not be obtained, the URL of the application server written to Internet Location written to the NRT-IT obtained from a broadcast wave may be referenced to access the application server, thereby acquiring a data broadcast application.

Then, in accordance with the command identified by the TPT, the receiver controls an operation of the obtained data broadcast application.

Thus, the basic concept of the second embodiment of the present technology has been described.

It should be noted that, in the second embodiment, the configurations of a broadcasting system 1 and a receiving apparatus 12 are substantially the same as those of the first embodiment described before, so that the illustration of these configurations are skipped and these configurations will be described with reference to FIG. 10 and FIG. 11.

In the second embodiment, there are provided a method of obtaining trigger information (ACR Response) in accordance with an identification result of ACR identification processing and a method of obtaining trigger information (Trigger) transmitted as included in a broadcast wave for the methods of obtaining trigger information for operating a data broadcast application as described before. In what follows, the former method is referred to as scheme 2A and the latter method is referred to as scheme 2B, which will be described below in this order.

[Scheme 2A]

The following describes scheme 2A with reference to FIG. 27 through FIG. 30.

[Details of Trigger Information]

Details of trigger information (ACR Response) in scheme 2A are substantially the same as those of trigger information of scheme 1A shown in FIG. 12, so that the description thereof is skipped.

[Details of TPT]

The following describes details of a TPT. FIG. 27 shows one example of a TPT format.

As shown in FIG. 27, a TPT is configured to have an application element in addition to a tpt element, a command element, an event element, and a diffusion element. Because the tpt element, the command element, the event element, and the diffusion element are substantially the same as those of the TPT shown in FIG. 14, the description of these elements is skipped.

To the application element, information associated with a data broadcast application is written. The application element includes an id attribute.

The id attribute specifies an application ID for identifying the data broadcast application concerned. With the application ID, Content Linkage and Service ID are assigned to predetermined bits of the bit string of the application ID. Therefore, Content Linkage and Service ID can be obtained from the application ID.

A TPT is configured as described above.

[Method of Getting a Data Broadcast Application]

Figure 28:
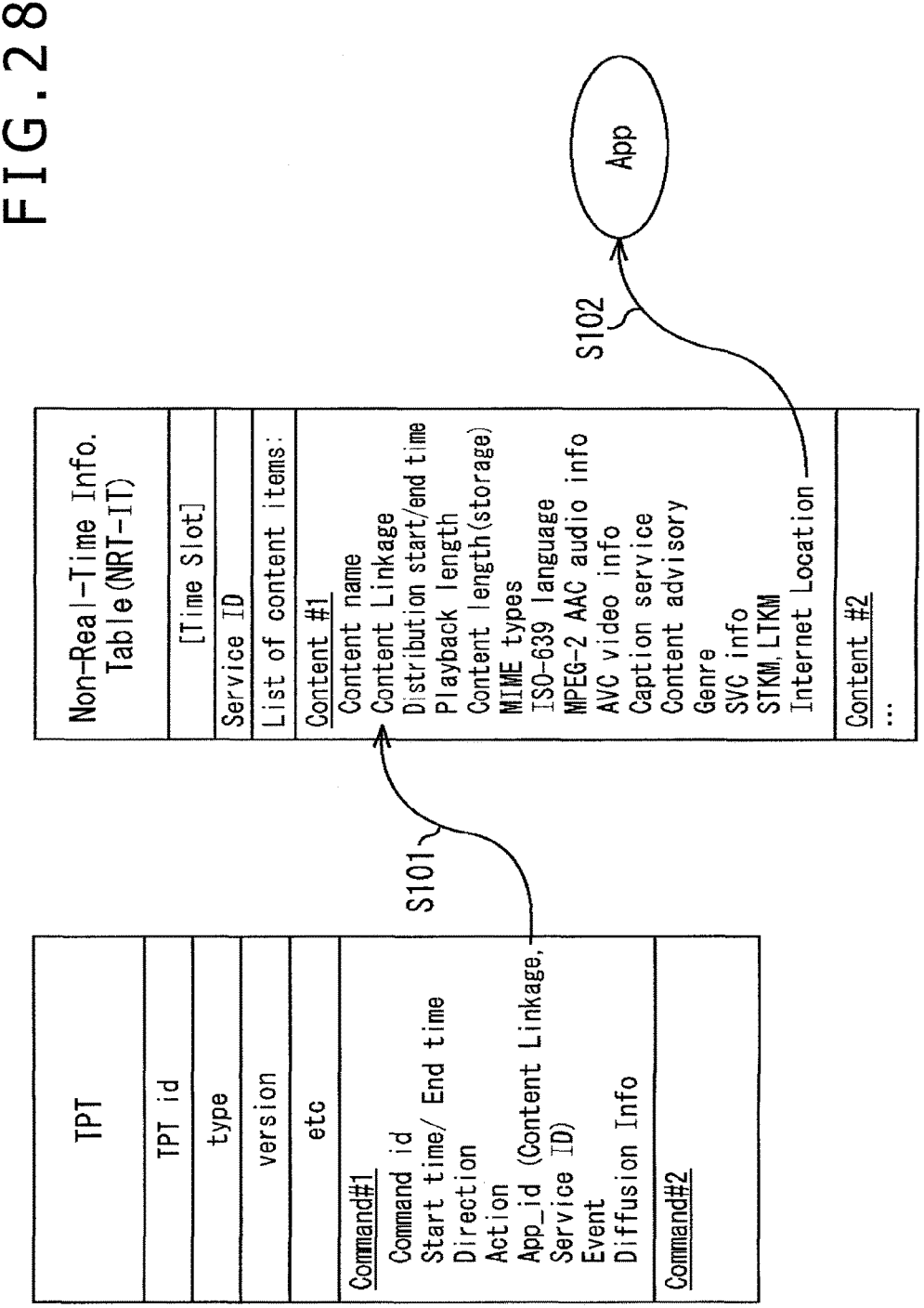
FIG. 28 is a diagram illustrating one example of a format of TPT of scheme 2.

The following describes a method of acquiring a data broadcast application with reference to FIG. 28. The receiving apparatus 12 accesses a TPT server in accordance with the URL obtained from the trigger information from an ACR server 13, thereby acquiring a TPT. In addition, the receiving apparatus 12 accesses a file server 14 to obtain an NRT-IT.

Referring to FIG. 28, there are shown tables TPT and NRT-IT. It should be noted that, in FIG. 28, the NRT-IT has substantially the same configuration as or a configuration corresponding to that of the NRT-IT shown in FIG. 13.

As described before, with a TPT, the id attribute of the application element is indicative of Content Linkage and Service ID. Therefore, the receiving apparatus 12 references the NRT-IT to identify Content Linkage related with Content Linkage obtained from the application ID of the TPT (S101). Also, the receiving apparatus 12 obtains the URL of the application server 16 written to Internet Location related with the identified Content Linkage. Then, the receiving apparatus 12 accesses the application server 16 via the Internet 20 on the basis of the obtained URL to acquire a data broadcast application (S102).

Thus, the method of obtaining a data broadcast application provided via the Internet 20 has been described.

[Trigger Information Handling Processing]

Figure 29:
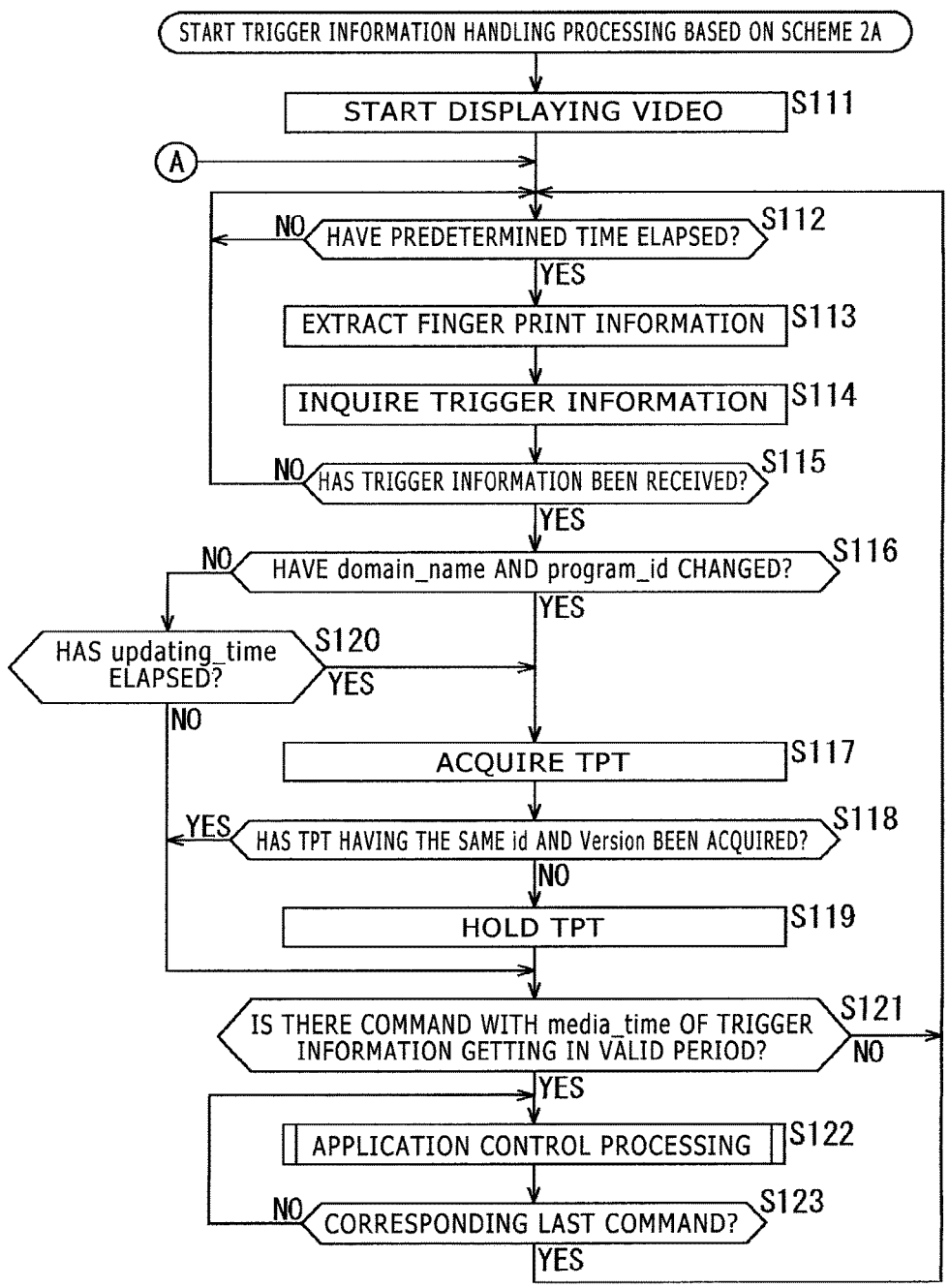
FIG. 29 is a flowchart indicative of trigger information handling processing of scheme 2A.
Figure 30:
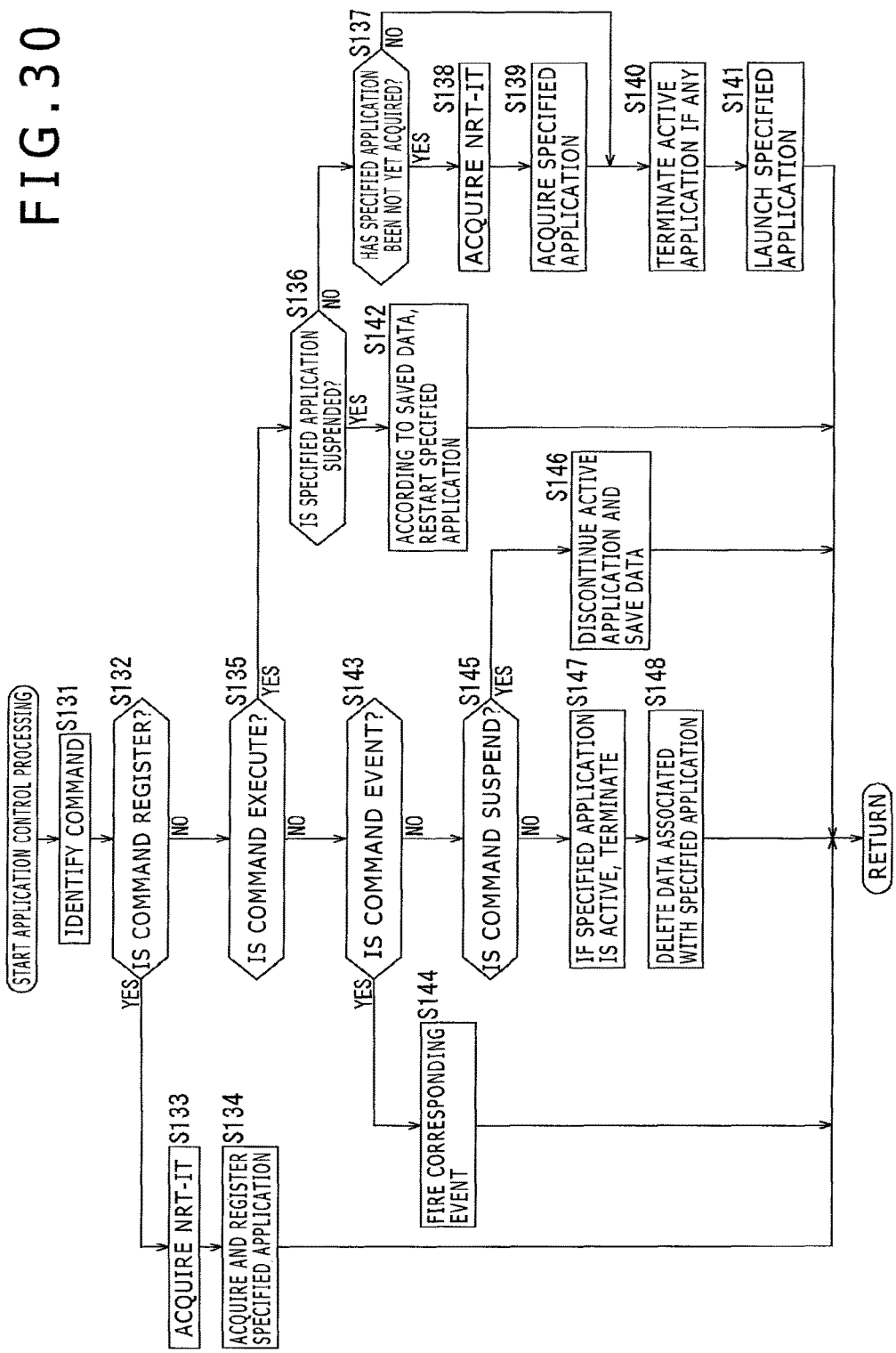
FIG. 30 is a flowchart indicative of application control processing.

The following describes trigger information handling processing to be executed when the receiving apparatus 12 receives trigger information with reference to the flowcharts shown in FIG. 29 and FIG. 30.

(Trigger Information Handling Processing Based on Scheme 2A)

First, the trigger information handling processing based on scheme 2A will be described with reference to the flowchart shown in FIG. 29. It should be noted that this trigger information handling processing is repetitively executed while the user is viewing a television program, namely, the receiving apparatus 12 is receiving a broadcast signal.

In steps S111 through S123, trigger information handling processing is executed in basically the same manner as in steps S11 through S24 shown in FIG. 17. However, in step S117, a TPT is obtained by accessing the TPT server 15 identified by the URL obtained from the trigger information in obtaining the TPT.

To be more specific, the TPT server 15 was accessed on the basis of the URL obtained from the NRT-IT and the TPT-IT in step S18 shown in FIG. 17; in step S117, however, the TPT server 15 is accessed on the basis of the URL obtained by attaching "http://" to the beginning of the trigger information received from the ACR server 13, for example.

The other processing operations are substantially the same as those described with reference to the flowchart shown in FIG. 17, so that the description thereof is skipped.

Thus, the description of the trigger information handling processing based on scheme 2A has been completed.

(Application Control Processing)

The following describes application control processing corresponding to step S122 shown in FIG. 29 with reference to the flowchart shown in FIG. 30.

As with steps S31 through S45 shown in FIG. 18, application control processing is executed in steps S131 through S148. A difference lies in that a data broadcast application acquisition operation to be executed at the time of register command or execute command execution.

To be more specific, in steps S33 and S36 shown in FIG. 18, the application server 16 is accessed on the basis of the URL of Internet Location written to the NRT-IT obtained on the basis of the URL obtained from trigger information. By contrast, in steps S133 and S134 shown in FIG. 30, the NRT-IT related with Content Linkage obtained from the application ID of the TPT is obtained and, on the basis of the URL of Internet Location written to the NRT-IT concerned, the application server 16 is accessed to acquire a data broadcast application.

It should be noted that, in steps S137 through S139, the same processing as above is also executed if a data broadcast application is to be obtained.

The other processing operations are substantially the same as those described before with reference to the flowchart shown in FIG. 18, so that the description thereof is skipped.

Thus, scheme 2A has been described.

[Scheme 2B]

Figure 31:
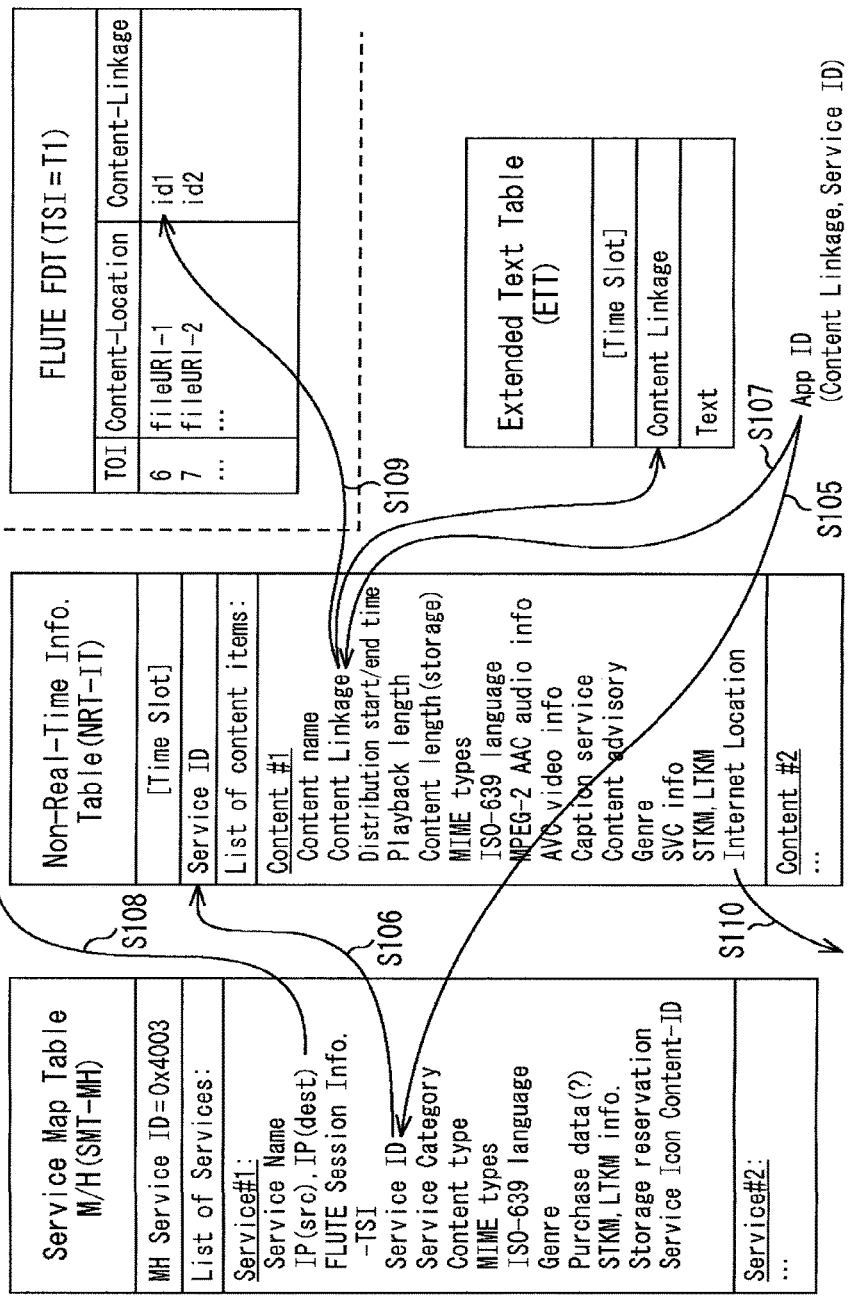
FIG. 31 is a diagram illustrating one example of tables that are transmitted by broadcast wave.
Figure 32:
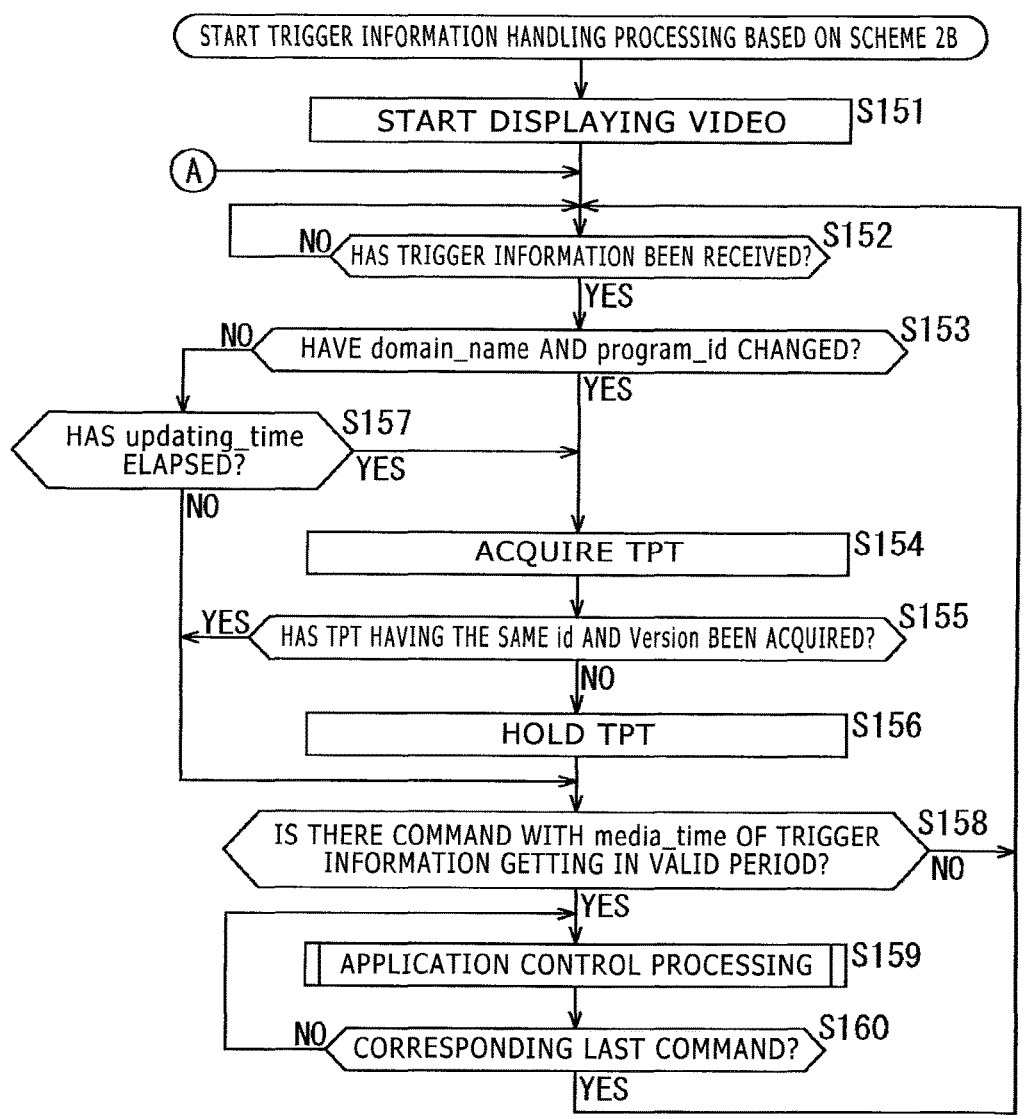
FIG. 32 is a flowchart indicative of trigger information handling processing of scheme 2B.

The following describes scheme 2B with reference to FIG. 31 and FIG. 32.

[Details of Trigger Information]

Details of trigger information (Trigger) in scheme 2B are substantially the same as those of scheme 1A described with reference to FIG. 12, so that the description thereof is skipped.

[Details of TPT]

Details of the TPT in scheme 2B are substantially the same as those of the TPT in scheme 2A described with reference to FIG. 27, so that the description thereof is skipped.

[Method of Obtaining a Data Broadcast Application]

The following describes a method of obtaining a data broadcast application transmitted by broadcast wave with reference to FIG. 31. When the receiving apparatus 12 receives trigger information transmitted as included in a broadcast wave, the receiving apparatus 12 tries to acquire a data broadcast application if the command corresponding to the trigger information identified on the basis of the TPT is a register command or an execute command. In doing so, the receiving apparatus 12 references tables SMT, NRT-IT, and FDT transmitted by broadcast wave.

The attribute information written to tables SMT, NRT-IT, and FDT was described before with reference to FIG. 23, so that the description thereof is skipped.

The receiving apparatus 12 acquires a data broadcast application transmitted by broadcast wave with reference to the SMT, the NRT-IT, and the FDT. To be more specific, this processing is executed as described below. It should be noted that, as described above, a data broadcast application is transmitted as NRT content (instead of NRT content) as an assumption.

To be more specific, if the receiving apparatus 12 has received trigger information transmitted as included in a broadcast wave and the command corresponding to the trigger information identified on the basis of the TPT is a register command or an execute command, then an application ID is related with the command, so that the receiving apparatus 12 acquires Content Linkage and Service ID written to the application ID. Next, the receiving apparatus 12 references the SMT to search the Service IDs of NRT services for the Service ID matching the obtained Service ID, thereby identifying the NRT service matching the condition concerned (S105).

Next, the receiving apparatus 12 identifies an NRT-IT having the same Service ID as the Service ID of the identified NRT service (S106). Then, the receiving apparatus 12 references the identified NRT-IT to search Content Linkages of the NRT content written to the NRT-IT for a Content Linkage matching the obtained Content Linkage, thereby identifying NRT content matching the condition concerned (S107).

In addition, the receiving apparatus 12 references the SMT to acquire IP(src), IP(dest), and FLUTE Session Info related with the Service ID identified in step S105. Then, the receiving apparatus 12 acquires an FDT with TOI=0 from the FLUTE session (TSI=T1) identified by a combination of obtained IP address (S1) and port number (P1).

Next, the receiving apparatus 12 references the FDT obtained in step S108 to search the same Content Linkage (FDT) as the identified Content Linage (NRT-IT) to identify the Content Linkage (Content Linkage=id1) matching the condition concerned (S109). Then, the receiving apparatus 12 identifies TOI (TOI=6) related with the Content Linkage identified in step S109.

Consequently, the receiving apparatus 12 obtains a data broadcast application on the basis of an object identified by the identified TOI (TOI=6) in the FLUTE session (TSI=T1).

As described above, by referencing the SMT and the NRT-IT with Service ID and Content Linkage written to the application ID of a register command or an execute command identified by the TPT used as a search condition, the TOI of the FDT is identified and a data broadcast application transmitted in a FLUTE session is obtained.

It should be noted that, if a data broadcast application transmitted by broadcast wave cannot be obtained by the method described above, the receiving apparatus 12 references Internet Location of an NRT-IT to acquire a data broadcast application from the application server 16 via the Internet 20 (S110).

Thus, the method of obtaining a data broadcast application transmitted by broadcast wave has been described.

[Trigger Information Handling Processing]

The following describes trigger information handling processing to be executed when the receiving apparatus 12 receives trigger information with reference to the flowchart shown in FIG. 32.

(Trigger Information Handling Processing of Scheme 2B)

The following describes the trigger information handling processing of scheme 2B with reference to the flowchart shown in FIG. 32. It should be noted that this trigger information handling processing is repetitively executed while the user is viewing a television program, namely, the receiving apparatus 12 is receiving a broadcast signal.

When a predetermined channel is selected by the user, the receiving apparatus 12 starts displaying the video of a television program on that channel (step S151).

In step S152, the trigger extraction block 66 monitors whether the trigger information transmitted as included in a broadcast wave has been received and waits until the trigger information is received. Then, when the trigger information is received, the procedure goes to step S153.

As with steps S116 through S123 shown in FIG. 29, in steps S153 through S160, if domain_name and program_id included in the receive trigger information have changed, a TPT is obtained by the TPT analysis block 62 and, if the obtained TPT has not been obtained, the obtained TPT is held. In addition, if the control block 58 determines that the media_time included in the received trigger information is within the valid period, then an operation of a data broadcast application is controlled in accordance with the valid command.

It should be noted that the application control processing in step S159 is basically the same as the application control processing shown in FIG. 30. However, a difference lies in the operation of obtaining a data broadcast application at the execution of a register command or an execute command. To be more specific, in the application control processing in step S159, the SMT and the NRT-IT transmitted by broadcast wave are referenced with Service ID and Content Linkage written to the application ID of the register command or the execute command identified by TPT used as a search condition, thereby identifying the TOI of the FDT to acquire a data broadcast application transmitted in a FLUTE session.

The other processing operations are substantially the same as those described with reference to the flowchart shown in FIG. 30, so that the description thereof is skipped.

Thus, scheme 2B has been described.

As described above, in the second embodiment, trigger information in accordance with an identification result of ACR identification processing or trigger information transmitted as included in a broadcast wave is received by the trigger information handling processing based on scheme 2A or scheme 2B. Then, in accordance with a command related with the trigger information identified on the basis of the TPT, a data broadcast application is obtained by broadcast wave or via the Internet and the operation of the obtained data broadcast application is controlled.

It should be noted that, in the second embodiment, it was described by way of example that a data broadcast application distributed via the Internet is obtained in scheme 2A and a data broadcast application transmitted by broadcast wave is obtained in scheme 2B. By contrast, a data broadcast application transmitted by broadcast wave may be obtained in scheme 2A and a data broadcast application distributed via the Internet may be obtained in scheme 2B.

[Method of Obtaining TPT]

Meanwhile, in the description done above, a new TPT file is obtained when the value of domain_name or program_id has changed; however, in acquiring the TPT file concerned, a TPT file corresponding to the performance of the receiving apparatus 12 may be obtained. For example, if there are two or more data broadcast applications corresponding to the performance of the receiving apparatus 12, a TPT file is independently prepared for each class of the performance concerned.

Figure 33:
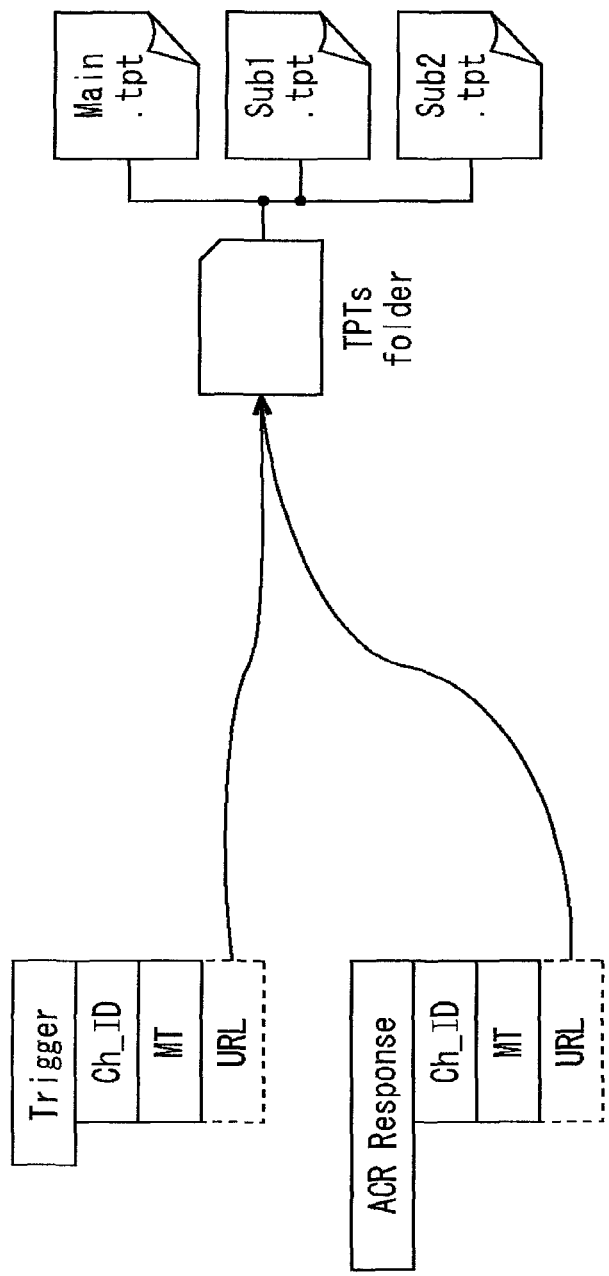
FIG. 33 is a diagram illustrating a hierarchical structure of TPF files.

As shown in FIG. 33, the TPT server 15 stores and hold a TPT file for each class into a predetermined TPT folder. On the basis of the URL obtained from trigger information, the receiving apparatus 12 accesses the TPT server 15. It is assumed that a predetermined TPT folder be specified to the URL concerned, rather than a predetermined TPT file. Further, a priority for obtaining a TPT file is set to the receiving apparatus 12 in advance, thereby allowing the specification of a TPT file stored in a TPT folder in accordance with the priority.

For example, in the TPT server 15, if TPT files Main.tpt, Sub1.tpt, Sub2.tpt are stored in a TPT folder and acquisition priority is set in the receiving apparatus 12 in the order of Main.tpt, Sub1.tpt, Sub2.tpt, then the receiving apparatus 12 tries to acquire a file in this priority order. At this moment, the receiving apparatus 12 attaches a TPT file name character string to a character string representative of the URL obtained from trigger information, thereby allowing the receiving apparatus 12 to access a predetermined file stored in the TPT folder.

For example again, if Main.tpt is a TPT file corresponding to a class requiring the highest performance, Sub1.tpt is a TPT file corresponding to a class requiring the next highest performance, and Sub2.tpt is a TPT file corresponding to a class requiring the lowest performance, then the receiving apparatus 12 first acquires Main-tpt to check if the own performance satisfies the required performance. If the required performance is found to be satisfied, then the receiving apparatus 12 holds Main.tpt as a TPT.

On the other hand, if the performance required by Main.tpt is found to be not satisfied, then the receiving apparatus 12 acquires Sub1.tpt. If the performance required by Sub1.tpt is found to be satisfied, the receiving apparatus 12 holds Sub1.tpt as a TPT. If the performance required by Sub1.tpt is found to be not satisfied, the receiving apparatus 12 acquires Sub2.tpt. Next, if the performance required by Sub2.tpt is found to be satisfied, the receiving apparatus 12 holds Sub2.tpt as a TPT.

If the performance required by Sub2.tpt is found to be not satisfied, the receiving apparatus 12 does not execute a TPT acquisition processing and a data broadcast application operation until the value of domain_name or program_id included in the trigger information changes.

[Details of TPT Corresponding to Classes]

Referring to FIG. 34, there is shown one example of a format of TPT corresponding to classes.

The TPT shown in FIG. 34 has capability element added to tpt element, unlike the TPT shown in FIG. 27. The other elements and attributes are substantially the same as those shown in FIG. 27, so that the description thereof is skipped.

To a capability element of a tpt element, various types of performance required for the reception apparatus are specified. The capability element includes an essential attribute. To the essential element, "yes" is specified if the required performance is essential, while "no" is specified if the required performance is optional.

[Example of Description of TPT Corresponding to Classes]

Referring to FIG. 35, there is shown one example of a TPT corresponding to classes.

Following the start tag of the tpt element, "flute" is written as the capability element. To the capability element, "no" is specified as the essential attribute. Namely, because a FLUTE session is an optional function, the receiving apparatus 12 may not correspond to the function of a FLUTE session. In the case of this description example, if the receiving apparatus 12 does not correspond to the function of a FLUTE session, the receiving apparatus 12 may acquire a data broadcast application from the application server 16, so that "no" is specified to the essential attribute.

As the capability element, "avc_40" is written and "yes" is specified as the essential attribute thereof. Namely, because AVC level 4.0 is an essential function, the receiving apparatus 12 needs to correspond to the function of reproducing the content compression-coded with AVC level 4.0. In this case of description example, if the receiving apparatus 12 does not correspond to AVC level 4.0, the content launched from a data broadcast application cannot be reproduced, so that "yes" is specified to the essential attribute.

It should be noted that any other TPT description methods may be used than the description example shown in FIG. 35.

[TPT Acquisition Processing]

Figure 36:
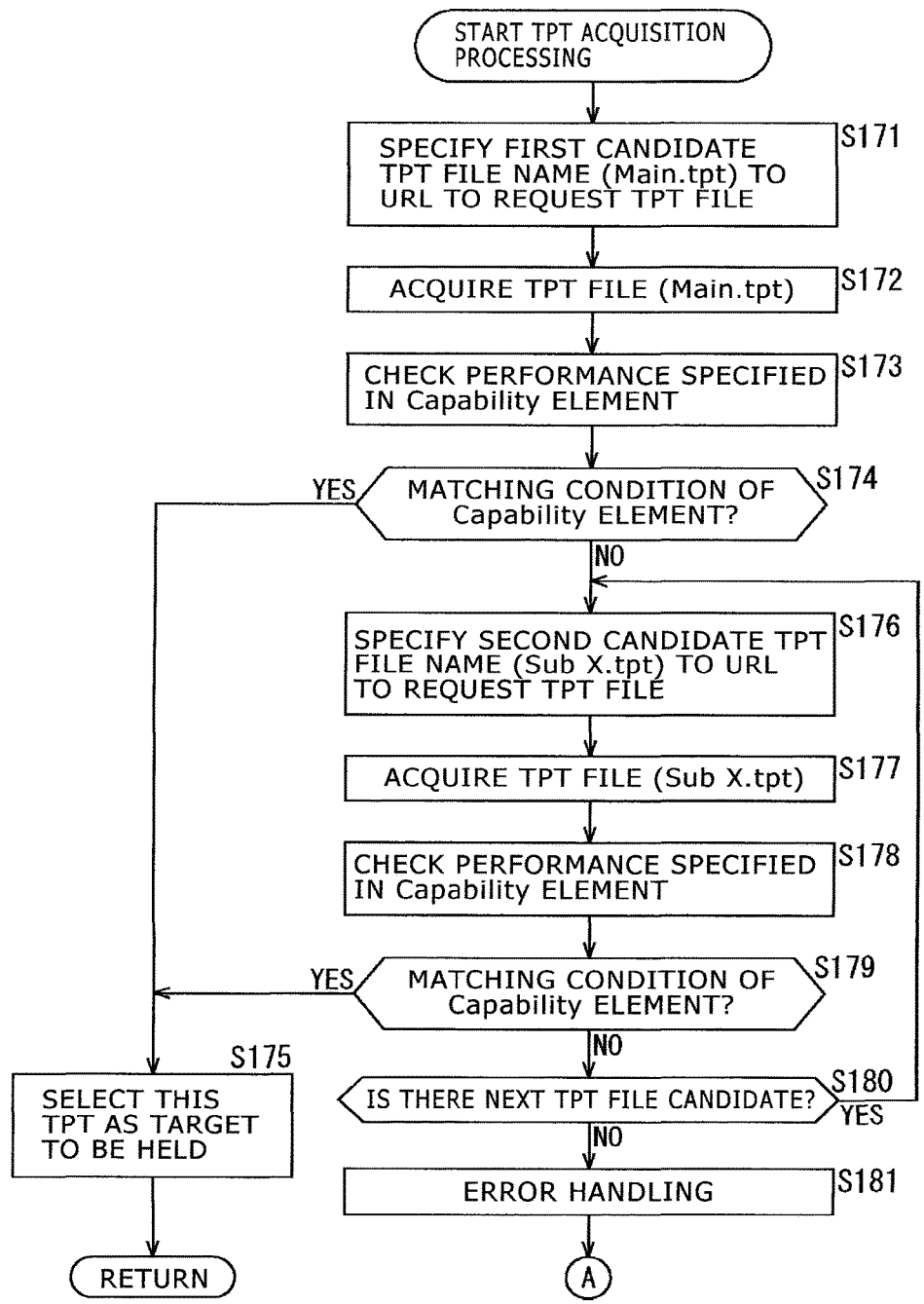
FIG. 36 is a flowchart indicative of TPT acquisition processing.

The following describes TPT acquisition processing with reference to the flowchart shown in FIG. 36. It should be noted that TPT acquisition processing corresponds to step S117 shown in FIG. 29 or step S154 shown in FIG. 32.

In step S171, the control block 58 specifies a first candidate TPT file name (Main.tpt for example) for the URL obtained from the extracted trigger information and controls the communication I/F 61 to access the TPT server 15, thereby requesting for a TPT file.

In step S172, the TPT analysis block 62 controls the communication I/F 61 to acquire a TPT file (Main.tpt for example) from the TPT server 15.

In step S173, the control block 58 checks if the receiving apparatus 12 has the performance specified in the capability element of the TPT from the TPT analysis block 62. If "avc_42" is specified to the capability element, for example, it is checked whether the receiving apparatus 12 is compatible with the function of reproducing the content compression-coded with AVC level 4.2.

In step S174, on the basis of a checking result of step S173, the control block 58 determines whether or not the receiving apparatus 12 satisfies a condition specified in the capability element. If the receiving apparatus 12 is found to satisfy a condition specified in the capability element in step S174, then the procedure goes to step S175.

In step S175, the control block 58 selects the TPT file satisfying the condition specified in the capability element as a file to be held. Consequently, in step S119 shown in FIG. 29 or step S156 shown in FIG. 32, the TPT analysis block 62 holds the TPT file concerned.

On the other hand, if the TPT file is found not to satisfy the condition specified in the capability element in step S174, then the procedure goes to step S176. In step S176, the control block 58 specifies a next candidate TPT file name (Sub1.tpt for example) to the URL obtained from the trigger information and accesses the TPT server 15 by controlling the communication I/F 61, thereby requesting for a TPT file.

In step S177, the communication I/F 61 is controlled to acquire a TPT file (Sub1.tpt for example) from the TPT server 15.

In step S178, the control block 58 checks if the receiving apparatus 12 has the performance specified in the capability element of the TPT from the TPT analysis block 62. Here, if "avc_40" is specified in the capability element, for example, it is checked whether the receiving apparatus 12 is compatible with the function of reproducing the content compression-coded with AVC level 4.0.

In step S179, it is determined on the basis of a check result of step S178, whether or not the receiving apparatus 12 satisfies a condition specified in the capability element. If the receiving apparatus 12 is found to satisfy a condition specified in the capability element in step S179, then the procedure goes to step S175, in which the TPT file concerned is selected as a file to be held.

On the other hand, if the condition specified in the capability element is found not to be satisfied in step S179, then the procedure goes to step S180. In step S180, the control block 58 checks whether or not there is a next candidate TPT file.

If a next TPT file candidate is found in step S180, then the procedure returns to step S176 to repeat the above-mentioned processing operations therefrom. For example, Sub2.tpt is specified in the URL as a next TPT file name and it is determined whether or not a condition specified in the capability element of the obtained Sub2.tpt is satisfied.

It should be noted that, if no next TPT file candidate is found in step S180, then the procedure goes to step S181. In step S181, the control block 58 executes predetermined error handling processing. Then, the procedure returns to step S112 shown in FIG. 29 or step S152 shown in FIG. 32 to repeat the above-mentioned processing operations therefrom.

Thus, the TPT acquisition processing has been described. In the TPT acquisition processing, when a new TPT file is obtained if the value of domain_name or program_id has changed, a TPT file corresponding to the performance of the receiving apparatus 12 is obtained.

Thus, the second embodiment has been described.

The Third Embodiment

[Basic Concept]

Figure 37:
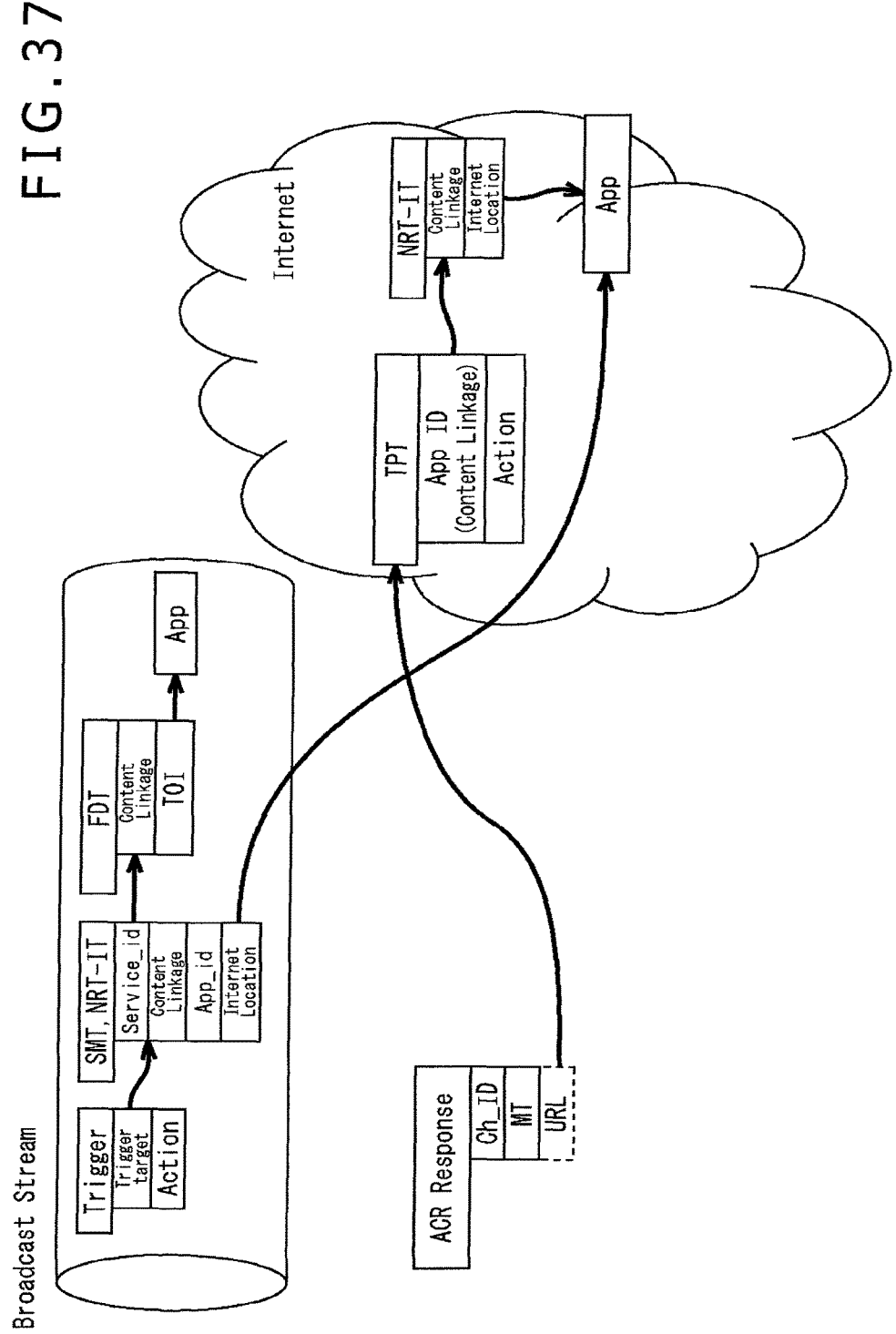
FIG. 37 is a diagram illustrating a basic concept of a present technology and practiced as a third embodiment.

Referring to FIG. 37, there is shown a basic concept of the third embodiment of the present technology.

In the third embodiment, the operation of a data broadcast application is controlled either in accordance with a command identified on the basis of trigger information (ACR Response) in accordance with an identification result of ACR identification processing and a TPT (Trigger Parameter Table) or on the basis of a command obtained from trigger information (Trigger) transmitted as included in a broadcast wave.

On the basis of the trigger information (ACR Response) from an ACR server, a receiver accesses a TPT server to acquire a TPT. On the obtained TPT, the receiver identifies a command corresponding to the trigger information. In addition, the receiver acquires an NRT-IT from a file server.

In accordance with the identified command, the receiver references the URL of Internet Location written to the NRT-IT obtained from the file server to access an application server, thereby acquiring a data broadcast application. Then, the receiver controls the operation of the obtained data broadcast application in accordance with the command identified by the TPT.

Further, on the basis of a command obtained from trigger information (Trigger) transmitted as included in a broadcast wave, the receiver acquires a data broadcast application transmitted by a broadcast wave. In obtaining a data broadcast application transmitted by broadcast wave, the receiver references an SMT and an NRT-IT with Service ID and Content Linkage obtained from trigger information used as a search condition to identify the TOI of an FDT, thereby obtaining a data broadcast application transmitted in a FLUTE session.

It should be noted that, for a method transmitting a data broadcast application in a FLUTE session, the method described above with reference to FIG. 2 through FIG. 9 can be used. If a data broadcast application transmitted by broadcast wave could not be obtained, then a data broadcast application may be obtained by accessing the application server by referencing the URL of Internet Location written to the NRT-IT obtained from a broadcast wave.

Thus, the basic concept of the third embodiment of the present technology has been described.

It should be noted that, in the third embodiment, the configurations of a broadcasting system 1 and a receiving apparatus 12 are substantially the same as those of the first embodiment described above, so that the illustrations thereof are skipped.

In addition, in the third embodiment, there are two methods of obtaining trigger information for operating a data broadcast application as described before: in one method, trigger information (ACR Reference) is obtained in accordance with an ACR identification result; in the other method, trigger information (Trigger) transmitted as included in a broadcast wave is obtained. Here, the former is referred to as scheme 3A and the latter is referred to as scheme 3B.

[Scheme 3A]

In scheme 3A, trigger information is obtained in basically the same manner as scheme 2A and trigger information handling processing is executed.

To be more specific, in accordance with the URL obtained from the trigger information (ACR Response) from the ACR server 13, the receiving apparatus 12 accesses the TPT server to acquire a TPT. In addition, the receiving apparatus 12 accesses the file server 14 to acquire an NRT-IT. Then, if the command identified by the TPT is a register command or an execute command, the receiving apparatus 12 references the NRT-IT to identify Content Linkage related with the Content Linkage obtained from an application ID of the command concerned, thereby acquiring the URL of an application server 16 written to the Internet Location.

Consequently, on the basis of the obtained URL, the receiving apparatus 12 accesses the application server 16 via the Internet 20 to acquire a data broadcast application. Then, in accordance with a command identified by the TPT, the receiving apparatus 12 controls the operation of the obtained data broadcast application.

It should be noted that the details of scheme 3A are substantially the same as those of above-described scheme 2A shown in FIG. 27 through FIG. 30, so that the description thereof is skipped for brevity. However, as shown in FIG. 37, in the case of scheme 3A, only Content Linkage is assigned to a predetermined bit among a bit string of the application ID. This is because, unlike scheme 2A, scheme 3A does not acquire a data broadcast application from a broadcast wave, so that the relating with an NRT-IT for acquiring the URL of the application server 16 can be done only by Content Linkage.

As with scheme 2A, scheme 3A allows the receiving apparatus 12 to acquire a TPT file corresponding to the performance of the receiving apparatus 12 in acquiring a TPT by preparing a TPT file for each class by the TPT server 15. It should be noted that a method of acquiring a TPT in accordance with the performance of the receiving apparatus 12 is as described above with reference to FIG. 33 through FIG. 36.

[Scheme 3B]

In scheme 3B, trigger information is obtained in basically the same manner as above-described scheme 1B and trigger information handling processing is executed.

To be more specific, if the command obtained from the trigger information (Trigger) transmitted as included in a broadcast wave is a register command or an execute command, then the receiving apparatus 12 acquires Service ID and Content Linkage written to Trigger_target of the trigger information concerned. On the basis of the obtained Service ID and Content Linkage, the receiving apparatus 12 references an SMT and an NRT-IT to identify the TOI of an FDT, thereby getting a data broadcast application transmitted in a FLUTE session.

It should be noted that, if a data broadcast application transmitted by broadcast wave could not be obtained, then the receiving apparatus 12 references Internet Location of the NRT-IT transmitted by broadcast wave to acquire a data broadcast application from the application server 16 via the Internet 20.

Then, in accordance with a command obtained from the trigger information transmitted as included in a broadcast wave, the receiving apparatus 12 controls the operation of the obtained data broadcast application.

It should be noted that the details of scheme 3A are substantially the same as those of above-described scheme 1B described with reference to FIG. 19A through FIG. 25, so that the description thereof is skipped for brevity.

As described above, in the third embodiment, trigger information corresponding to an identification result of ACR identification processing or trigger information transmitted as included in a broadcast wave is received by the trigger information handling processing based on scheme 3A or scheme 3B. In the trigger information handling processing based on scheme 3A, a data broadcast application distributed via the Internet 20 is obtained in accordance with a command related with the trigger information concerned identified by the TPT and the operation of the data broadcast application concerned is controlled. In the trigger information handling processing based on scheme 3B, a data broadcast application distributed by broadcast wave or via the Internet is obtained in accordance with a command obtained from the trigger information and the operation of the data broadcast application concerned is controlled.

Thus, the description of the third embodiment has been completed.

[Description of a Computer to which the Present Technology is Applied]

It should be noted that the above-mentioned sequence of processing operations may be executed by software as well as hardware. When the above-mentioned sequence of processing operations is executed by software, the programs constituting the software are installed in a computer. Here, the computer includes a computer built in dedicated hardware and such as a general-purpose personal computer into which various programs may be installed for the execution of various functions.

Referring to FIG. 38, there is shown a block diagram illustrating an exemplary hardware configuration of a computer that executes the above-mentioned sequence of processing operations by programs.

In a computer 300, a CPU (Central Processing Unit) 301, a ROM (Read Only Memory) 302, and a RAM (Random Access Memory) 303 are interconnected by a bus 304.

The bus 304 is further connected to an input/output interface 305. The input/output interface 305 is connected to an input block 306, an output block 307, a recording block 308, a communication block 309, and a drive 310.

The input block 306 has a keyboard, a mouse, a microphone, and the like. The output block 307 has a display, a loudspeaker, and the like. The recording block 308 is based on a hard disk drive, nonvolatile memory, or the like. The communication block 309 is based on a network interface for example. The drive 310 drives a removable media 311 such as a magnetic disk, an optical disk, a magneto-optical disk, or a semiconductor memory.

In the computer 300 configured as described above, the CPU 301 loads a program from the recording block 308 into the RAM 303 through the input/output interface 305 and the bus 304 and executes the loaded program, thereby executing the sequence of processing operations described above.

Programs that the computer 300 (or the CPU 301) execute can be recorded to the removable media 311 that is a package media for example and be provided. In addition, programs can be provided via wired or wireless transmission media, such as a local area network, the Internet, or digital satellite broadcasting, for example.

In the computer 300, each program can be installed into the recording block 308 via the input/output interface 305 by loading the removal media 311 in which the program is recorded onto the drive 310. In addition, each program can be installed in the recording block 308 by receiving at the communication block 309 via wired or wireless transmission media. Alternatively, each program may be installed in the ROM 302 or the recording block 308 in advance.

It should be noted that a program to be executed by the computer 300 can be executed in a time-dependent manner along a sequence described in the present specification or in parallel or at a required timing such as invocation of the program.

Here, in the present specification, it should be noted that processing steps for writing a program for making the computer 300 execute various kinds of processing operations need not always be processed in a time-dependent manner along the sequence described in a flowchart; these processing steps also include processing operations that are processed in parallel or discretely (parallel processing or processing based on objects, for example).

Furthermore, the above-mentioned program may be processed by a single computer or by a two or more computers in a distributed manner. Besides, the program may be transferred to a remote computer and executed therein.

Further, in the present specification, the term "system" denotes a set of two or more component elements (apparatuses or modules (parts), for example) and does not require that all the component elements are arranged in a single housing. Therefore, two or more apparatuses arranged in separate housings and interconnected via a network and one apparatus with two or more modules arranged in a single housing are called a system.

The preferred embodiments of the present technology is by no means limited to the contents of the preferred embodiment described above, and thus the preferred embodiment can be suitably changed without departing from the gist of the present technology.

For example, the present technology can take a configuration of cloud computing in which one function is distributed to two or more apparatuses via a network and processed jointly by these apparatuses.

Each of the steps described with reference to the flowchart described before can be executed not only by a single apparatus but also by two or more apparatuses to which each step is distributed.

Further, if two or more processing operations are included in a single step, these processing operations can be distributed to two or more apparatuses for execution in addition to being executed by a single apparatus.

It should be noted that the present technology can take a configuration described below.

(1) A receiving apparatus including:
a receiving block configured to receive AV content transmitted by a broadcast wave;
a trigger acquisition block configured to acquire trigger information for operating an application program to be executed in response to the received AV content;
an application acquisition block configured, if a command obtained from the acquired trigger information is indicative of acquisition of the application program, to acquire any one of the application program transmitted by the broadcast wave and the application program distributed via the Internet; and
a control block configured to control an operation of the acquired application program in accordance with a command obtained from the acquired trigger information.

(2) The receiving apparatus according (1) above, further including:
a feature quantity extraction block configured to extract a feature quantity from data of the received AV content,
the trigger acquisition block acquiring the trigger information corresponding to an identification result of the AV content identified by use of the extracted feature quantity.

(3) The receiving apparatus according (2) above, further including:
a table acquisition block configured to acquire a relation table in which a command for controlling an operation of the application program is related with a valid time of the command,
the control block controlling an operation of the application program on the basis of the acquired relation table, if a time indicative of a progression of the AV content obtained from the trigger information satisfies a predetermined valid condition relative to the valid time of the command, in accordance with the valid command.

(4) The receiving apparatus according to (3), further including:
an acquisition-destination information acquisition block configured to acquire first acquisition-destination information indicative of an acquisition destination of the relation table and second acquisition-destination information indicative of an acquisition destination of the application program on the basis of the trigger information,
the table acquisition block acquiring the relation table on the basis of the first acquisition-destination information and the application acquisition block acquiring the application program on the basis of the second acquisition-destination information.

(5) The receiving apparatus according to (4), wherein the second acquisition-destination information has any one of a same configuration as that of an NRT-IT (Non-Real Time-Information Table) for use in transmitting NRT content of an NRT service by the broadcast wave and a configuration corresponding to that of the NRT-IT, the second acquisition-destination information being provided from an information processing apparatus connected to the Internet.

(6) The receiving apparatus according to any one of (1) through (5) above, wherein the trigger information is transmitted by the broadcast wave, and the trigger acquisition block acquires the trigger information transmitted by the broadcast wave.

(7) The receiving apparatus according to (6) above, wherein the control block controls an operation of the application program acquired in accordance with a command included in the trigger information acquired from the broadcast wave.

(8) The receiving apparatus according to (7) above, wherein the application program is transmitted as NRT content of an NRT service by use of a FLUTE (File Delivery over Unidirectional Transport) session, and the application acquisition block references an FDT (File Delivery Table) identified by an SMT (Service Map Table) and an NRT-IT on the basis of identification information of the NRT service included in the trigger information and the NRT content, thereby acquiring the application program transmitted by a FLUTE session.

(9) The receiving apparatus according to (8) above, wherein, if the application program transmitted by a FLUTE session cannot be acquired, the application acquisition block acquires the application program on the basis of third acquisition-destination information indicative of an acquisition destination of the application program distributed by the Internet written to the NRT-IT.

(10) The receiving apparatus according to (3) above, further including:

an acquisition-destination information acquisition block configured to acquire second acquisition-destination information indicative of an acquisition destination of the application program on the basis of the relation table, the table acquisition block acquiring the relation table on the basis of first acquisition-destination information indicative of an acquisition destination of the relation table obtained from the trigger information, the application acquisition block acquiring the application program on the basis of the second acquisition-destination information.

(11) The receiving apparatus according to (3) or (10) above, wherein the control block checks if the receiving apparatus has a performance necessary for operating the application program acquired on the basis of the acquired relation table and, if the receiving apparatus is found to have no performance for operating the application program, the table acquisition block acquires a relation table different from the acquired relation table.

(12) The receiving apparatus according to (11) above, wherein the table acquisition block acquires the relation table in accordance with a preset acquisition priority of the relation table.

(13) The receiving apparatus according to (6) or any one of (10) through (12) above, further including:

a table acquisition block configured to acquire the relation table on the basis of first acquisition-destination information indicative of an acquisition destination of a relation table in which a command for controlling an operation of the application program acquired from the trigger information is related with a valid time of the command, the control block controlling an operation of the application program, if a time indicative of a progression of the AV content acquired from the trigger information satisfies a predetermined valid condition relative to a valid time of the command on the basis of the acquired relation table, in accordance with the valid command.

(14) The receiving apparatus according to (13) above, wherein the application program is transmitted as NRT content of an NRT service using a FLUTE session and, on the basis of identification information of the NRT service written to the relation table and the NRT content, the application acquisition block references an FDT identified by an SMT and an NRT-IT to acquire the application program transmitted by a FLUTE session.

(15) The receiving apparatus according to (14) above, wherein, if the application program transmitted by a FLUTE session cannot be acquired, the application acquisition block acquires the application program on the basis of third acquisition-destination information indicative of an acquisition destination of the application program distributed via the Internet written to the NRT-IT.

(16) The receiving apparatus according to any one of (13) through (15) above, wherein the control block checks if the receiving apparatus has a performance necessary for operating the application program acquired on the basis of the acquired relation table and, if the receiving apparatus is found to have no performance for operating the application program, the table acquisition block acquires a relation table different from the acquired relation table.

(17) The receiving apparatus according to (16) above, wherein the table acquisition block acquires the relation table in accordance with a preset acquisition priority of the relation table.

(18) The receiving apparatus according to any one of (1) through (17) above, wherein the command is indicative of any one of processing operations of acquisition/registration, acquisition/launch, event-fire, suspension, and termination of the application program, and the control block controls any one of processing operations of acquisition/registration and acquisition/launch of the application program and any one of processing operations of event-fire, suspension, and termination of the application program that is active in accordance with the command.

(19) A receiving method for a receiving apparatus, including:

receiving AV content transmitted by a broadcast wave;

acquiring trigger information for operating an application program to be executed in response to the received AV content;

acquiring, if a command obtained from the acquired trigger information is indicative of acquisition of the application program, any one of the application program transmitted by the broadcast wave and the application program distributed via the Internet; and controlling an operation of the acquired application program in accordance with a command obtained from the acquired trigger information.

(20) A program for causing a computer to function as:

a receiving block configured to receive AV content transmitted by a broadcast wave;

a trigger acquisition block configured to acquire trigger information for operating an application program to be executed in response to the received AV content;

an application acquisition block configured, if a command obtained from the acquired trigger information is indicative of acquisition of the application program, to acquire any one of the application program transmitted by the broadcast wave and the application program distributed via the Internet; and a control block configured to control an operation of the acquired application program in accordance with a command obtained from the acquired trigger information.

What is claimed is:

1. A receiving apparatus comprising:
   circuitry configured to
   receive audio/video content transmitted by a broadcast stream;
   acquire control information, which is associated with the audio/video content;
   acquire based on said control information relation information which includes a command, for controlling an operation of an application program to be executed in conjunction with said received audio/video content, and a valid time of said command,
   acquire any one of said application program transmitted by a file delivery over unidirectional transport session associated with said broadcast stream and said application program distributed via the Internet; and
   control an operation of said acquired application program in accordance with said relation information, wherein
   in response to said application program transmitted by the file delivery over unidirectional transport session not being acquired, said circuitry is configured to acquire said application program based on acquisition-destination information indicative of an acquisition destination of said application program distributed via the Internet, said acquisition destination being included in non-real time information.

2. The receiving apparatus according to claim 1, wherein said circuitry is further configured to
   extract a feature quantity from data of said received audio/video content, and
   acquire said control information corresponding to an identification result of said audio/video content identified by use of said extracted feature quantity.

3. The receiving apparatus according to claim 2, wherein said circuitry is further configured to
   control the operation of said application program on the basis of said acquired relation information, when a time indicative of a progression of said audio/video content obtained based on said control information satisfies a predetermined valid condition relative to said valid time of said command, in accordance with said command.

4. The receiving apparatus according to claim 3, wherein said circuitry is further configured to
   acquire acquisition-destination information indicative of an acquisition destination of said relation information and said acquisition-destination information indicative of said acquisition destination of said application program on the basis of said control information, and
   acquire said relation information on the basis of said acquisition-destination information indicative of said acquisition destination of said relation information and said application program on the basis of said acquisition-destination information indicative of said acquisition destination of said application program.

5. The receiving apparatus according to claim 4, wherein said acquisition-destination information indicative of said acquisition destination of said application program has any one of a same configuration as that of an NRT-IT (Non-Real Time-Information Table) for use in transmitting NRT content of an NRT service by said broadcast stream and a configuration corresponding to that of the NRT, said acquisition-destination information indicative of said acquisition destination of said application program being provided from an information processing apparatus connected to said Internet.

6. The receiving apparatus according to claim 3, wherein said circuitry is further configured to
   acquire said acquisition-destination information indicative of said acquisition destination of said application program on the basis of said relation information,
   acquire said relation information on the basis of acquisition-destination information indicative of an acquisition destination of said relation information obtained from said control information, and
   acquire said application program on the basis of said acquisition-destination information indicative of said acquisition destination of said application program.

7. The receiving apparatus according to claim 6, wherein said circuitry is configured to check whether said receiving apparatus has a performance necessary for operating said application program acquired on the basis of said acquired relation information, and
   when said receiving apparatus is found to have no performance for operating said application program, said circuitry is configured to acquire relation information different from said acquired relation information.

8. The receiving apparatus according to claim 7, wherein said circuitry is configured to acquire said relation information in accordance with a preset acquisition priority of said relation information.

9. The receiving apparatus according to claim 1, wherein said control information is transmitted by said broadcast stream, and
   said circuitry is configured to acquire said control information transmitted by said broadcast stream.

10. The receiving apparatus according to claim 9, wherein said circuitry is configured to control the operation of said application program acquired in accordance with the command that is separate from said control information acquired from said broadcast stream.

11. The receiving apparatus according to claim 10, wherein
   said file delivery over unidirectional transport session is a FLUTE (File Delivery over Unidirectional Transport) session,
   said application program is transmitted as NRT content of an NRT service by use of said FLUTE session, and
   said circuitry is configured to reference an FDT (File Delivery Table) identified by an SMT (Service Map Table) and an NRT-IT on the basis of identification information of said NRT service included in said control information and said NRT content, to acquire said application program transmitted by said FLUTE session.

12. The receiving apparatus according to claim 11, wherein, when said application program transmitted by said FLUTE session cannot be acquired, said circuitry is configured to acquire said application program on the basis of said acquisition-destination information indicative of said acquisition destination of said application program distributed by said Internet written to said NRT-IT.

13. The receiving apparatus according to claim 9, wherein said circuitry is further configured to acquire said relation information on the basis of acquisition-destination information indicative of an acquisition destination of said relation information, and control the operation of said application program, when a time indicative of a progression of said audio/video content acquired based on said control information satisfies a predetermined valid condition relative to said valid time of said command on the basis of said acquired relation information, in accordance with said command.

14. The receiving apparatus according to claim 13, wherein said file delivery over unidirectional transport session is a FLUTE (File Delivery over Unidirectional Transport) session, said application program is transmitted as NRT content of an NRT service using said FLUTE session, and on the basis of identification information of said NRT service written to said relation information and said NRT content, said circuitry is configured to reference an FDT identified by an SMT and an NRT-IT to acquire said application program transmitted by said FLUTE session.

15. The receiving apparatus according to claim 14, wherein, when said application program transmitted by said FLUTE session cannot be acquired, said circuitry is configured to acquire said application program on the basis of said acquisition-destination information indicative of said acquisition destination of said application program distributed via said Internet written to said NRT-IT.

16. The receiving apparatus according to claim 13, wherein said circuitry checks whether said receiving apparatus has a performance necessary for operating said application program acquired on the basis of said acquired relation information, and when said receiving apparatus is found to have no performance for operating said application program, said circuitry is configured to acquire relation information different from said acquired relation information.

17. The receiving apparatus according to claim 16, wherein said circuitry is configured to acquire said relation information in accordance with a preset acquisition priority of said relation information.

18. The receiving apparatus according to claim 1, wherein said command is indicative of any one of processing operations of acquisition/registration, acquisition/launch, event-fire, suspension, and termination of said application program, and said circuitry is configured to control any one of the processing operations of acquisition/registration and acquisition/launch of said application program and any one of the processing operations of event-fire, suspension, and termination of said application program that is active in accordance with said command.

19. The receiving apparatus according to claim 1, wherein the relation information includes a plurality of commands for controlling operations of the application program and a valid time for each of the plurality of commands.

20. A receiving method for a receiving apparatus, comprising:

receiving audio/video content transmitted by a broadcast stream;

acquiring control information, which is associated with the audio/video content;

acquiring, by circuitry of the receiving apparatus and based on the control information, relation information which includes a command, for controlling an operation of an application program to be executed in conjunction with said received audio/video content, and a valid time of said command, acquiring any one of said application program transmitted by a file delivery over unidirectional transport session associated with said broadcast stream and said application program distributed via the Internet; and controlling an operation of said acquired application program in accordance with said relation information, wherein in response to said application program transmitted by the file delivery over unidirectional transport session not being acquired, said application program is acquired based on acquisition-destination information indicative of an acquisition destination of said application program distributed via the Internet, said acquisition destination being included in non-real time information.

21. A non-transitory computer-readable storage medium storing a program for causing a computer to:

receive audio/video content transmitted by a broadcast stream;

acquire control information, which is associated with the audio/video content;

acquire based on said control information relation-information which includes a command, for controlling an operation of an application program to be executed in conjunction with said received audio/video content, and a valid time of said command, acquire any one of said application program transmitted by a file delivery over unidirectional transport session associated with said broadcast stream and said application program distributed via the Internet; and control an operation of said acquired application program in accordance with said relation information, wherein in response to said application program transmitted by the file delivery over unidirectional transport session not being acquired, said application program is acquired based on acquisition-destination information indicative of an acquisition destination of said application program distributed via the Internet, said acquisition destination being included in non-real time information.

22. A television receiver, comprising:

receiver circuitry configured to receive audio/video content transmitted by a broadcast stream;

processing circuitry configured to acquire control information, which is associated with the audio/video content;

acquire based on said control information relation information which includes a command, for controlling an operation of an application program to be executed in conjunction with said received audio/video content, and a valid time of said command, acquire any one of said application program transmitted by a file delivery over unidirectional transport session associated said broadcast stream and said application program distributed via the Internet; and control an operation of said acquired application program in accordance with said relation information; and a display configured to display video of the audio/video content, wherein in response to said application program transmitted by the file delivery over unidirectional transport session not being acquired, said processing circuitry is configured to acquire said application program based on acquisition-destination information indicative of an acquisition destination of said application program distributed via the Internet, said acquisition destination being included in non-real time information.

\* \* \* \* \*